United States Patent
Yi et al.

(10) Patent No.: US 11,211,990 B2
(45) Date of Patent: Dec. 28, 2021

(54) BEAM FAILURE RECOVERY IN MULTI-TRP SCENARIOS

(71) Applicant: Ofinno, LLC, Reston, VA (US)

(72) Inventors: Yunjung Yi, Vienna, VA (US); Esmael Hejazi Dinan, McLean, VA (US); Ali Cagatay Cirik, Herndon, VA (US); Hua Zhou, Herndon, VA (US); Youngwoo Kwak, Vienna, VA (US); Kai Xu, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 31 days.

(21) Appl. No.: 16/852,693

(22) Filed: Apr. 20, 2020

(65) Prior Publication Data

US 2020/0350972 A1 Nov. 5, 2020

Related U.S. Application Data

(60) Provisional application No. 62/841,775, filed on May 1, 2019.

(51) Int. Cl.
*H04B 7/06* (2006.01)
*H04L 5/00* (2006.01)
(Continued)

(52) U.S. Cl.
CPC ......... *H04B 7/0695* (2013.01); *H04L 5/0051* (2013.01); *H04W 72/1268* (2013.01);
(Continued)

(58) Field of Classification Search
CPC ... H04L 5/0051; H04L 5/0035; H04L 5/0023; H04L 1/12; H04L 5/0048; H04L 5/0053;
(Continued)

(56) References Cited

U.S. PATENT DOCUMENTS

2019/0200248 A1* 6/2019 Basu Mallick ...... H04B 7/0695

OTHER PUBLICATIONS

3GPP TSG RAN WG1 Meeting #96bis R1-1904314; Xi'an, China, Apr. 8-12, 2019; Source: Intel Corporation Title: On Beam Management Enhancement Agenda item:7.2.8.3; Document for: Discussion and Decision.
(Continued)

*Primary Examiner* — Kevin C. Harper
*Assistant Examiner* — Henry Baron
(74) *Attorney, Agent, or Firm* — Kavon Nasabzadeh; Philip Smith; Willis Chang

(57) ABSTRACT

A wireless device may receive one or more radio resource control (RRC) messages. The RRC messages may indicate a first transmission and reception point (TRP) of a cell, a second TRP of the cell, and one or more first beam failure recovery parameters indicating one or more first reference signals for first TRP. The wireless device may determine a first beam failure of the first TRP based on the one or more first reference signals indicated by the one or more first beam failure recovery parameters. The wireless device may transmit an uplink signal via the second TRP of the cell indicating a link recovery request for the first TRP. The wireless device may receive an uplink grant for uplink data. The wireless device may transmit the uplink data indicating a candidate beam of the first TRP.

20 Claims, 30 Drawing Sheets

(51) Int. Cl.
    *H04W 72/12* (2009.01)
    *H04W 72/14* (2009.01)
    *H04W 74/08* (2009.01)
    *H04W 76/27* (2018.01)
(52) U.S. Cl.
    CPC ....... *H04W 72/14* (2013.01); *H04W 74/0833* (2013.01); *H04W 76/27* (2018.02)
(58) Field of Classification Search
    CPC ...... H04B 7/022; H04B 7/088; H04B 7/0695; H04W 72/1268; H04W 74/0833; H04W 76/27; H04W 72/14; H04W 76/19
    See application file for complete search history.

(56) References Cited

OTHER PUBLICATIONS

R1-1903971; 3GPP TSG RAN WG1 Meeting #96bis; Xi'an, China, Apr. 8-12, 2019; ; Agenda Item:7.2.8.3; Source:Huawei, HiSilicon; Title:Enhancements on multi-beam operation.

R1-1904013 Enhancements on Multi-TRP and Multi-panel Transmission; 3GPP TSG RAN WG1 #96bis; Xi'an, China, Apr. 8-12, 2019; ; Source: ZTE; Title:Enhancements on Multi-TRP and Multi-panel Transmission; Agenda item:7.2.8.2.

R1-1904014 Enhancements on Multi-beam Operation; 3GPP TSG RAN WG1 Meeting #96bis; Xi'an, China, Apr. 8-12, 2019; Source:ZTE; Title: Enhancements on multi-beam operation; Agenda Item: 7.2.8.3; Document for: Discussion and Decision.

R1-1904021 Considerations on beam management for multi-TRP; 3GPP TSG RAN WG1 #96bis; Xi'an, China, Apr. 8-12, 2019; ; Source: ZTE; Title:Considerations on beam management for multi-TRP; Agenda item:7.2.8.6.

R1-1904208_MTRP final; 3GPP TSG RAN WG1 Meeting #96bis; Xi'an, China, Apr. 8-12, 2019; Agenda item:7.2.8.2; Source:LG Electronics; Title:Enhancements on multi-TRP/panel transmission; Document for:Discussion and Decision.

R1-1904209 Multi-beam_final; 3GPP TSG RAN WG1 Meeting #96bis; Xi'an, China, Apr. 8-12, 2019; Agenda item: 7.2.8.3; Source: LG Electronics; Title: Discussion on multi-beam based operations and enhancements; Document for: Discussion and Decision.

R1-1904313_multiTRP; 3GPP TSG RAN WG1 Meeting #96bis; Xi'an, China, Apr. 8-12, 2019; Source: Intel Corporation; Title:On multi-TRP/multi-panel transmission; Agenda item:7.2.8.2.

R1-1904449 NCJT; 3GPP TSG RAN WG1 Meeting #96bis; Xi'an, China, Apr. 8-12, 2019; Agenda item:7.2.8.2; Source: Samsung; Title: Enhancements on Multi-TRP/Panel Transmission; Document for:Discussion and Decision.

R1-1904450 R16 Multi-Beam; 3GPP TSG RAN WG1 96bis; Xi'an, China, Apr. 12-16, 2019; Agenda item:7.2.8.3; Source: Samsung; Title: Enhancements on multi-beam operations.

R1-1904781_Discussion on multi-beam operation-final; 3GPP TSG RAN WG1 #96bis; Xi'an, China, Apr. 8-12, 2019; Agenda Item: 7.2.8.3; Source:Spreadtrum Communications; Title:Discussion on multi-beam operation; Document for:Discussion and decision.

R1-1904966; 3GPP TSG RAN WG1 #96bis; Xi'an, China, Apr. 8-12, 2019; Source:NTT Docomo, Inc; Title: Enhancements on multi-TRP/panel transmission; Agenda Item:7.2.8.2.

R1-1904967; 3GPP TSG RAN WG1 #96bis ; Xi'an, China, Apr. 8-12, 2019; Source:NTT Docomo, Inc.; Title: Discussion on multi-beam enhancement ; Agenda Item:7.2.8.3.

R1-1905026 Multi-TRP Enhancements; 3GPP TSG-RAN WG1 Meeting #96bR1-1905026; April 8-12, 2019 ; Xi'an, China; ; Agenda item:7.2.8.2.

R1-1905027 Enhancements on Multi-beam Operation; 3GPP TSG-RAN WG1 Meeting #96-Bis; Xi'an, China, April 8-12, 2019; Agenda item:7.2.8.3; Source: Qualcomm Incorporated.

R1-1905064; 3GPP TSG RAN WG1 #96bis Meeting; Xi'an, China, Apr. 8-Apr. 12, 2019; ; Agenda item:7.2.8.2; Source:Nokia, Nokia Shanghai Bell; Title:Enhancements on Multi-TRP/Panel Transmission.

R1-1905065; 3GPP TSG RAN WG1 #96bis Meeting; Xi'an, China, Apr. 8-Apr. 12, 2019; Agenda item:7.2.8.3; Source:Nokia, Nokia Shanghai Bell; Title:Enhancements on Multi-beam Operation.

R1-1905155; 3GPP TSG RAN WG1 Meeting #96bis ; Xi'an, China, Apr. 8-12, 2019.; Agenda Item:7.2.4.2.2; Source: KT Corp.; Title:Consideration on Mode 2 resource allocation for NR sidelink.

R1-1905156 Enhancements to multi-beam operation; 3GPP TSG-RAN WG1 Meeting #96bisTdoc; Xi'an, China, Apr. 8-12, 2019; Agenda Item:7.2.8.3; Source:Ericsson;Title:Enhancements to multi-beam operation.

* cited by examiner

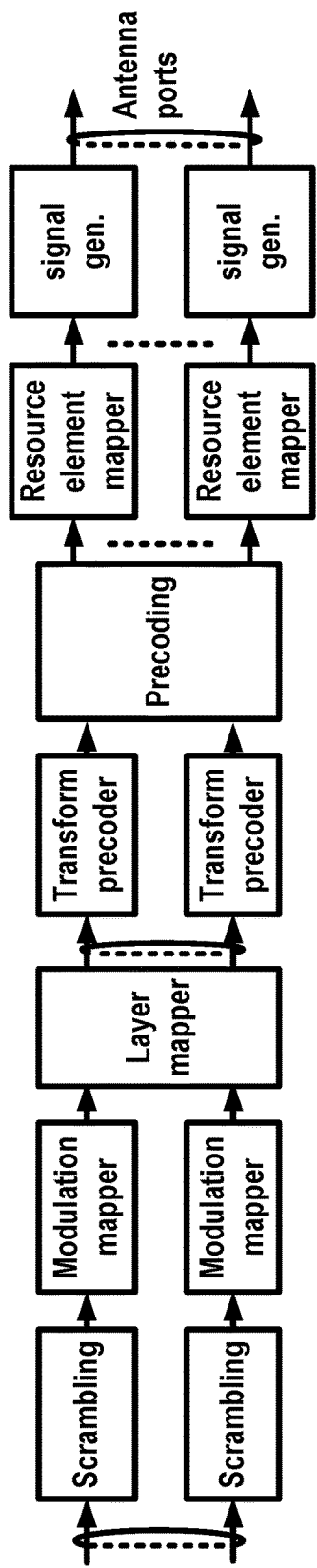
FIG. 4A
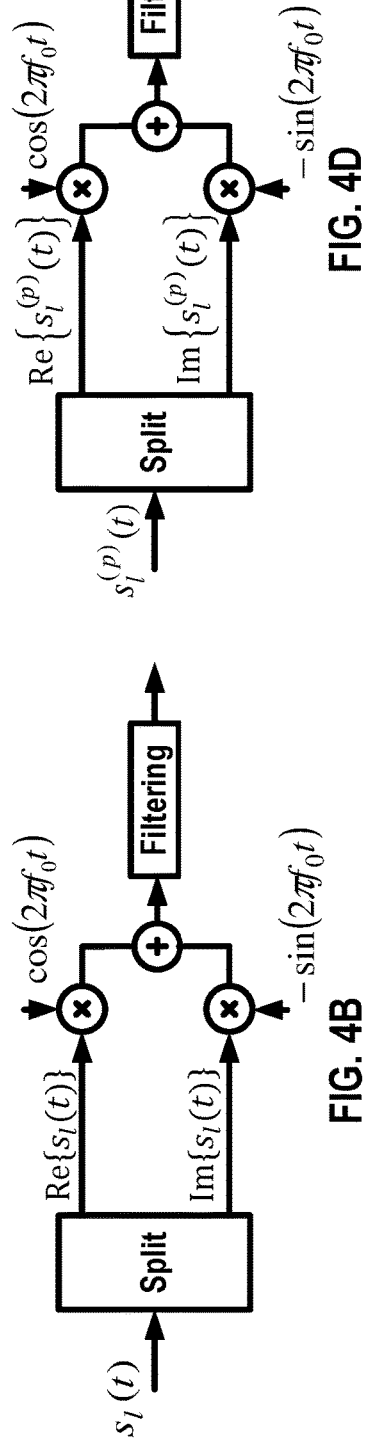
FIG. 4B
FIG. 4D
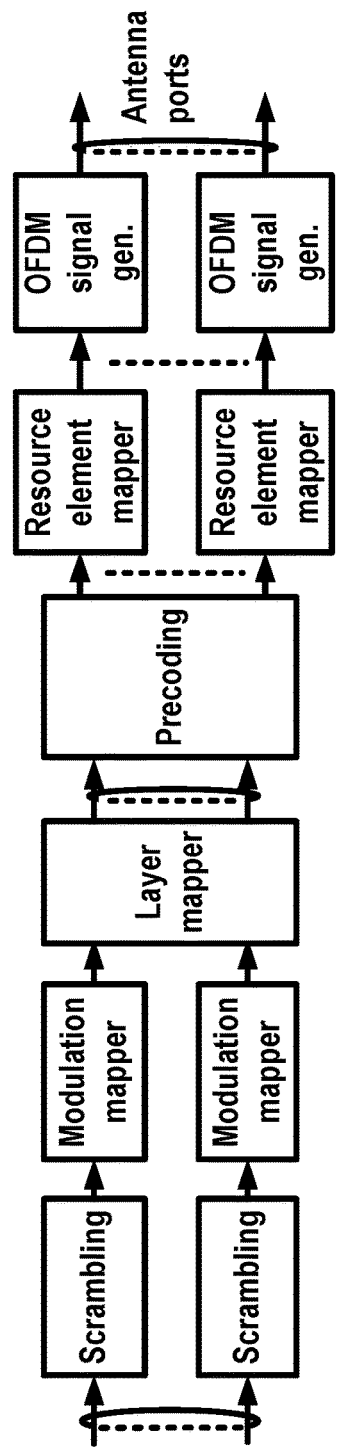
FIG. 4C

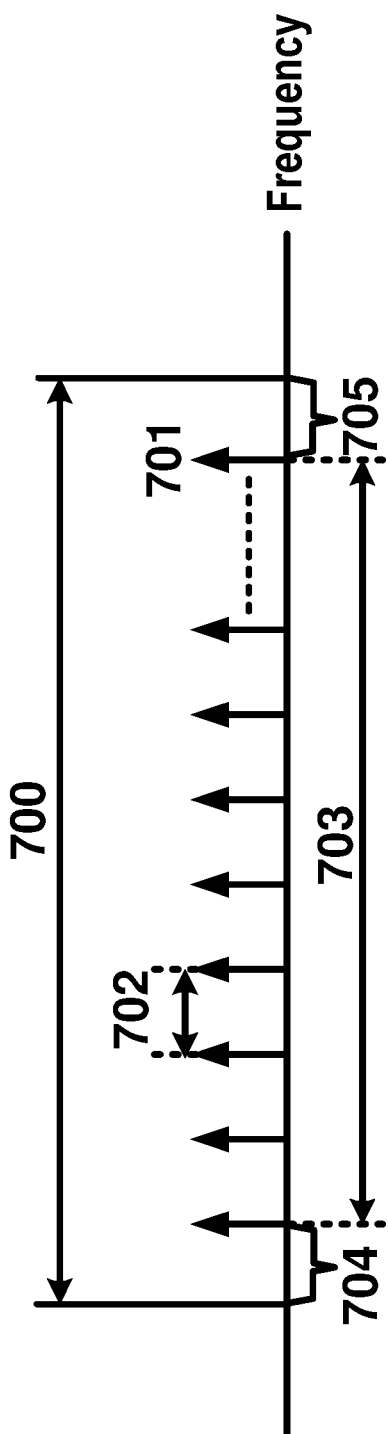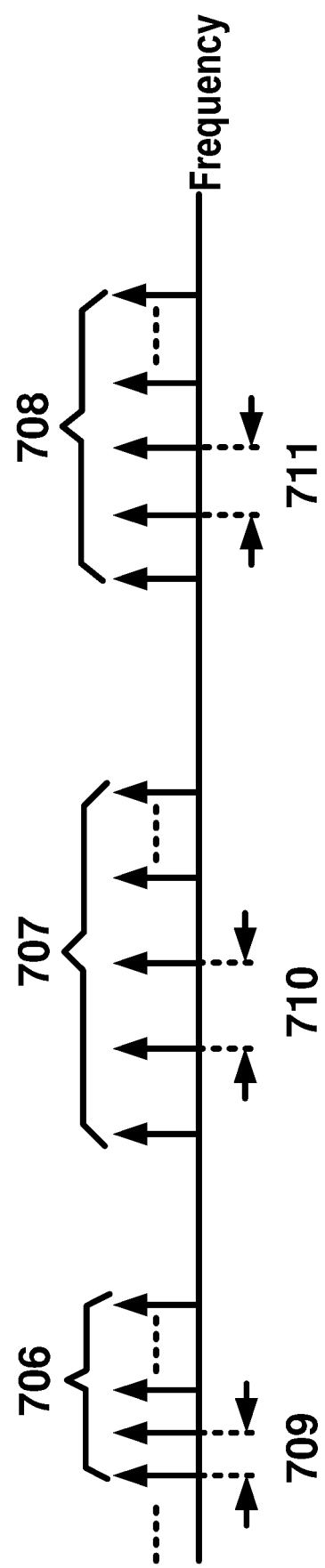

BEAM FAILURE RECOVERY IN MULTI-TRP SCENARIOS

CROSS-REFERENCE TO RELATED APPLICATIONS

This application claims the benefit of U.S. Provisional Application No. 62/841,775, filed May 1, 2020, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 7A and FIG. 7B are diagrams depicting example sets of OFDM subcarriers as per an aspect of an embodiment of the present disclosure.

DETAILED DESCRIPTION OF EMBODIMENTS

Figure 1:
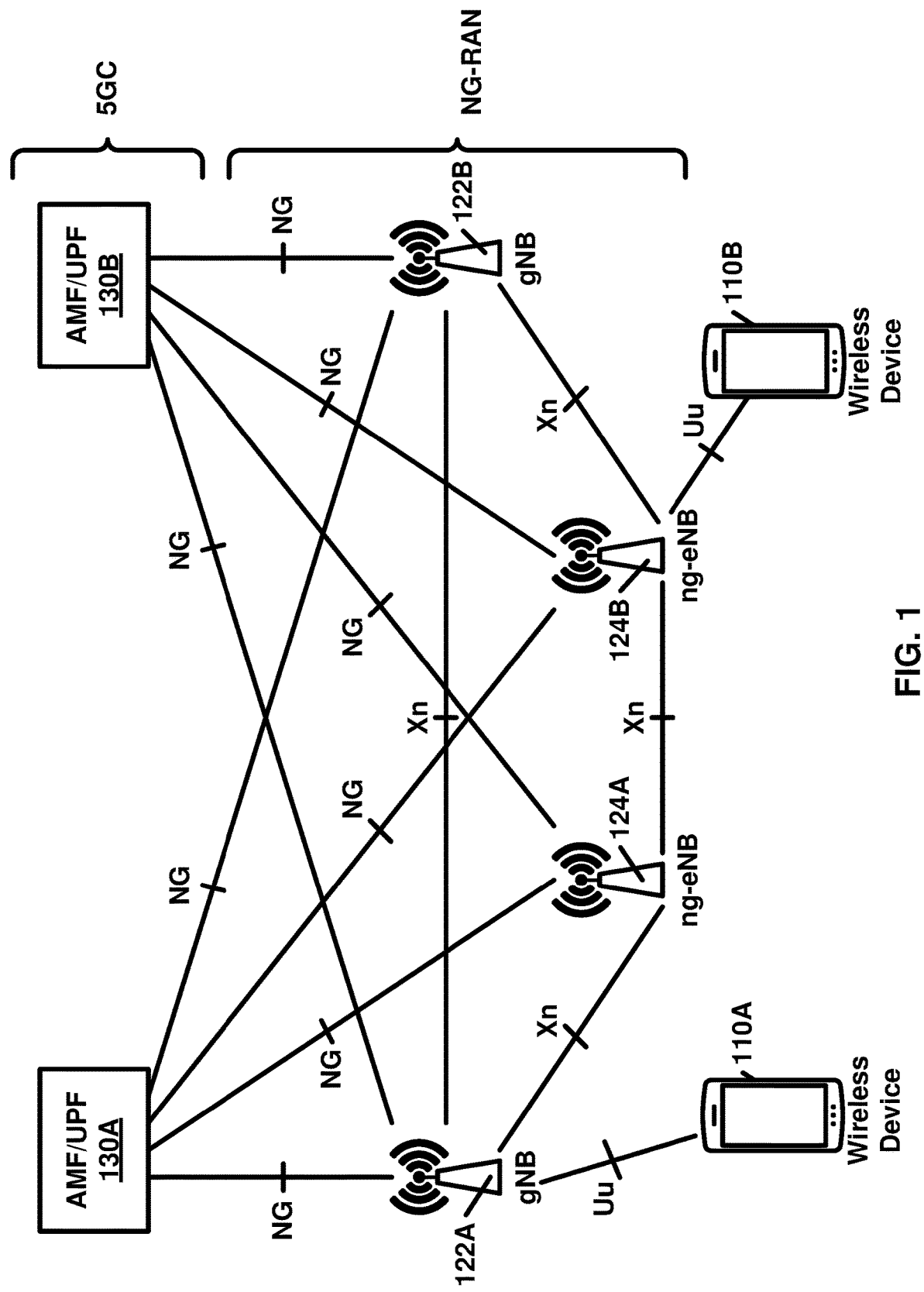
FIG. 1 is a diagram of an example RAN architecture as per an aspect of an embodiment of the present disclosure.

Example embodiments of the present disclosure enable operation of wireless communication systems. Embodiments of the technology disclosed herein may be employed in the technical field of multicarrier communication systems. More particularly, the embodiments of the technology disclosed herein may relate to radio access networks in multi-carrier communication systems.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space CU Central Unit
DC Dual Connectivity
DCCH Dedicated Control CHannel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
sPCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB TransportBlock
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide, for example, NG interface management, UE context management, UE mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
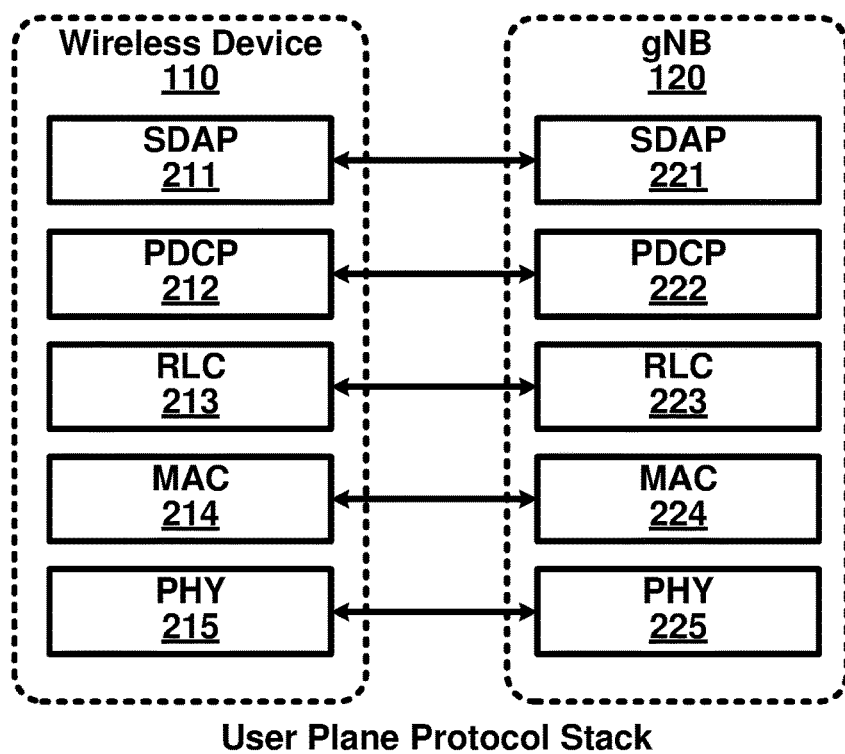
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
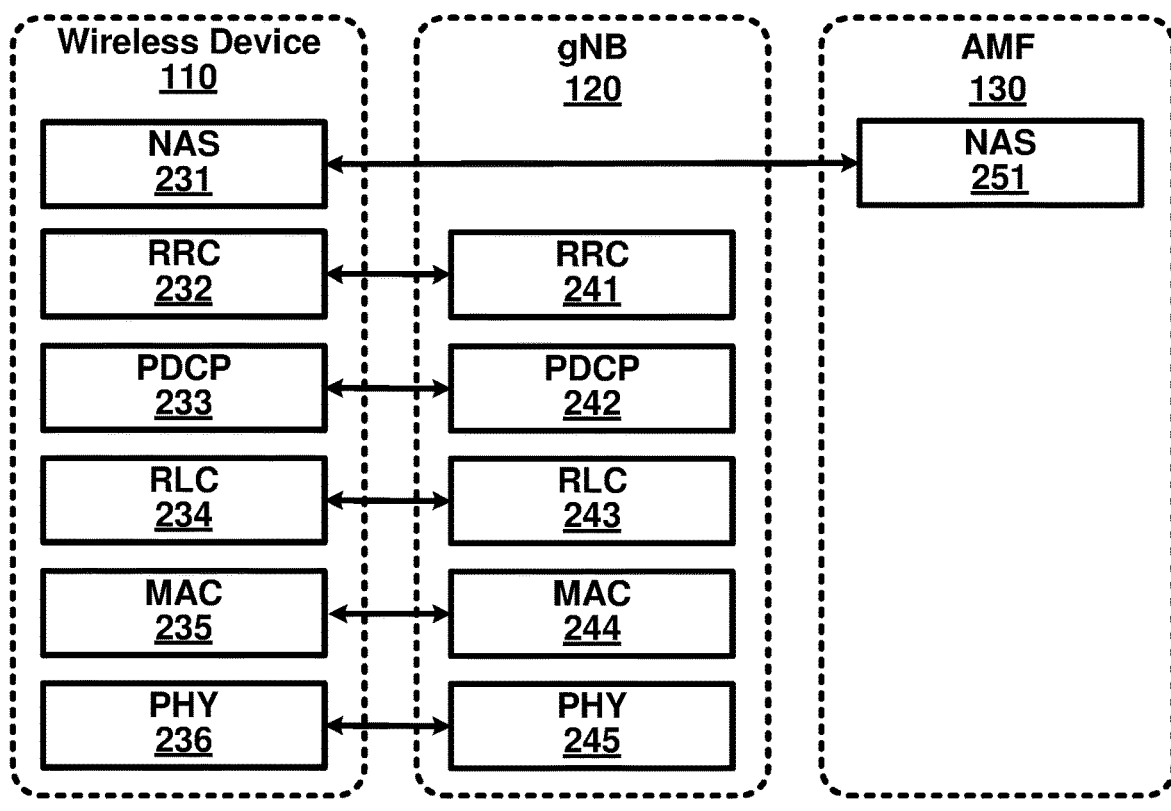
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
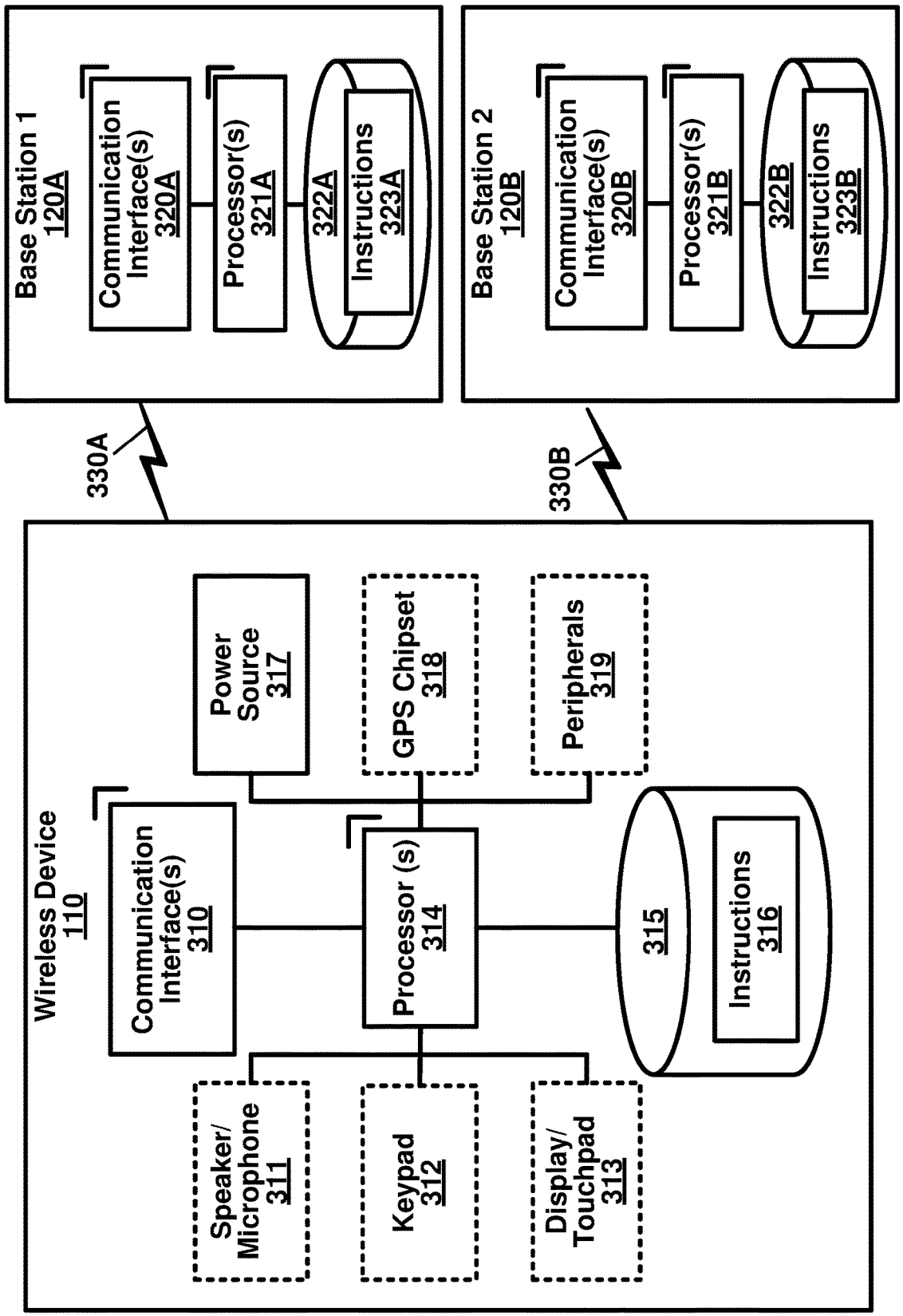
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell.

The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
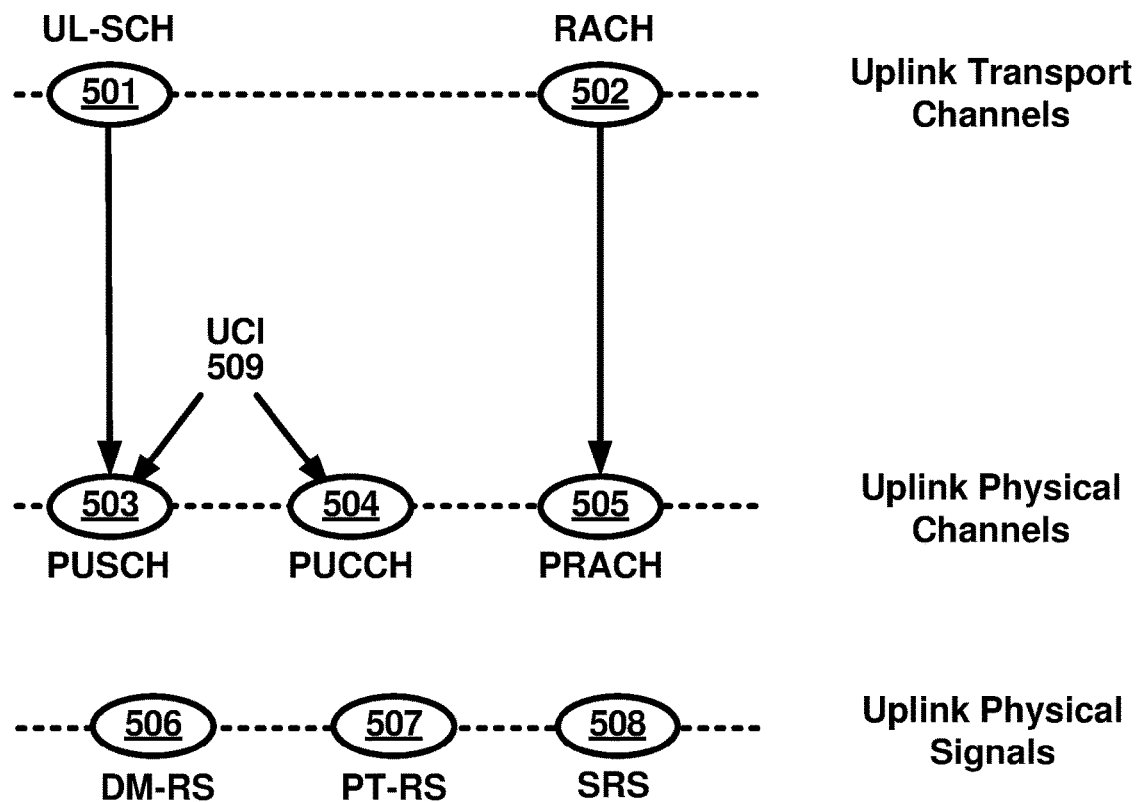
FIG. 5A is a diagram of an example uplink channel mapping and example uplink physical signals as per an aspect of an embodiment of the present disclosure.
Figure 5B:
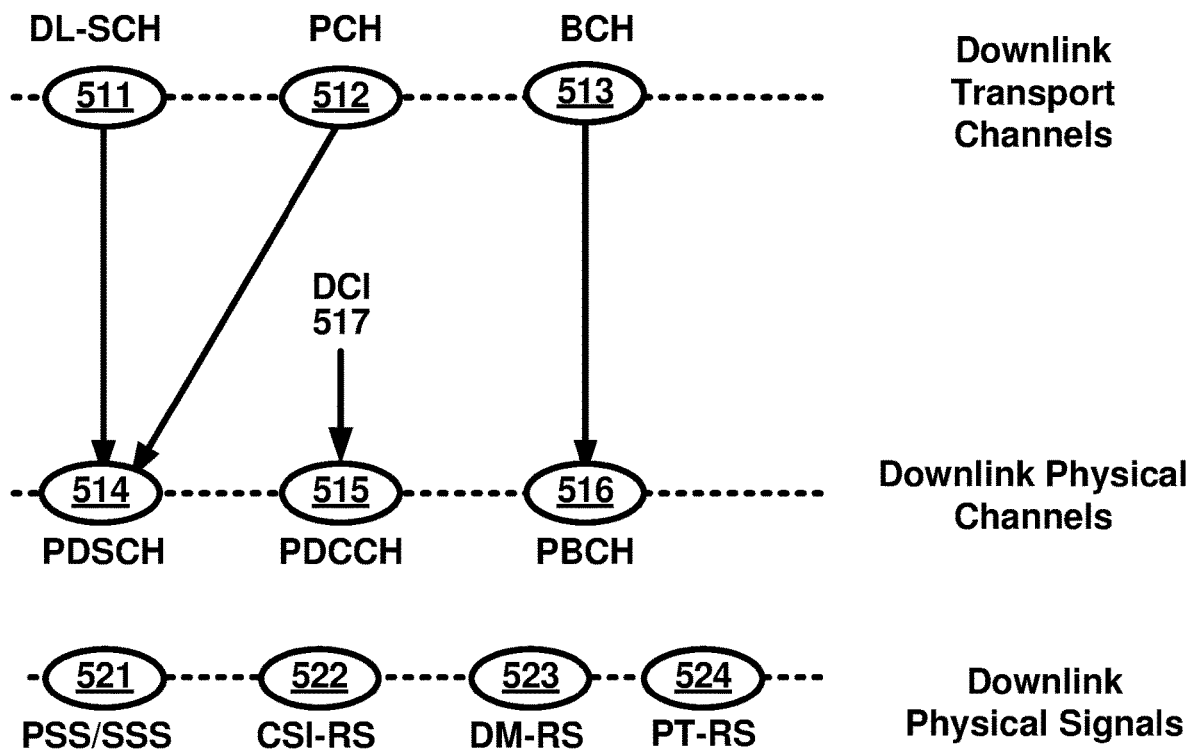
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning the same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume the same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in the same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with the same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ the same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ the same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume the same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
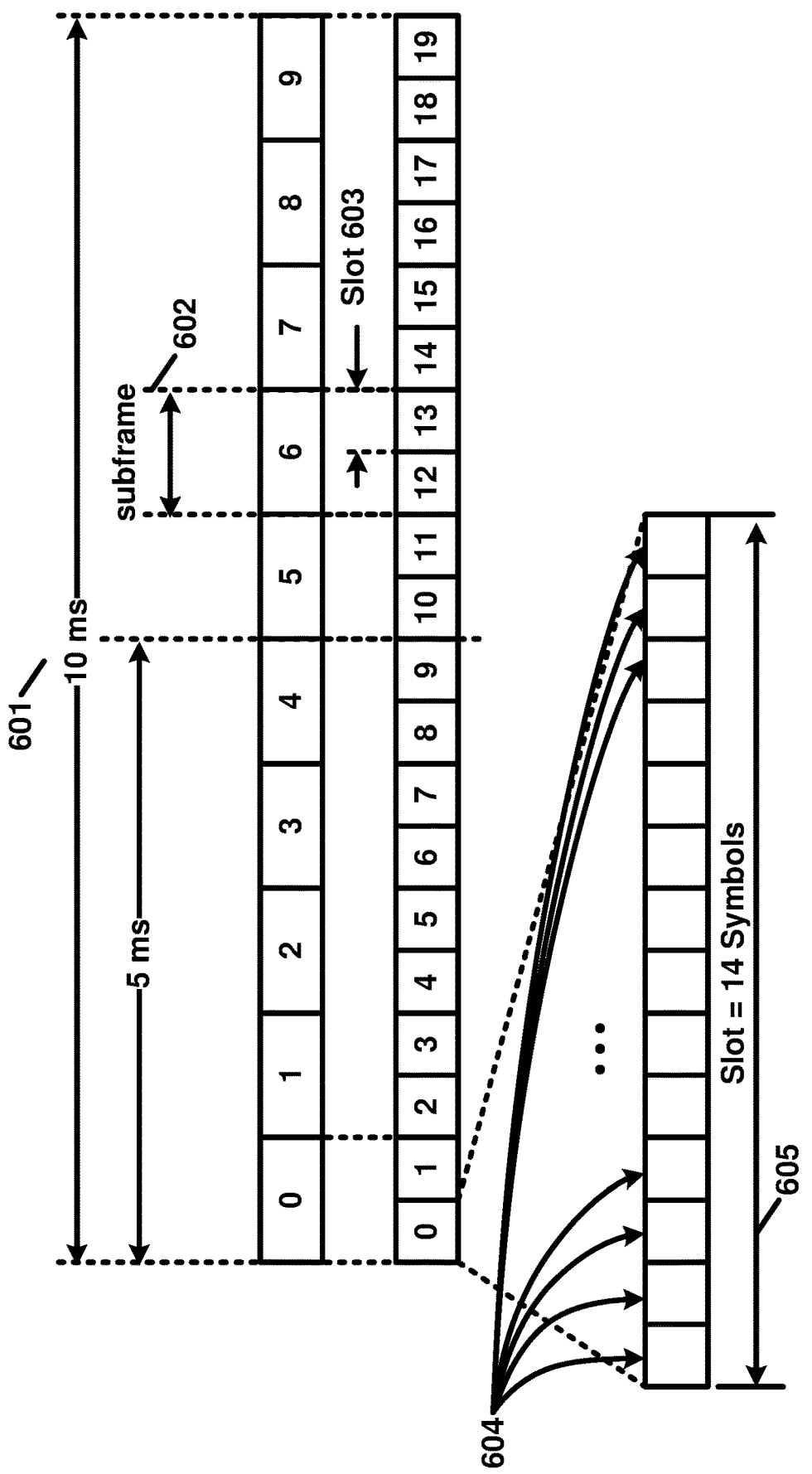
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
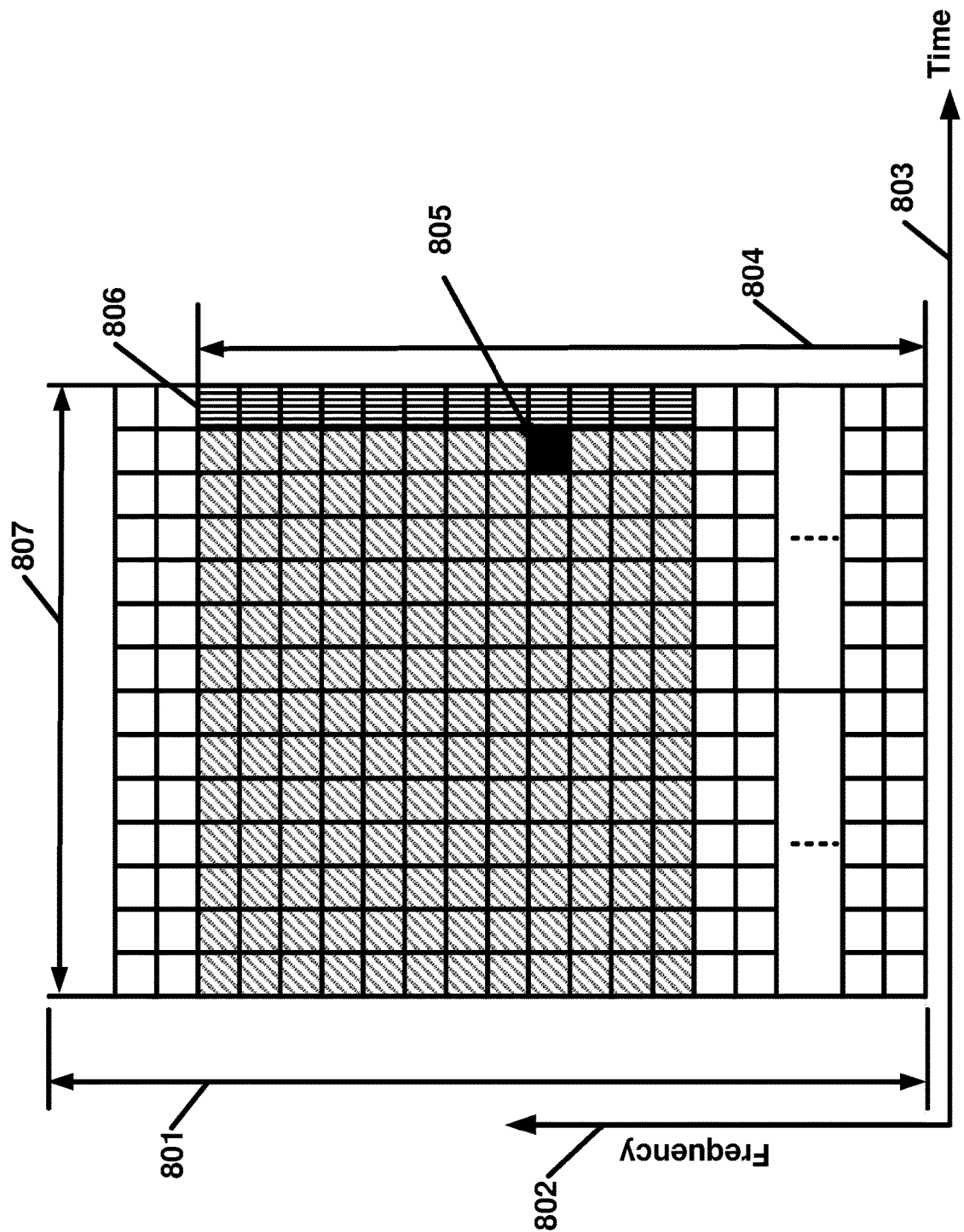
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
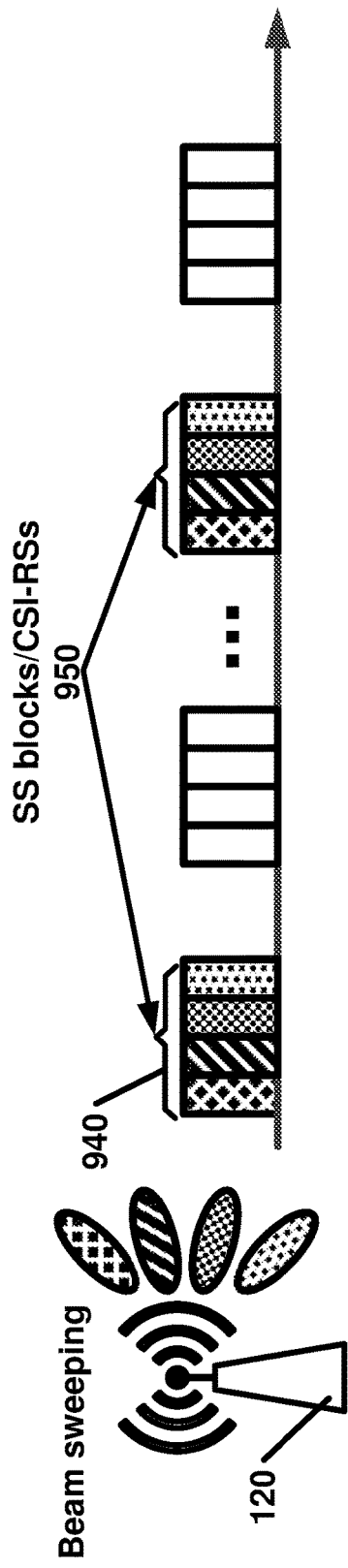
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
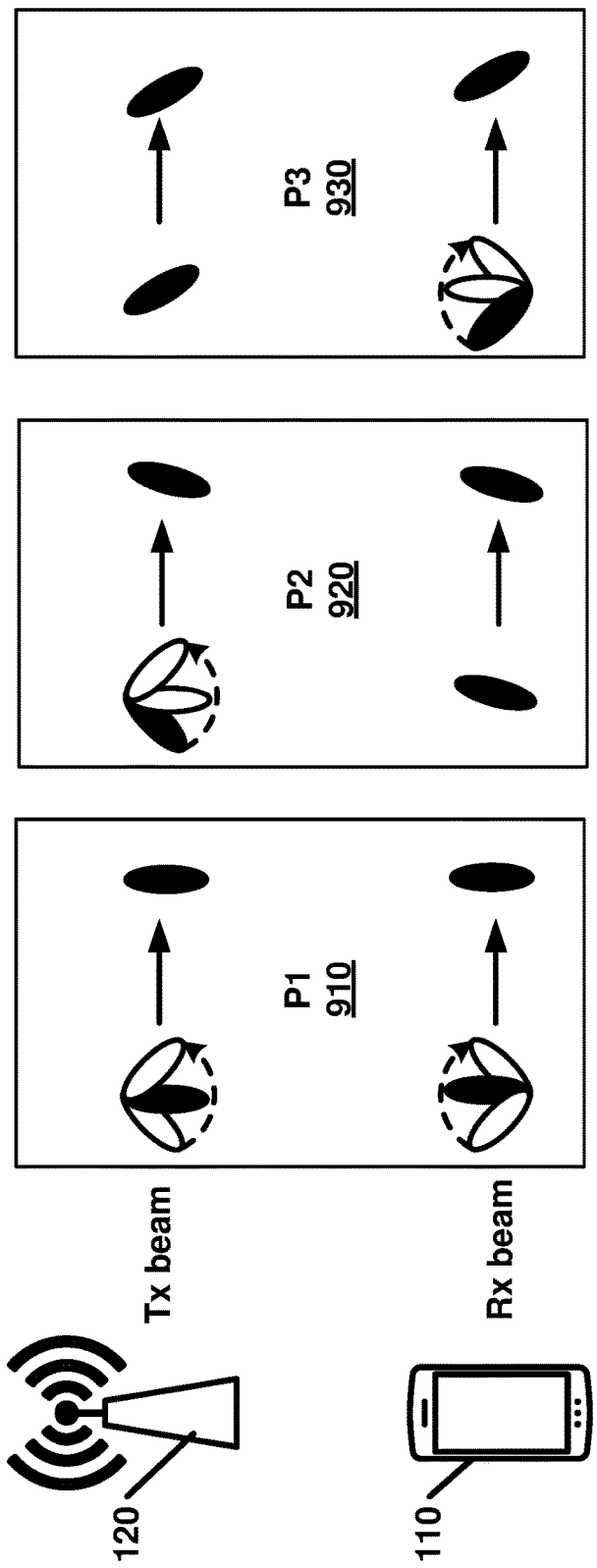
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
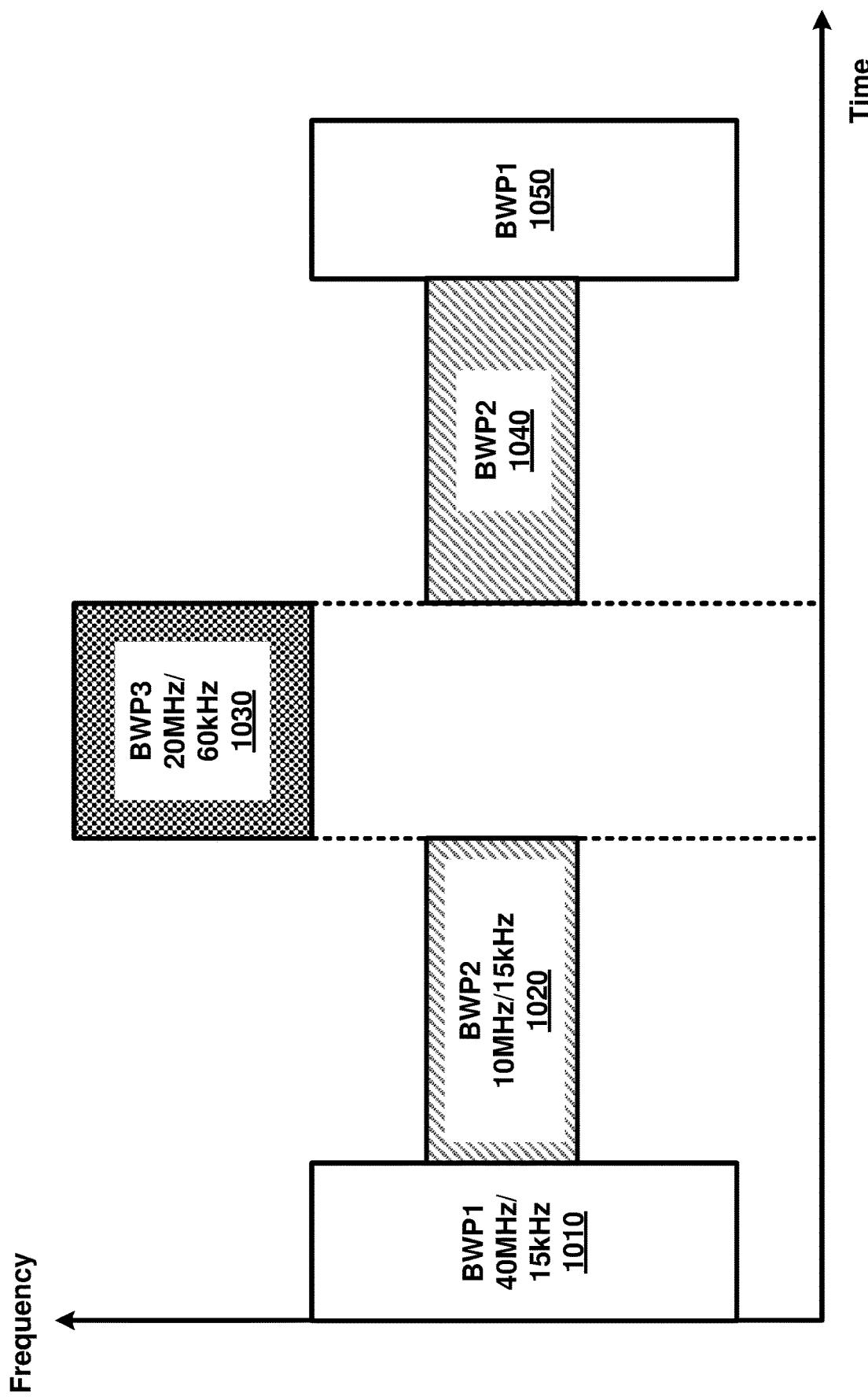
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and a subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a sPCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
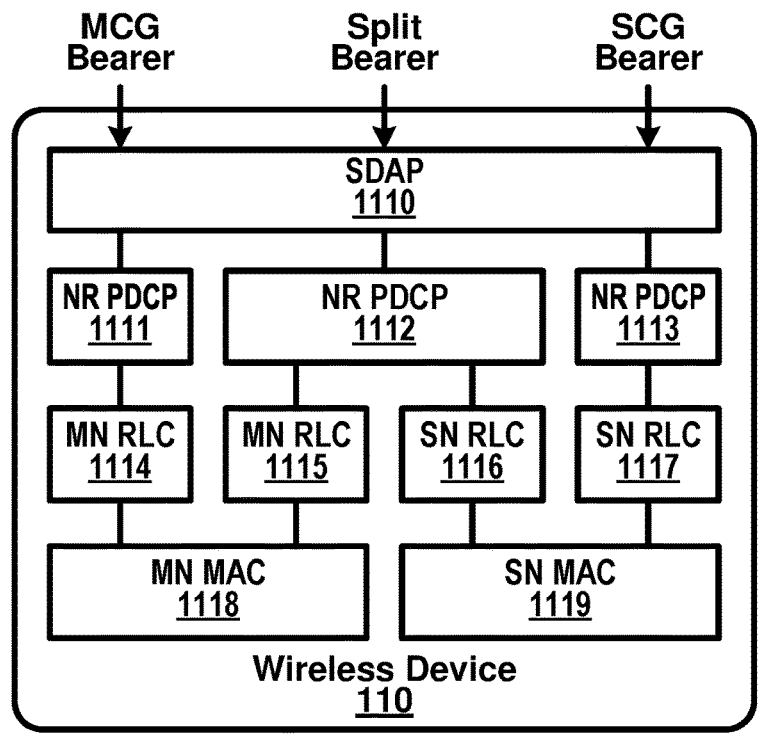
FIG. 11A, and FIG. 11B are diagrams of an example multi connectivity as per an aspect of an embodiment of the present disclosure.
Figure 11B:
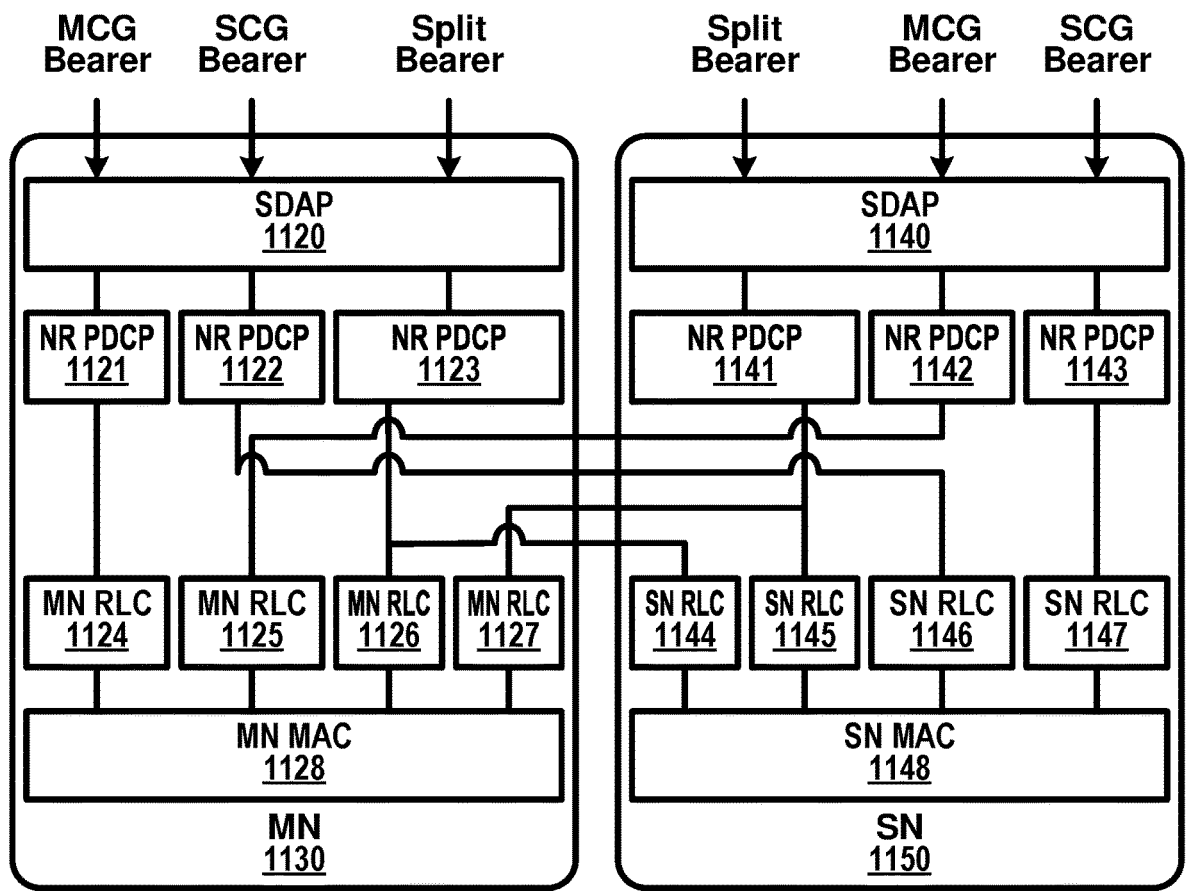

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations.

Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (sPCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (sPCell, PCell of SCG, or sometimes called PCell), is configured with PUCCH resources; when an SCG is configured, there may be at least one SCG bearer or one Split bearer; upon detection of a physical layer problem or a random access problem on a sPCell, or a number of NR RLC retransmissions has been reached associated with the SCG, or upon detection of an access problem on a sPCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or sPCell may not be de-activated; sPCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a sPCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a sPCell of a SCG.

Figure 12:
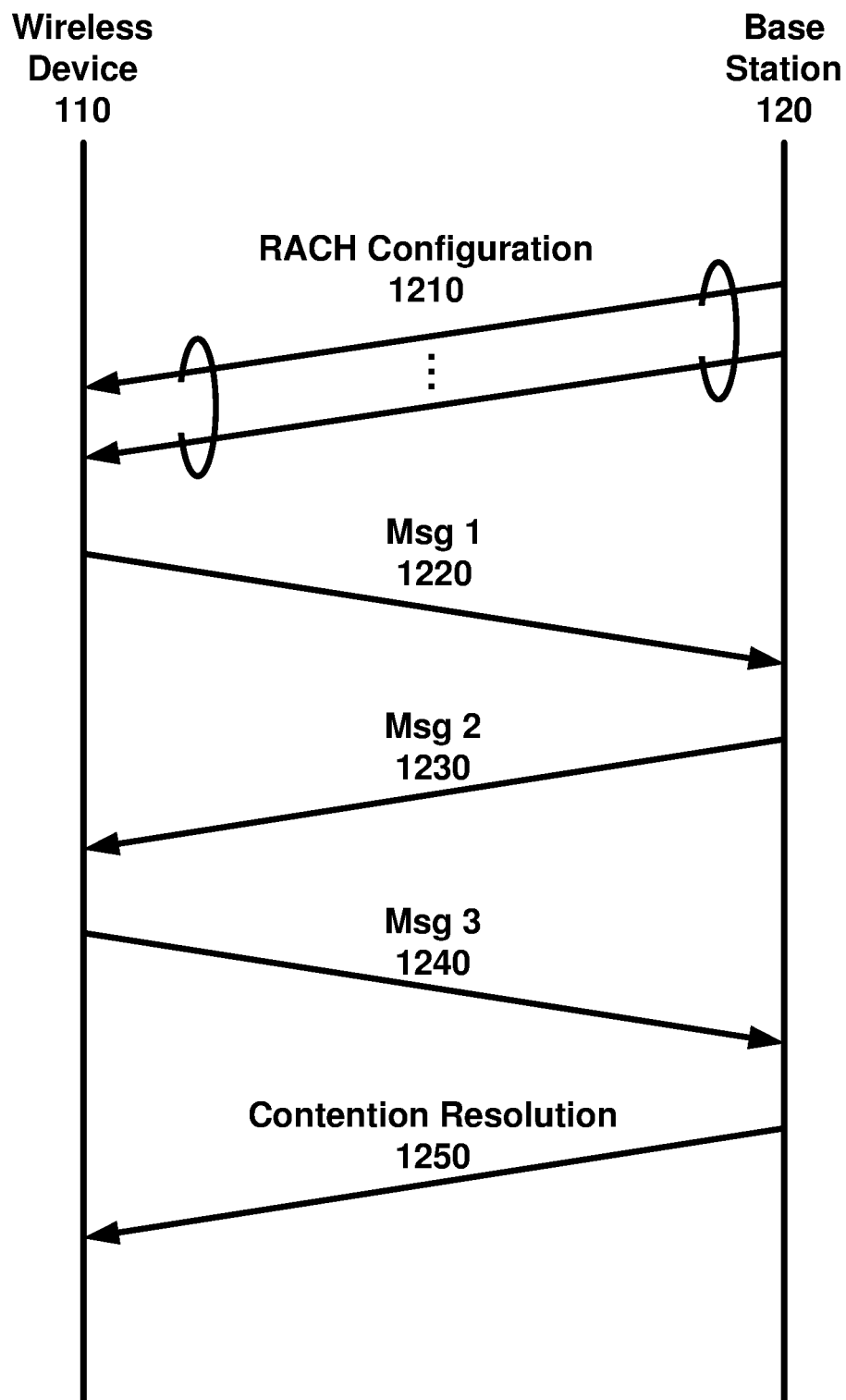
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on the same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting the same preamble to a base station and receive, from the base station, the same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
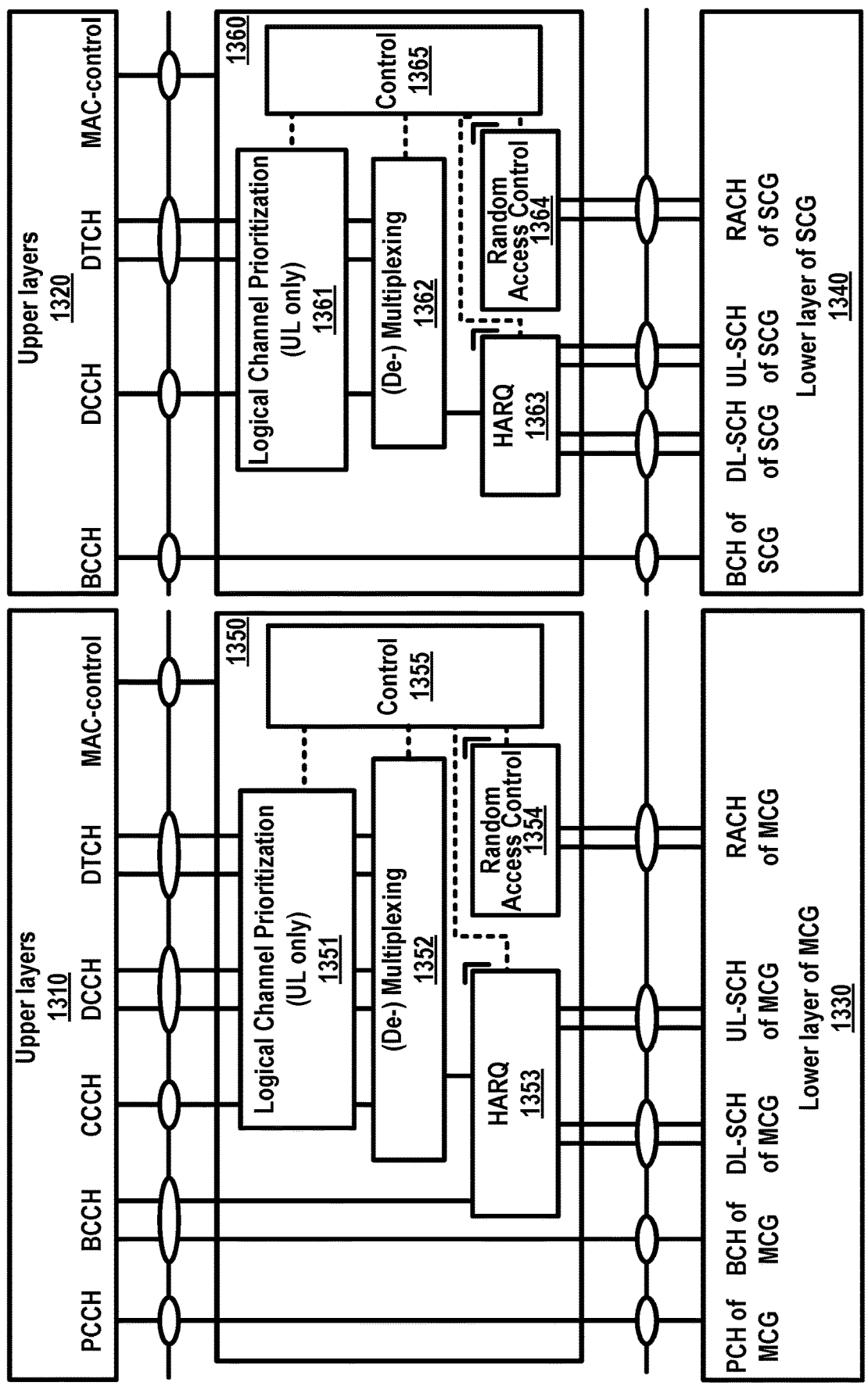
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called sPCell or PCell of SCG, or sometimes may be simply called PCell. A sPCell may be configured with PUCCH resources. In an example, when a SCG is configured, there may be at least one SCG bearer or one split bearer. In an example, upon detection of a physical layer problem or a random access problem on a sPCell, or upon reaching a number of RLC retransmissions associated with the SCG, or upon detection of an access problem on a sPCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
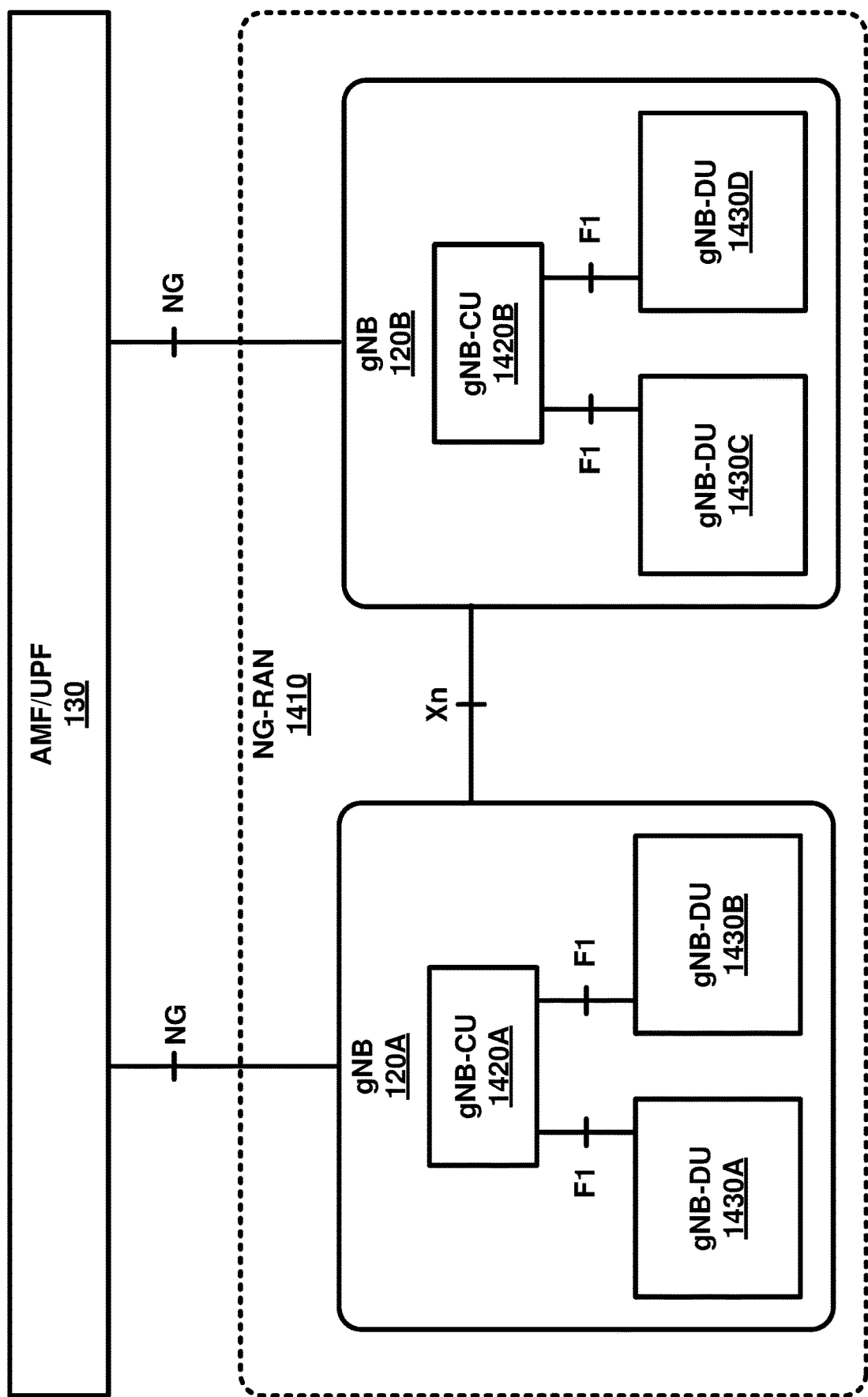
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
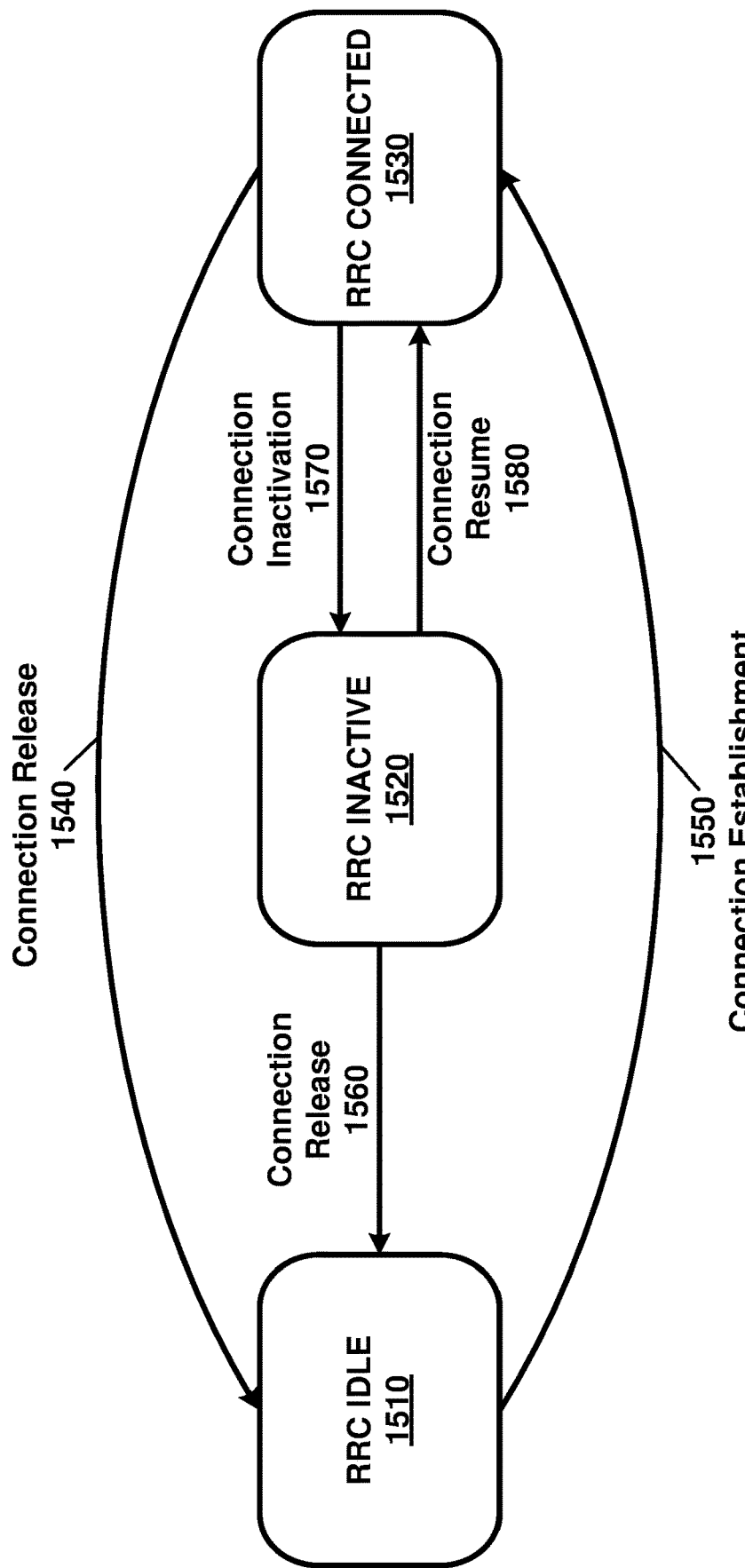
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

In an example, a base station may configure a wireless device with one or more first reference signals (e.g., beam recovery RSs, SS/PBCH (e.g., SSB) block, CSI-RS, etc.) for beam failure detection. In an example, the wireless device may declare/detect a beam failure based on the one or more first reference signals (RSs) when a number of beam failure instance indications from a physical layer of the wireless device to a higher layer (e.g., MAC layer) of the wireless device reaches a configured threshold (e.g., beam failure instance max count, beamFailureInstanceMaxCount) before an expiry of a configured timer (e.g., beamFailureDetectionTimer).

In an example, an SSB (e.g., cell-defining SSB), that is indicated as a beam recovery reference signal, may be associated with an initial downlink BWP of a cell. In an example, when a current active BWP of a cell is the initial downlink BWP of the cell, the wireless device may perform a beam measurement based on the SSB that the wireless device has identified through an initial access or through a RACH procedure. In an example, the base station may configure the SSB, for detecting the beam failure, for the initial downlink BWP. In an example, the gNB may configure one or more SSBs for beam recovery RSs of a first downlink BWP when the first downlink BWP may include a frequency region of the one or more SSBs and a numerology of the downlink BWP is same as a numerology of the one or more SSBs.

In an example, a gNB may configure one or more CSI-RSs for beam recovery RSs of a second downlink BWP. The second downlink BWP may be same or may be different as the first downlink BWP. The one or more first RSs may comprise one or more CSI-RSs and/or one or more SSBs.

In an example, a wireless device may trigger a beam failure recovery by initiating a random-access procedure on a primary cell, at least when there is a single active TRP on the primary cell from a UE perspective, based on detecting a beam failure. In an example, a wireless device may select a suitable/candidate beam, by performing measurements on one or more candidate beams or candidate beam RSs, for a beam failure recovery based on detecting a beam failure. In an example, the wireless device may determine that the beam failure recovery is completed when the wireless device is completed the RACH procedure.

In an example, a wireless device may perform a beam management and/or a beam failure recovery (BFR) procedure when a base station may enable the BFR procedure, for a UE MAC entity, for a cell. When a wireless device is enabled with a BFR procedure, the wireless device may perform measurements on one or more beam recovery RSs (e.g., first RSs consisting of SSBs and/or CSI-RSs). In response to a beam failure detection, the wireless device may perform measurements on one or more new candidate beam candidate RSs to identify a new candidate beam for a beam failure recovery. In an example, the wireless device may detect the beam failure based on counting a beam failure instance indication from a lower layer of the wireless device (e.g. PHY layer) to the MAC entity.

In an example, a base station may reconfigure an information element (IE) beamFailureRecoveryConfig during an ongoing random-access procedure for a beam failure recovery. In response to the reconfiguring the IE beamFailureRecoveryConfig, the MAC entity may stop the ongoing random-access procedure. Based on the stopping the ongoing random-access procedure, the wireless device may initiate a second random-access procedure for the beam failure recovery using/with the reconfigured IE beamFailureRecoveryConfig.

In an example, an RRC may configure a wireless device with one or more parameters in an IE BeamFailureRecoveryConfig and an IE RadioLinkMonitoringConfig for a beam failure detection and recovery procedure. The one or more parameters may comprise at least: beamFailureInstanceMaxCount for a beam failure detection; beamFailureDetectionTimer for the beam failure detection; beamFailureRecoveryTimer for a beam failure recovery; rsrp-ThresholdSSB: an RSRP threshold for the beam failure recovery; PowerRampingStep for the beam failure recovery; powerRampingStepHighPriority for the beam failure recovery; preambleReceivedTargetPower for the beam failure recovery; preambleTransMax for the beam failure recovery; scalingFactorBI for the beam failure recovery; ssb-per-RACH-Occasion for the beam failure recovery; ra-OccasionList for the beam failure recovery; ra-ssb-OccasionMaskIndex for the beam failure recovery; prach-ConfigurationIndex for the beam failure recovery; and ra-ResponseWindow. The ra-ResponseWindow may be a time window to monitor at least one response (e.g., random-access response, BFR response) for the beam failure recovery. In an example, the wireless device may use a contention-free random-access preamble for the beam failure recovery.

Figure 16:
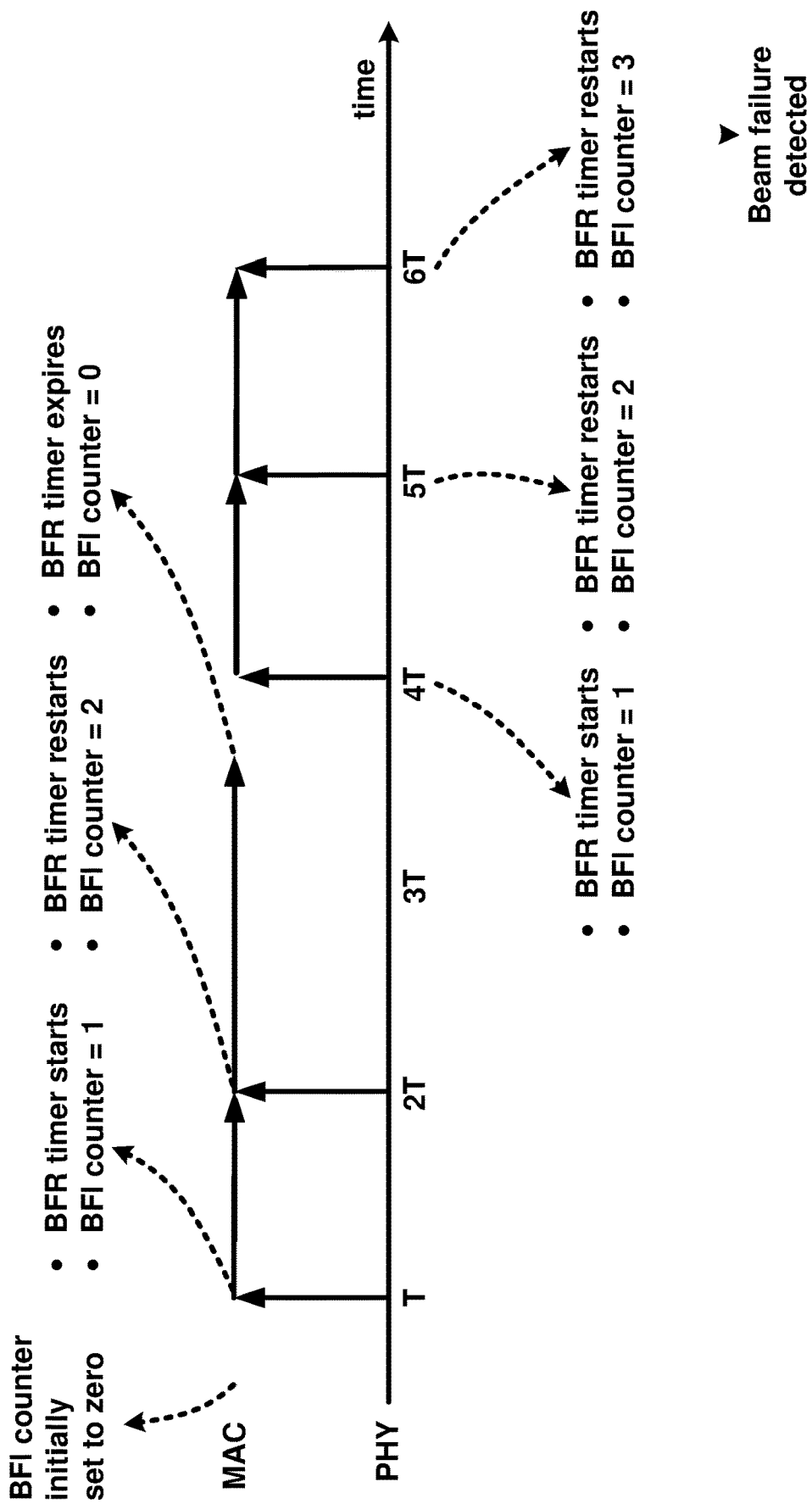
FIG. 16 illustrates an example diagram of a beam failure recovery mechanism.

FIG. 16 shows an example of a beam failure instance (BFI) indication. In an example, a wireless device may use at least one UE variable for a beam failure detection. In an example, BFI_COUNTER may be one of the at least one UE variable. The BFI_COUNTER may be a counter for a beam failure instance indication. The wireless device may set the BFI_COUNTER initially to zero.

In an example, a MAC entity of a wireless device may receive a beam failure instance (BFI) indication from a lower layer (e.g. PHY) of the wireless device. Based on the receiving the BFI indication, the MAC entity of the wireless device may start or restart the beamFailureDetectionTimer (e.g., BFR timer in FIG. 16). Based on the receiving the BFI indication, the MAC entity of the wireless device may increment BFI_COUNTER by one (e.g., at time T, 2T, 5T in FIG. 16).

In an example, the BFI_COUNTER may be equal to or greater than the beamFailureInstanceMaxCount. Based on the BFI_COUNTER being equal to or greater than the beamFailureInstanceMaxCount, the MAC entity of the wireless device may initiate a random-access procedure (e.g. on an SpCell) for a beam failure recovery.

In an example, in FIG. 16, the wireless device may initiate the random-access procedure at time 6T, when the BFI_COUNTER is equal to or greater than the beamFailureInstanceMaxCount (e.g., 3).

In an example, the wireless device may select an uplink carrier (e.g., SUL, NUL) to perform the random-access procedure for the beam failure recovery. In an example, the base station may configure an active uplink BWP of the selected uplink carrier with IE beamFailureRecoveryConfig. When the wireless device initiates the random-access procedure for the beam failure recovery, based on the active uplink BWP of the selected uplink carrier being configured with the IE beamFailureRecoveryConfig, the wireless device may start, if configured, the beamFailureRecoveryTimer. When the wireless device initiates the random-access procedure for the beam failure recovery, based on the active uplink BWP of the selected uplink carrier being configured with the IE beamFailureRecoveryConfig, the wireless device may apply one or more parameters (e.g., powerRampingStep, preambleReceivedTargetPower, and preambleTransMax) configured in the IE BeamFailureRecoveryConfig for the random-access procedure.

In an example, the base station may configure powerRampingStepHighPriority in the IE beamFailureRecoveryConfig. When the wireless device initiates the random-access procedure for the beam failure recovery and the active uplink BWP of the selected uplink carrier is configured with the IE beamFailureRecoveryConfig, based on the powerRampingStepHighPriority being configured in the IE beamFailureRecoveryConfig, the wireless device may set PREAMBLE_POWER_RAMPING_STEP to the powerRampingStepHighPriority.

In an example, the base station may not configure powerRampingStepHighPriority in the IE beamFailureRecoveryConfig. When the wireless device initiates the random-access procedure for the beam failure recovery and the active uplink BWP of the selected uplink carrier is configured with the IE beamFailureRecoveryConfig, based on the powerRampingStepHighPriority not being configured in the IE beamFailureRecoveryConfig, the wireless device may set PREAMBLE_POWER_RAMPING_STEP to the powerRampingStep.

In an example, the base station may configure scalingFactorBI in the IE beamFailureRecoveryConfig. When the wireless device initiates the random-access procedure for the beam failure recovery and the active uplink BWP of the selected uplink carrier is configured with the IE beamFailureRecoveryConfig, based on the scalingFactorBI being configured in the IE beamFailureRecoveryConfig, the wireless device may set SCALING_FACTOR_BI to the scalingFactorBI.

In an example, the base station may configure the active uplink BWP of the selected uplink carrier with the IE beamFailureRecoveryConfig. Based on the active uplink BWP of the selected uplink carrier being configured with the IE beamFailureRecoveryConfig, the random-access procedure may be a contention-free random-access procedure.

In an example, the base station may not configure the active uplink BWP of the selected uplink carrier with the IE beamFailureRecoveryConfig. Based on the active uplink BWP of the selected uplink carrier not being configured with the IE beamFailureRecoveryConfig, the random-access procedure may be a contention-based random-access procedure.

In an example, the beamFailureDetectionTimer may expire. Based on the beamFailureDetectionTimer expiring, the MAC entity of the wireless device may set the BFI_COUNTER to zero (e.g., in FIG. 16, between time 3T and 4T).

In an example, a base station may configure a wireless device with one or more first RSs (e.g., SS/PBCH block, CSI-RS, etc.) for a beam failure detection (e.g., by RadioLinkMonitoringRS in the IE RadioLinkMonitoringConfig). In an example, the base station may reconfigure the beamFailureDetectionTimer or the beamFailureInstanceMaxCount or at least one RS of the one or more first RSs by higher layers (e.g., RRC). Based on the reconfiguring, the MAC entity of the wireless device may set the BFI_COUNTER to zero.

In an example, the wireless device may complete the random-access procedure (e.g., contention-free random-access or contention-based random-access) for the beam failure recovery successfully. Based on the completing the random-access procedure successfully, the wireless device may determine/consider that the beam failure recovery is successfully completed.

In an example, the wireless device may complete the random-access procedure for the beam failure recovery successfully. Based on the completing the random-access procedure successfully, the wireless device may, if configured, stop the beamFailureRecoveryTimer. Based on the completing the random-access procedure successfully, the wireless device may set the BFI_COUNTER to zero.

In an example, the beamFailureRecovery Timer may be running. In an example, the base station may not configure the wireless device with the beamFailureRecoveryTimer. In an example, the base station may provide the wireless device with one or more second RSs (e.g., SS/PBCH blocks, periodic CSI-RSs, etc.) for a beam failure recovery by a higher layer parameter candidateBeamRSList in the IE beamFailureRecoveryConfig. 1n an example, the base station may provide the wireless device with one or more uplink resources (e.g., contention-free random-access resources) for a beam failure recovery request (BFRQ) used in the beam failure recovery by a higher layer (e.g., RRC) parameter (e.g., candidateBeamRSList, ssb-perRACH-Occasion, ra-ssb-OccasionMaskIndex in the IE beamFailureRecoveryConfig). An uplink resource of the one or more uplink resources may be associated with a candidate RS (e.g., SSB, CSI-RS) of the one or more second RSs. In an example, the association between the uplink resource and the candidate RS may be one-to-one.

In an example, at least one RS among the one or more second RSs may have a RSRP (e.g., SS-RSRP, CSI-RSRP) higher than a second threshold (e.g., rsrp-ThresholdSSB, rsrp-ThresholdCSI-RS). In an example, the wireless device may select a candidate RS among the at least one RS for the beam failure recovery.

In an example, the candidate RS may be a CSI-RS. In an example, there may be no ra-PreambleIndex associated with the candidate RS. Based on the candidate RS being the CSI-RS and no ra-PreambleIndex being associated with the candidate RS, the MAC entity of the wireless device may set PREAMBLE_INDEX to an ra-PreambleIndex. The ra-PreambleIndex may be associated/corresponding to an SSB in the one or more second RSs (e.g., indicated candidateBeamRSList). The SSB may be quasi-collocated with the candidate RS.

In an example, the candidate RS may be a CSI-RS and there may be ra-PreambleIndex associated with the candidate RS. In an example, the candidate RS may be an SSB. The MAC entity of the wireless device may set PREAMBLE_INDEX to a ra-PreambleIndex, associated/corresponding to the candidate RS, from a set of random-access preambles for the BFRQ. In an example, a higher layer (RRC) parameter may configure the set of random-access preambles for the BFRQ for the random-access procedure for the beam failure recovery.

In an example, a MAC entity of a wireless device may transmit an uplink signal (e.g., contention-free random-access preamble) for the BFRQ. Based on the transmitting the uplink signal, the MAC entity may start a response window (e.g., ra-ResponseWindow configured in the IE BeamFailureRecoveryConfig) at a first PDCCH occasion from the end of the transmitting the uplink signal. Based on the transmitting the uplink signal, the wireless device may, while the response window is running, monitor at least one PDCCH on a search space indicated by recoverySearchSpaceId (e.g. of an SpCell) for a DCI. The DCI may be identified by an RNTI (e.g., C-RNTI, MCS-C-RNTI) of the wireless device.

In an example, the MAC entity of the wireless device may receive, from a lower layer (e.g., PHY) of the wireless device, a notification of a reception of the DCI on the search space indicated by the recoverySearchSpaceId. In an example, the wireless device may receive the DCI on a serving cell. In an example, the wireless device may transmit the uplink signal via the serving cell. In an example, the DCI may be addressed to the RNTI (e.g., C-RNTI) of the wireless device. In an example, based on the receiving the notification and the DCI being addressed to the RNTI, the wireless device may determine/consider the random-access procedure being successfully completed.

In an example, the wireless device may transmit the uplink signal on an SpCell. In an example, the response window configured in the IE BeamFailureRecoveryConfig may expire. In an example, the wireless device may not receive a DCI (or a PDCCH transmission) addressed to the RNTI of the wireless device on the search space indicated by recoverySearchSpaceId on the serving cell (e.g., before the response window expires). Based on the response window expiring and not receiving the DCI, the wireless device may consider a reception of a random-access response (e.g., BFR response) unsuccessful. Based on the response window expiring and not receiving the DCI, the wireless device may increment a transmission counter (e.g., PREAMBLE_TRANSMISSION_COUNTER) by one. In an example, the transmission counter may be equal to preambleTransMax plus one. Based on the transmission counter being equal to the preambleTransMax plus one and transmitting the uplink signal on the SpCell, the wireless device may indicate a random-access problem to upper layers (e.g., RRC).

In an example, the MAC entity of the wireless device may stop the response window (and hence monitoring for the random access response) after successful reception of the random-access response (e.g., the DCI addressed to the RNTI of the wireless device, BFR response) in response to the random access response comprising a random access preamble identifier that matches the transmitted PREAMBLE_INDEX.

In an example, based on completion of a random-access procedure, a MAC entity of a wireless device may discard explicitly signaled contention-free random-access resources except one or more uplink resources (e.g., contention-free random-access resources) for BFRQ.

In an example, a base station may provide a wireless device, for a serving cell (e.g., primary cell, secondary cell), with a first set of resource configuration indexes (e.g., periodic CSI-RS resource configuration indexes) by a higher layer parameter failureDetectionResources. The first set of resource configuration indexes may indicate one or more first RSs (e.g., CSI-RS, SS/PBCH block, etc.). The base station may configure the higher layer parameter failureDetectionResources (e.g., beam recovery RSs) for a downlink BWP (of configured downlink BWPs) of the serving cell. In an example, the base station may provide the wireless device, for the serving cell, with a second set of resource configuration indexes (e.g., periodic CSI-RS resource configuration indexes, SS/PBCH block indexes) by a higher layer parameter candidateBeamRSList (e.g., candidate beam RSs). The second set of resource configuration indexes may indicate one or more second RSs (e.g., CSI-RS, SS/PBCH block, etc.). The base station may configure the higher layer parameter candidateBeamRSList (e.g., candidate beam RSs) for an uplink BWP (of configured uplink BWPs) of the serving cell. In an example, the wireless device may use the one or more first RSs and/or the one or more second RSs for radio link quality measurements on the serving cell.

In an example, a base station may not provide a wireless device with a higher layer parameter failureDetectionResources (e.g., beam recovery RSs). Based on not being provided with the higher layer parameter failureDetectionResources (e.g., beam recovery RSs), the wireless device may determine a first set of resource configuration indexes to include a resource configuration index (e.g., periodic CSI-RS resource configuration indexes). In an example, the resource configuration index may be same as an RS index in a RS set. In an example, the RS index may be indicated by a TCI (Transmission Configuration Indication) state (e.g., via a higher layer parameter TCI-state). In an example, the TCI state may be used for a control resource set (coreset) that the wireless device is configured to monitor at least one PDCCH. In an example, the base station may configure the TCI state for the coreset. In an example, the TCI state may comprise two RS indexes. Based on the TCI state comprising two RS indexes, the first set of resource configuration indexes may include an RS index, of the two RS indexes, with QCL-TypeD configuration. In an example, the base station may configure the TCI state for the coreset.

In an example, the wireless device may expect the first set of resource configuration indexes to include up to two RS indexes. The wireless device may expect a single port RS in the first set of resource configuration indexes. In an example, the one or more first RSs may comprise up to two RSs indicated by the two RS indexes.

In an example, a first threshold (e.g. Qout,LR) may correspond to a default value of higher layer parameter rlmInSyncOutOfSyncThreshold. In an example, a second threshold (e.g. Qin,LR) may correspond to a value provided by higher layer parameter rsrp-ThresholdSSB in the IE BeamFailureRecoveryConfig.

In an example, a physical layer in a wireless device may assess a first radio link quality of the one or more first RSs (or the first set of resource configuration indexes) against the first threshold. In an example, a first RS of the one or more first RSs may be associated (e.g. quasi co-located) with at least one DM-RS of a PDCCH monitored by the wireless device.

In an example, the wireless device may apply the second threshold to a first L1-RSRP measurement obtained from a SS/PBCH block of the one or more second RSs (or the second set of resource configuration indexes). In an example, the wireless device may apply the second threshold to a second L1-RSRP measurement obtained from a CSI-RS of the one or more second RSs (or the second set of resource configuration indexes) after scaling a reception power of the CSI-RS with a value provided by a higher layer parameter powerControlOffsetSS.

In an example, a wireless device may assess the first radio link quality of the one or more first RSs (indicated by the first set of resource configuration indexes). A physical layer in the wireless device may provide a BFI indication to a higher layer (e.g. MAC) of the wireless device when the first radio link quality is worse than the first threshold. In non-DRX mode operation, when the first radio link quality is worse than the first threshold, the physical layer may inform the higher layer with a first periodicity. The wireless device may determine the first periodicity by the maximum between a shortest periodicity among one or more periodicities of the one or more first RSs (e.g., resource configurations in the first set) and a first value (e.g. 2 msec). The first periodicity may be defined as max (the first value, TBFD-RS,M), where TBFD-RS,M is the shortest periodicity.

In an example, in DRX mode operation, when the first radio link quality is worse than the first threshold, the physical layer may inform the higher layer with a second periodicity. N an example, the base station may configure the wireless device with a DRX_cycle_length for the DRX mode operation. The wireless device may determine the second periodicity by max (**1.5\*DRX_cycle_length**, 1.5\*TBFD-RS,M) when the DRX_cycle_length is less than or equal to 320 ms. The wireless device may determine that the second periodicity is equal to the DRX_cycle_length when the DRX_cycle_length is greater than 320 ms.

In an example, based on a request from a higher layer (e.g. MAC) of the wireless device, the wireless device may provide to the higher layer one or more candidate RSs (e.g., the periodic CSI-RS configuration indexes, the SS/PBCH blocks indexes) from the one or more second RSs (e.g., the second set) and one or more L1-RSRP measurements. In an example, each candidate RS of the one or more candidate RSs may be associated with a L1-RSRP measurement of the one or more L1-RSRP measurements. In an example, the association may be one-to-one. In an example, the one or more L1-RSRP measurements associated with the one or more candidate RSs may be larger than or equal to the second threshold. In an example, the higher layer may select a candidate RS (e.g., periodic CSI-RS resource configuration, SS/PBCH block) among the one or more candidate RSs. In an example, the candidate RS may be identified by a first RS index of the second set of resource configuration indexes. In an example, the first RS index may indicate the candidate RS.

In an example, a wireless device may be provided/configured with a control resource set (coreset) through a link to a search space set. The coreset may be UE specific or dedicated to the wireless device or wireless device specific. In an example, the wireless device may monitor the coreset for a beam failure recovery. In an example, the base station may provide the wireless device with the search space set by a higher layer parameter recoverySearchSpaceId (e.g., BFR-SS) in the IE BeamFailureRecoveryConfig. The wireless device may monitor at least one PDCCH in the control resource set. The BFR-SS may be associated with a CORESET dedicated for a BFR (e.g., BFR-CORESET).

In an example, the base station may provide the wireless device with the higher layer parameter recoverySearchSpaceId (e.g., BFR-SS). Based on being provided with the higher layer parameter recoverySearchSpaceId, the wireless device may not expect to be provided with a second search space set for monitoring at least one PDCCH in the coreset. In an example, the coreset may be associated with the search space set provided by the higher layer parameter recoverySearchSpaceId. Based on the coreset being associated with the search space set provided by the higher layer parameter recoverySearchSpaceId, the wireless device may not expect that the coreset is associated with a second search space set.

In an example, the base station may provide the wireless device with a configuration for a transmission of an uplink signal (e.g., a PRACH transmission) by a higher layer parameter PRACH-ResourceDedicatedBFR in the IE BeamFailureRecoveryConfig. Based on the transmission of the uplink signal (e.g., the PRACH transmission) in a first slot (e.g., slot n) and, the wireless device, starting from a second slot (e.g., slot n+4), may monitor at least one PDCCH in a search space set (e.g., provided by the higher layer parameter recoverySearchSpaceId) for detection of a DCI format within a response window (e.g., ra-response-Window). In an example, the wireless device may monitor the at least one PDCCH in the search space set (or coreset) according to antenna port quasi co-location parameters associated with the candidate RS (provided by the higher layer). In an example, the response window may be configured by the IE BeamFailureRecoveryConfig. The DCI format may be configured with CRC scrambled by a RNTI (e.g., C-RNTI, MCS-C-RNTI).

In an example, when the wireless device monitors at least one PDCCH in the search space set (e.g., provided by the higher layer parameter recoverySearchSpaceId) and for a reception of corresponding PDSCH, the wireless device may assume that antenna port quasi-collocation parameters for the at least one PDCCH and the corresponding PDSCH are same as the candidate RS until the wireless device receives, by higher layers, an activation for a TCI state or a higher layer parameter TCI-StatesPDCCH-ToAddlist and/or a higher layer parameter TCI-StatesPDCCH-ToReleaseList. In an example, a DCI format received in the search space set while monitoring the at least one PDCCH may schedule the corresponding PDSCH.

In an example, after the wireless device detects the DCI format with CRC scrambled by the RNTI (e.g., C-RNTI or MCS-C-RNTI) in the search space set (e.g., provided by the higher layer parameter recoverySearchSpaceId), the wireless device may continue to monitor at least one PDCCH in the search space set until the wireless device receives an activation command (e.g., MAC CE) for a TCI state or a higher layer parameter TCI-StatesPDCCH-ToAddlist and/or a higher layer parameter TCI-StatesPDCCH-ToReleaseList.

In an example, the wireless device may perform the transmission of the uplink signal (e.g., PRACH transmission) on a serving cell (e.g., PCell, SCell). In an example, the wireless device may use a spatial filter for the transmission of the uplink signal (e.g., preamble transmission for the PRACH transmission). In an example, the wireless device may detect a DCI format, with CRC scrambled by the RNTI, in at least one PDCCH in the search space set (e.g., provided by the higher layer parameter recoverySearchSpaceId). In an example, after a first number of symbols (e.g., 28 symbols) from a last symbol of a reception of the at least one PDCCH, the wireless device may transmit a second uplink signal via PUCCH on the serving cell using the spatial filter used for the transmission of the uplink signal (e.g., the PRACH transmission) until the wireless device receives an activation command (e.g., MAC CE) for PUCCH-Spatialrelationinfo or is provided PUCCH-Spatialrelationinfo for PUCCH resource(s) for the serving cell.

In an example, after a first number of symbols (e.g., 28 symbols) from a last symbol of a reception of the at least one PDCCH, the wireless device may assume that antenna port quasi-collocation parameters for a coreset with index zero (e.g., Coreset 0) are same as the candidate RS for PDCCH monitoring in the coreset with index zero.

In an example, the base station may not provide the wireless device is with a higher layer parameter recoverySearchSpaceId. Based on not being provided with the higher layer parameter recoverySearchSpaceId, the wireless device may not initiate a contention-free random access procedure for a beam failure recovery. In an example, the wireless device may initiate a contention-based random-access procedure for a beam failure recovery based on not being provided with the higher layer parameter recoverySearchSpaceId.

In an example, a wireless device may assess a downlink link quality of a serving cell based on one or more first RSs (e.g., periodic CSI-RS, SSB, etc.) in the first set of resource configuration indexes to detect a beam failure instance (BFI).

A wireless device may estimate a first radio link quality for an RS of the one or more first RSs and compare the first radio link quality to a first threshold (Qout_LR) to access downlink radio link quality of the serving cell. The first threshold may be defined as a level at which a downlink radio level link may not be reliably received. In an example, the first threshold may correspond to a first percent (e.g., 10%) block error rate (BLER) of a hypothetical PDCCH transmission.

In an example, a wireless device may perform L1-RSRP measurements based on one or more second RSs (e.g., periodic CSI-RS, SSB, etc.) in the second set of resource configuration indexes in order to detect candidate beam (or candidate RS). An L1-RSRP measurement of the candidate beam (or candidate RS) may be better than a second threshold (e.g., indicated by higher layer parameter rsrp-ThresholdSSB, rsrp-ThresholdCSI-rs (rsrp-ThresholdSSB+powerControlOffsetSS). UE is not required to perform candidate beam detection outside the active DL BWP.

A wireless device may perform a L1-RSRP measurement for an RS of the one or more second RSs and compare the L1-RSRP measurement to the second threshold (rsrp-ThresholdSSB, rsrp-ThresholdCSI-rs) to select at least one candidate beam (or candidate RS) for a beam failure recovery.

In an example, a wireless device may be active on a first DL BWP of a serving cell. The first DL BWP may be an active DL BWP of the serving cell based on being active on the first DL BWP. In an example, the wireless device may not perform a beam failure detection outside the active DL BWP. In an example, the wireless device may not perform a candidate beam detection outside the active DL BWP. In an example, a second DL BWP of the serving cell may be deactivated. The wireless device may not perform a beam failure detection for the second DL BWP based on the second DL BWP being deactivated. The wireless device may not perform a candidate beam detection for the second DL BWP based on the second DL BWP being deactivated.

In an example, a wireless device may estimate a first radio link quality of a CSI-RS with a first subcarrier spacing (SCS) for a beam failure detection. In an example, a wireless device may estimate a second radio link quality of a SSB with a second subcarrier spacing (SCS) for a beam failure detection. In an example, the wireless device may not perform beam failure detection measurements based on the first SCS and the second SCS being different. In an example, the wireless device may not perform beam failure detection measurements based on the CSI-RS and the SSB being frequency division multiplexes (FDM-ed) in at least one symbol (e.g., OFDM).

Example of a BFR procedure.

Figure 17:
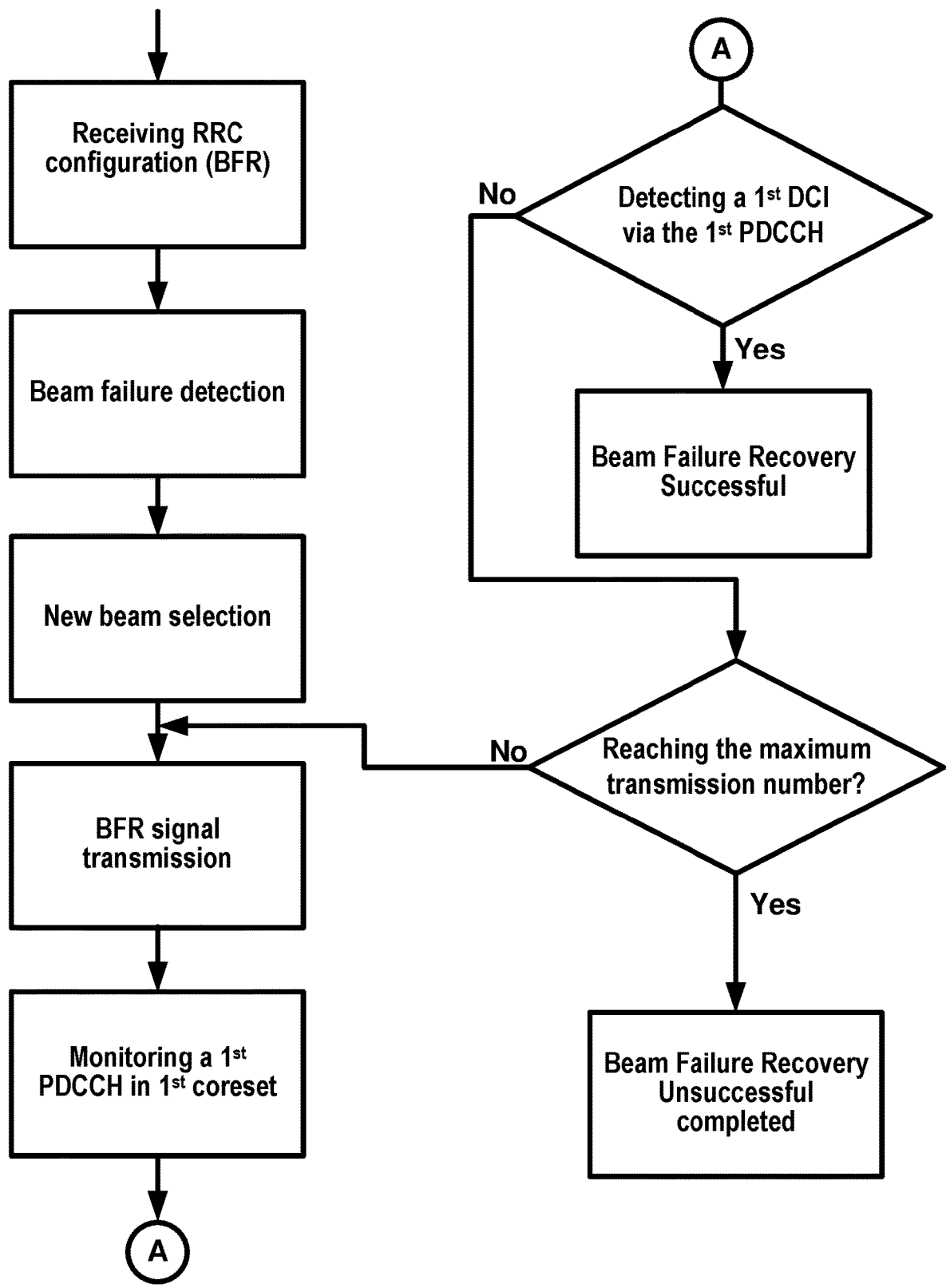
FIG. 17 is a flow diagram of an example beam failure recovery procedure.

FIG. 17 shows an example flowchart of a BFR procedure. A wireless device may receive one or more RRC messages comprising BFR parameters. The one or more RRC messages may comprise an RRC message (e.g. RRC connection reconfiguration message, or RRC connection reestablishment message, or RRC connection setup message). The wireless device may detect at least one beam failure according to at least one of BFR parameters. The wireless device may start a first timer if configured in response to detecting the at least one beam failure. The wireless device may select a selected beam (e.g., a new candidate beam) in response to detecting the at least one beam failure. The selected beam may be a beam with good channel quality (e.g., RSRP, SINR, or BLER) from a set of candidate beams. The candidate beams may be identified by a set of reference signals (e.g., SSBs, or CSI-RSs). The wireless device may transmit at least a first BFR signal to a gNB in response to the selecting/identifying the selected beam. The at least first BFR response may be associated with the selected beam (e.g., a TCI state of a BFR-CORESET is determined based on the selected beam or the new candidate beam reported by the wireless device during BFR procedure). The at least first BFR signal may be a preamble transmitted on a PRACH resource, or a beam failure recovery request (e.g., similar to scheduling request) signal transmitted on a PUCCH resource, or a beam indication (e.g., BFR MAC CE) transmitted on a PUSCH resource. At least when the first BFR signal is a preamble signal, the wireless device may determine a spatial TX filter of the PRACH based on the selected beam (e.g., the new candidate beam) for the recovery. For example, when the downlink and uplink beams are corresponding (e.g., the UE support beam correspondence capability), a PRACH occasion corresponding to the new candidate beam based on RACH occasion/configurations is selected. The wireless device may start a response window in response to transmitting the at least first BFR signal. In an example, the response window may be a timer with a value configured by the gNB. When the response window is running, the wireless device may monitor a PDCCH in a first coreset (e.g., UE specific or dedicated to the wireless device or wireless device specific). The first coreset may be associated with the BFR procedure. In an example, the wireless device may monitor the PDCCH in the first coreset in response to transmitting the at least first BFR signal. The wireless device may receive a first DCI via the PDCCH in the first coreset when the response window is running. The wireless device may consider the BFR procedure successfully completed when receiving the first DCI via the PDCCH in the first coreset before the response window expires. The wireless device may stop the first timer if configured in response to the BFR procedure successfully being completed. The wireless device may stop the response window in response to the BFR procedure successfully being completed.

In an example, when the response window expires where the wireless device may not have received a response (e.g., a scheduling DCI for the response), the wireless device may increment a transmission number. The transmission number will be set to zero (or initialized) at the BF is detected and/or after the BFR procedure is completed. Until the transmission number may reach a threshold, the wireless device may attempt multiple times of beam failure recovery procedure (e.g., RACH procedure). If the transmission number indicates a number less than the configured maximum transmission number, the wireless device may repeat one or more actions comprising at least one of: a BFR signal transmission; starting the response window; monitoring the PDCCH; incrementing the transmission number if no response is received when the response window is running. If the transmission number indicates a number equal or greater than the configured maximum transmission number, the wireless device may declare the BFR procedure is unsuccessfully completed.

In legacy systems, a wireless device may perform beam management for a cell, including a beam failure recovery procedure for the cell. The wireless device may perform measurements on one or more configured reference signals (corresponding to candidate beams) to identify a new candidate beam in response to triggering a beam failure recovery procedure for a cell. In legacy systems, the wireless device may receive one or more configurations of reference signals corresponding to candidate beams and measure the one or more configured reference signals for the cell. The wireless device may report a new candidate beam based on measurements of the configured reference signals.

With a single, new candidate beam selected and reported for the cell in legacy systems, one or more advanced scenarios may not be effectively supported. For example, a base station/gNB may operate one or more transmission and reception points (TRPs) in a cell (or a carrier or a frequency) to enhance performance (e.g., coverage, throughput, latency, etc.). In such a multi-TRP scenario, each TRP may have a same physical cell ID or may have different cell IDs. A wireless device may consider a single/same cell (e.g., PCell, sPCell, or SCell) across one or more TRPs when the TRPs are operating in the same frequency ranges/same cell/same carrier. With a multi-beam operation at each TRP, a first TRP may operate with a first plurality of beams and a second TRP may operate with a second plurality of beams. For example, a first beam, of the first plurality of beams, for the first TRP (e.g., a currently established beam to the first TRP, a beam with good signal quality for the first TRP) may be different from a second beam, of the second plurality of beams, for the second TRP (e.g., a currently established beam to the second TRP, a beam with good signal quality for the second TRP). Performing beam management, including a beam failure recovery procedure, for a TRP independently based on existing mechanisms may not be effective, particularly, when a multi-TRP scenario is applied to a PCell or a sPCell.

For example, a wireless device may trigger a RACH procedure in existing systems when a beam failure detection/declaration (BF) occurs. The wireless device may trigger the RACH procedure to initiate a beam failure recovery (BFR) procedure to recover the BF. To apply the approach to a multi-TRP scenario, a base station may need to configure separate PRACH resources and common search space(s) (CSS(s)) in each TRP. Configuration of PRACH resources and CSSs may lead to high overhead as resources for a plurality of beams for each TRP need to be configured. Additionally, this may require complexity increases in both the base station and a wireless device to support potentially simultaneous RACH procedures in a frequency/in a cell. Existing implementation of the wireless device may support a single RACH procedure for the cell. In a different example, applying a BFR only for a primary TRP may lead to long latency in recovering a beam failure of a secondary TRP. This may lead to unnecessary interruption time at a wireless device while the secondary TRP is still available. There is a need to enhance existing BFR procedures in multi-TRP scenarios to reduce overhead, latency, and/or interruption time.

Utilizing a non-RACH based mechanism for a BFR may reduce the PRACH overhead and the overall latency in BFR recovery. For example, in a multi-TRP scenario with a first and second TRP, a BFR of the second TRP may be triggered/transmitted/informed/indicated via the first TRP when the first TRP may have one or more valid beams (e.g., when the second TRP has the one or more beams with sufficient channel quality as measured by, e.g., L1-RSRP, L1-SINR, etc.). In an embodiment, a wireless device may perform an independent beam management and/or beam failure recovery procedure for a TRP of a cell without requiring an additional RACH procedure.

For example, a BFR of a first TRP may be triggered/transmitted/informed/indicated via a second TRP when the second TRP has one or more valid beams. As the second TRP has the one or more valid beams, the wireless device may transmit a BFR request and/or new candidate beam information of the first TRP via a regular PUSCH, based on a beam of the one or more beams, of the second TRP, via a PUCCH, based on a beam of the one or more beams, of the second TRP, and/or via a dedicated SR resource, based on a beam of the one or more beams, of the second TRP.

For example, a second BFR of the second TRP may be triggered/transmitted/informed/indicated via the first TRP when the first TRP has one or more valid beams. As the first TRP has the one or more valid beams, the wireless device may transmit the second BFR request and/or new candidate beam information of the second TRP via a regular PUSCH, based on a beam of the one or more beams, of the first TRP, via a PUCCH, based on a beam of the one or more beams, of the first TRP, and/or via a dedicated SR resource, based on a beam of the one or more beams, of the first TRP. A RACH-based BFR may be triggered by the wireless device in detecting a first BFR on the first TRP and a second BFR on the second TRP. The RACH-based BFR may be triggered when both TRPs may not have beams with good signal quality.

For example, the wireless device may send the second BFR request via MAC CEs in a PUSCH to the first TRP. For example, the wireless device may send the second BFR request via one or more SR resources of the first TRP. A base station may transmit an uplink grant in response to receiving the one or more SR resources comprising the second BFR request. The wireless device may transmit one or more candidate beams for the recovery in response to receiving an uplink grant. This procedure may be applied to a secondary cell of the wireless device, wherein the wireless device may be configured with a single TRP for the secondary cell. The wireless device may support a beam failure recovery procedure of a multi-TRP scenario of a single cell and the beam failure recovery procedure of a single TRP of a secondary cell. This may reduce complexity to support various scenarios. Enhancements in a BFR for a multi-TRP scenario may support a fast beam recovery of each TRP without additional resource allocations for supporting multiple BFR procedures.

Figure 18:
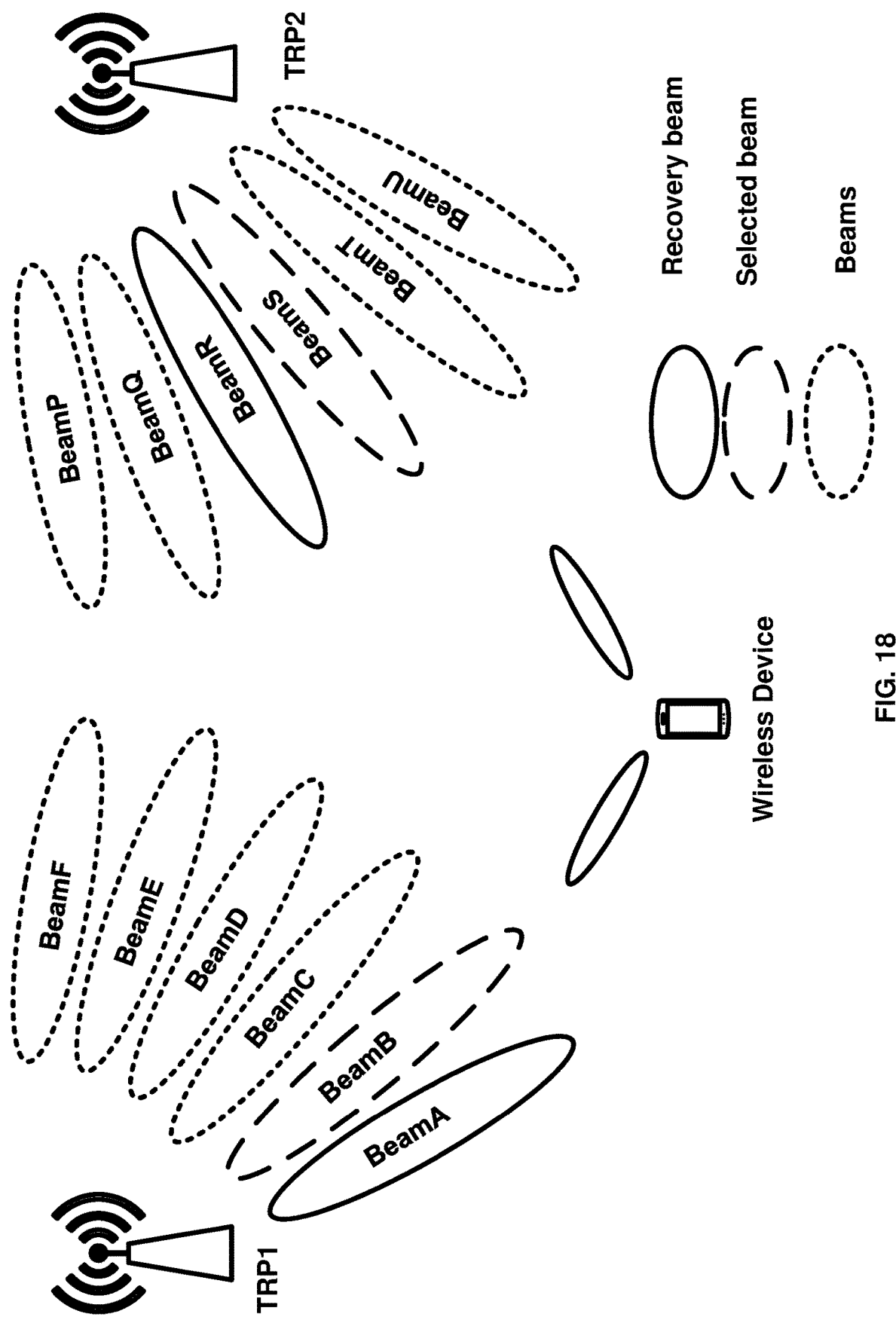
FIG. 18 is a diagram of an example multi-TRP scenario.

FIG. 18 illustrates an example of a multi-TRP scenario. A wireless device may be associated/served with/by a first TRP (TRP1) and a second TRP (TRP2) where the first TRP and the second TRP are associated with a same cell (e.g., PCell, sPCell, or SCell) and/or a carrier/frequency layer. The first TRP may operate beamA, beamB, . . . , beam E shown emanating from the first TRP. The second TRP may operate beamP, beamQ, . . . , beamU shown emanating from the second TR. The wireless device may identify a first selected beam (e.g., beam B) for the first TRP. and a second selected beam (e.g., beamS) for the second TRP based on the measurements. The wireless device may use a first set of RX parameters (e.g., RX beam) for the first selected beam, and use a second set of RX parameters for the second selected beam. Depending on a UE capability, the wireless device may need to switch the first RX parameter and the second RX parameter and apply one at a given time. A base station may configure one or more first reference signals to a wireless device corresponding to first failure detection beams for the first TRP (e.g., beamA and beam B for TRP1). The base station may configure one or more second reference signals to the wireless device corresponding to second failure detection beams for the second TRP (e.g., beamR and beamS for TRP2).

In an example, a wireless device may support more than two beam failure detection reference signals (e.g., failure-DetectionResources, beam recovery reference signals) when the wireless device may support a multi-TRP operation in a cell. In an example, when a wireless device may have a limited capability in terms of a number of beam failure detection reference signals, the number of beam failure detection reference signals may be configured across multi-TRPs. For example, when the wireless device may support up to two beam failure detection reference signals, the base station may configure a first reference signal from one or more first reference signals of the first TRP and a second reference signal from one or more second reference signals of the second TRP. For example, a reference signal may be associated with a beam. For example, a beam is represented as a transmission configuration indicator (TCI) state. A TCI state may comprise a reference signal, where the reference signal may be a CSI-RS or an SSB (synchronization signal block and PBCH). The wireless device may determine/declare/detect a beam failure of the first TRP, wherein a signal quality of the one or more first reference signals becomes lower than a threshold.

Figure 19:
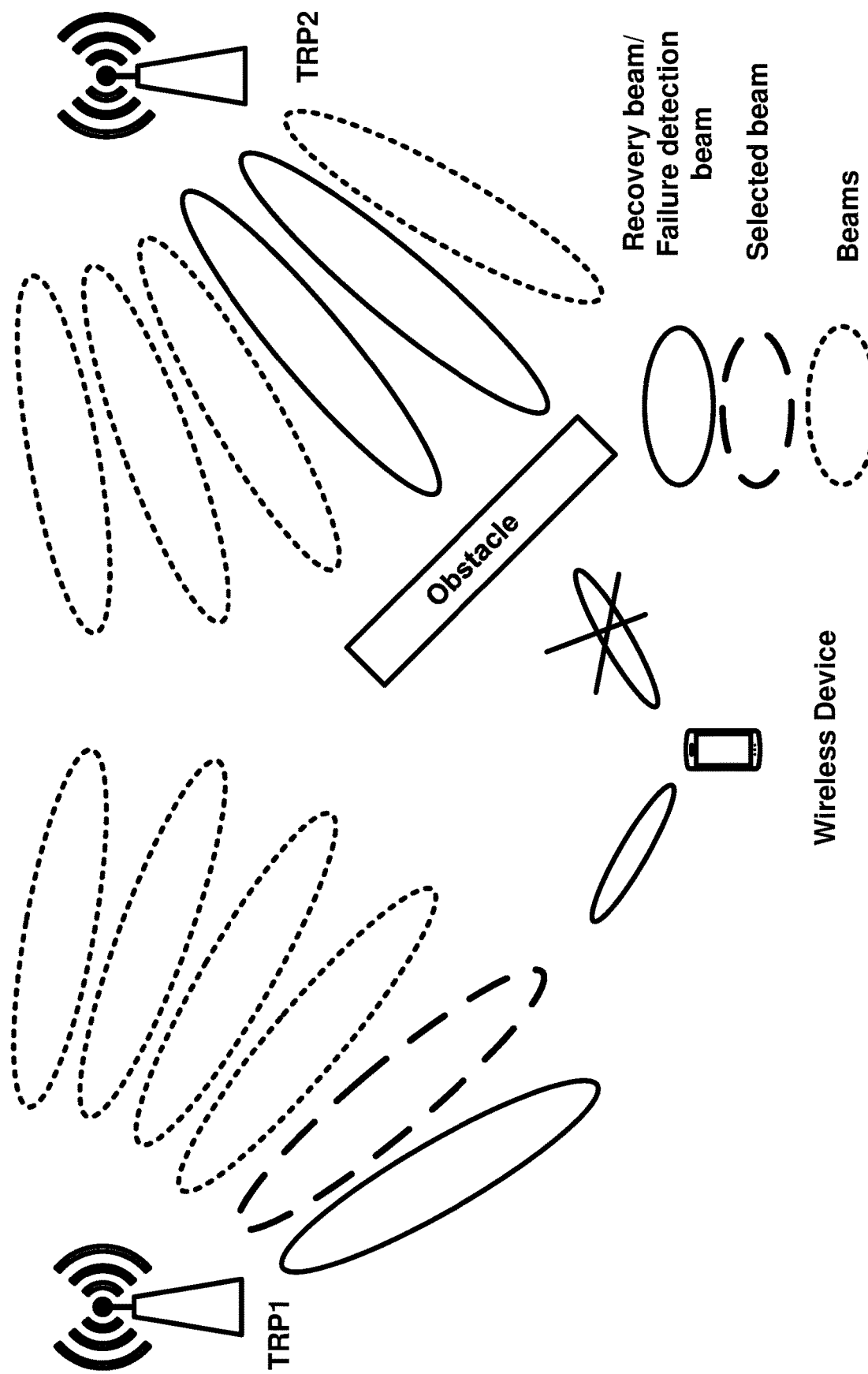
FIG. 19 illustrates an example beam failure in a TRP in a multi-TRP scenario.

In an example, a wireless device may be configured with one or more first candidate reference signals associated with beamC, beamD, beam E and/or beam F for the first TRP. The wireless device may be configured with one or more second candidate reference signals associated with and beamP, beamQ, beamT, and beamU for the second TRP. The base station may configure the one or more first reference signals and the one or more second reference signals among available beams not comprising failure detection reference signals/beams. In response to identifying/detecting a beam failure of the first TRP. the wireless device may perform measurements on the one or more first candidate reference signals/beams to identify a new candidate beam which may be used as a new selected beam for the first TRP. In an example, a wireless device may experience a first condition where the channel qualities of the one or more first reference signals of the first TRP are lower than a first threshold used to determine a beam failure of the first TRP, while the channel qualities of the one or more second references signals of the second TRP are above a threshold used to determine a beam failure of the second TRP. In an example, opposite case may occur. With physical separation between two TRPs and/or different channel conditions between the wireless device and the first TRP and the wireless device and the second TRP, the wireless device may experience low qualities for the second TRP while observing good qualities for the first TRP. As illustrated in FIG. 19, the wireless device may have different channel conditions between the first TRP and the wireless device and the second TRP and the wireless device. For a beam management and recovery procedure, this aspect needs to be taken into account.

A transmission and reception points (TRP) may be differently handled from a cell. A wireless device may be associated/served by one or more TRPs operating in a carrier or a cell. The one or more TRPs of the carrier or the cell may have the same cell ID or may have different cell ID. In an example, a wireless device may receive one or more RRC messages, MAC-CE commands, and/or DCIs to activate one or more TRPs in a cell where the cell may be configured/activated to the wireless device as PCell, SPCell, or SCell. In an example, the wireless device may receive an activation of a first TRP and a second TRP from a base station where the first TRP and the second TRP are operating on a carrier frequency of a cell X. A physical cell ID of the first TRP and that of the second TRP may be same or may be different. In an example, the cell X may be a PCell, sPCell or SCell. In an example, a wireless device may expect to receive a transport block (TB) associated with a HARQ process including initial transmissions and retransmissions from the cell X. In the example, the wireless device may expect to receive a PDSCH for the TB associated with the HARQ process from the first TRP and/or the second TRP from the cell X. For example, the base station may configure one or more first HARQ processes to the first TRP. The base station may configure one or more second HARQ processes to the second TRP, wherein the one or more first HARQ processes may not comprise the one or more second HARQ processes. In an example, at least when a physical cell ID of the first TRP is different from that of the second TRP, the wireless device may receive a DCI from a first CORESET (e.g., CORESET#0) of the cell X via the first TRP.

A TRP may be differently handled from a BWP. In an example, a first numerology of the first TRP and a second numerology of the second TRP of the cell X may be same at a time. In an example, a first active frequency region (e.g., BW and starting and ending PRBs) of the first TRP and a second active frequency region the second TRP may be same at the time. In an example, a first BWP of a cell Y and a second BWP of the cell Y, wherein the first BWP and the second BWP are active in parallel, may or may not have same numerology and may or may not have same frequency region. For example, the first BWP of the cell Y may operate in a different frequency region with a different numerology from the second BWP of the cell in a time. In an example, a wireless device may expect to receive a transport block (TB) associated with a first HARQ process including initial transmissions and retransmissions from the first BWP of the cell Y. In an example, a wireless device may expect to receive a transport block (TB) associated with a second HARQ process including initial transmissions and retransmissions from the second BWP of the cell Y.

Different TRPs may provide different sets of beams to a wireless device. A BWP is a set of contiguous resource blocks in the frequency domain. When a wireless device is associated with one or more BWPs at a time, each BWP may have similar properties in terms of supporting beams/TCIs. A wireless device may be configured with different sets of TCIs per each BWP, particularly when different use cases are associated with different BWPs. For example, an URLLC service may require higher subcarrier spacing (e.g., 60 kHz) for a low latency and an eMBB service may require lower subcarrier spacing (e.g., 15 kHz) for better management. The wireless device may experience similar channel conditions across multiple active BWPs, and a single beam management and beam failure recovery procedure across multiple active BWPs may be beneficial to a UE.

In an example, a wireless device may have a limited capability in terms of a number (e.g., two) of beam recovery reference signals (RSs). A base station may configure one or more beam recovery reference signals for a first TRP. In an example, a base station may not configure a CORESET associated with a second TRP. The base station may not configure one or more beam recovery reference signals on the second TRP. The wireless device may not perform measurements for a beam failure detection with no reference signals available. In an example, a wireless device may share capabilities of beam measurements across cells. For example, the wireless device may support M (e.g., M=2) beam recovery reference signals for a cell up to K cells (e.g., M*K beam recovery RSs). When the wireless device is activated with only K−1 cells, the wireless device may utilize the non-activated K-th cell capability for a second TRP from one of the activated K−1 cells. In an example, the wireless device may be activated with K cells. The wireless device may not support more than one TRP per cell in that case. In an example, a base station may configure M (e.g., M=2) beam recovery reference signals associated with a first TRP. The base station may not configure one or more second beam recovery reference signals associated with a second TRP as M RSs are configured for the first TRP. The wireless device may assume that a beam failure recovery procedure is activated only for the first TRP. The wireless device may not perform a beam failure related procedure such as beam measurement and/or a beam failure recovery process for the second TRP.

In an example, the TRP is a primary TRP. In an example, a base station may configure one or more beam recovery reference signals for a cell, regardless whether the cell is associated with a single TRP or a plurality of TRPs. For example, the base station may configure 'primary TRP only beam failure recovery' option. The wireless device may perform a beam failure recovery procedure and a beam management procedure only for the first TRP. For example, the base station may not transmit a RRC message comprising the one or more beam recovery RSs. The wireless device may use one or more reference signals of active TCI states associated with one or more CORESETs of an active BWP of the cell. In such case, the wireless device may determine the one or more CORESETs of the active BWP of the cell, wherein the one or more CORESETs are associated with the first TRP. For example, the wireless device may determine a CORESET is associated with the first TRP based on an active TCI state associated with the CORESET, wherein the active TCI state may indicate a beam associated with the first TRP. For example, the wireless device may determine the one or more CORESETs based on a group index (e.g., the group index=0) of a CORESET. For example, the one or more CORESETs may have the group index of zero or a first index. For example, the one or more CORESETs may be associated with a first CORESET group where a CORESET group index would be zero.

In an example, a wireless device may not perform a beam management and/or a beam failure recovery procedure for additional TRP (e.g., a second TRP) except for a primary TRP (e.g., a first TRP) on a cell. For example, a wireless device may be configured with a first TRP and a second TRP of a cell (e.g., a PCell or a SPCell). The wireless device may monitor/measure one or more beam recovery reference signals (e.g., failureDetectionResources, beam failure RSs, RSs associated with failure detection beams) for the first TRP only. The wireless device may determine/declare a beam failure based on the measurement of the one or more beam recovery RSs. The wireless device may trigger a beam failure recovery process in response to detecting the beam failure for the first TRP. The wireless device may not be configured with a beam recovery procedure for the second TRP. The wireless device may not perform measurement for the beam recovery procedure corresponding o the second TRP.

FIG. 19 illustrates an example of embodiments. For example, the wireless device is configured with TRP1 (e.g., a primary TRP) and TRP2 (e.g., a secondary TRP) on a cell. The wireless device may initiate a beam failure recovery procedure for the first/primary TRP (e.g., TRP1) and may not perform a beam management or a beam recovery procedure for the second/secondary TRP(s). For example, the primary TRP of a cell may be defined as a TRP which is first activated TRP for the cell. For example, the primary TRP may be defined as a TRP with a cell ID which is the same as the cell ID identified via a cell search on the frequency (e.g., based on a cell ID of cell-defining SSB). For example, the primary TRP may be defined as a TRP with a same cell ID as a cell where the TRP is associated. For example, the primary TRP may be explicitly indicated by the network based on a TRP index (e.g., TRP index=0) or based on a CORESET group index (e.g., a CORESET group index=0). When a wireless device may support multiple TRPs for a cell/frequency/carrier, if there is no TRP index or CORESET group index, the wireless device may assume that the TRP index or CORESET group index is set to zero for the corresponding configurations. To support this approach, a wireless device may be configured with one or more beam recovery reference signals for a primary TRP. When a wireless device does not receive a configuration of one or more beam recovery reference signals, the wireless device may utilize one or more reference signals associated with one or more CORESETs associated with the primary TRP only. This approach may be beneficial in terms of a UE complexity as the complexity would not be increased regardless of the number of TRPs supported. When a beam failure occurs on the primary TRP, a base station may deactivate the second TRP regardless of a beam status of the second TRP. The base station may reactivate second TRP based on completing the beam recovery procedure.

In an example, a wireless device may be configured with one or more beam recovery reference signals for the primary TRP. The wireless device may be configured with one or more first candidate beam reference signals for the first TRP and one or more second candidate beam reference signals for the second TRP. The first TRP and the second TRP may be associated with a cell. When a beam failure recovery procedure is triggered only for primary TRP, the wireless device may perform beam measurement on both TRPs based on the one or more first candidate beam reference signals and the one or more second candidate beam reference signals. The wireless device may inform a first new candidate beam for the first TRP and a second new candidate beam for the second TRP where the first new candidate beam is a beam/RS from the one or more first candidate beam reference signals with a good quality and the second new candidate beam is a beam/RS from the one or more second candidate beam reference signals with a good quality. The wireless device may inform/indicate/transmit the first new candidate beam via identifying a RACH resource with a corresponding beam to the first new candidate beam and transmitting a PRACH via the RACH resource, wherein the cell is a primary cell of a group (e.g., PCell, SPCell, PUCCH Cell).

The wireless device may inform/indicate/transmit the first new candidate beam via a PUSCH comprising one or more MAC CEs and/or uplink control information (UCI), wherein the first new candidate beam may be carried over the one or more MAC CEs and/or the UCI. The wireless device may transmit a SR to a base station via a primary cell. In response to receiving the SR, a base station may schedule an uplink grant to schedule the PUSCH. The wireless device may transmit the first new candidate beam via the PUSCH, wherein the cell is a secondary cell. The wireless device may inform the second new candidate beam of the second TRP via a PUSCH (e.g., a Msg3 PUSCH or a UL-grant PUSCH or configured grant PUSCH via MAC-CE or uplink control information (UCI)). The wireless device may transmit the second new candidate beam of the second TRP via the PUSCH, wherein the cell is a primary cell or a secondary cell. The wireless device may transmit a SR via one or more SR resources of the first TRP, wherein the cell is the primary cell, to indicate the second new candidate beam. The base station may schedule an uplink grant for scheduling the PUSCH in response to receiving the SR via the one or more SR resources of the first TRP. The wireless device may transmit a SR resource of one or more second SR resources of a primary cell, wherein the cell is the secondary cell. The base station may transmit an uplink grant for scheduling the PUSCH in response to receiving the SR via the one or more second SR resources.

A wireless device may be configured with one or more first beam recovery reference signals for a first TRP and one or more second beam recovery reference signals for a second TRP of a cell. The wireless device may perform a first beam measurement for the first TRP based on the one or more first beam recovery reference signals. The wireless device may perform a second beam measurement for the second TRP based on the one or more second beam recovery reference signals. In response to detecting a number of beam failure incidents, based on the second beam measurement, reaching a beam failure instance max counter configured/indicated for the second TRP, the wireless device may detect a beam failure of the second TRP. In response to the beam failure, the wireless device may deactivate the second TRP instead of triggering a beam recovery procedure for the second TRP. The wireless device may not initiate a beam failure recovery procedure for the second TRP. In response to detecting a number of beam failure incidents, based on the first beam measurement, reaching a first beam failure instance max counter configured/indicated for the first TRP, the wireless device may detect a beam failure of the first TRP. In response to the beam failure, the wireless device may initiate/trigger a beam failure recovery for the first TRP.

A wireless device supporting a multi-TRP scenario may share UE capabilities supporting one or more TRPs across a single or multiple TRPs. When the wireless device is serviced by a single TRP of a cell, the wireless device may reuse one or more additional capabilities (e.g., the increased number of blind decoding, the number of configured CORESETs, the number of DCIs in a slot, etc.) for supporting a multi-TRP in a cell. For example, more blind decoding and channel estimation capabilities may be added to the first TRP. The wireless device may report the deactivation status of the second TRP in response to the deactivating the second TRP. A base station may configure and/or activate a third TRP to a wireless device based on receiving a report on the deactivated second TRP. The base station may use measurement results such as L1-RSRPs, L3-RSRPs, L1-SINRs, or L3-SINRs and/or the like to configure one or more TCI states on the third TRP in configuring and/or activating the third TRP. The third TRP may or may not be the same as the second TRP.

One or more embodiments presented in the specification for a beam failure management/recovery procedure including a beam measurement may be extended to support a radio link monitoring (RLM) at least for a primary cell of a group (e.g., a PCell or a SPCell). For example, a base station may configure a RLM on a first TRP only, wherein the base station may configure one or more reference signals of the first TRP for the RLM measurement, wherein the primary cell is configure with a plurality of TRPs comprising the first TRP. When a wireless device may utilize one or more reference signals associated with one or more CORESETs, the wireless device may utilize only reference signals associated with CORESETs associated with the primary TRP. For example, the base station may configure one or more first reference signals for the first TRP and one or more second reference signals for a second TRP of the primary cell. The wireless device may perform a first RLM based on the one or more first reference signals for the first TRP. The wireless device may perform a second RLM based on the one or more second reference signals for the second TRP. The wireless device may indicate a radio link failure of the second TRP via the first TRP. The wireless device may declare a RLF of the group in response to detecting a radio link failure of the first TRP.

In an example, a wireless device may be associated with one or more TRPs for a cell. The wireless device may trigger a beam failure recovery when the one or more TRPs fail in the beam management procedure and/or detect beam failure. The wireless device may detect a beam failure of the cell, in response to detect one or more beam failure indications based on the beam measurement of one or more reference signals of the one or more TRPs. For example, the wireless device may be configured with one or more beam recovery reference signals on the cell regardless of the number of TRPs activated/associated with the cell. The wireless device may perform a single beam management procedure and a single beam failure recovery procedure for the cell based on the configured one or more beam recovery reference signals. The wireless device may perform a single beam management procedure and a single beam failure recovery procedure for the cell based on one or more reference signals that are reference signals of one or more (active) TCI states associated with one or more CORESETs configured for the cell regardless of whether the one or more CORESETs are serviced by a first TRP of the one or more TRPs or a second TRP of the one or more TRPs. When the wireless device is configured with CORESETs from both the first TRP and the second TRP, the beam failure incidents may occur when both TRPs fail. The wireless device may detect a beam failure based on the beam failure incidents. For example, the wireless device may trigger a beam failure recovery, in response to the detecting the beam failure, by initiating a RACH procedure when the cell is a PCell or a sPCell. For example, the wireless device may send a beam failure recovery request message and/or a feedback on one or more new candidate beams via a PUSCH (e.g., MAC-CE carried over the PUSCH, UCI piggybacked on the PUSCH) when a beam failure recovery procedure occurs in a SCell. The wireless device may initiate sending a SR for transmitting a BSR (when MAC-CE is used) or a dedicated SR for triggering a beam failure recovery.

A wireless device may be configured with a set of candidate beam reference signals for a primary or first TRP. The wireless device may report a beam with a good quality as a new candidate beam (e.g., a best beam as determined based on channel measurements) for the primary or first TRP. The wireless device may deactivate one or more secondary TRPs (or one or more second TRPs) as the wireless device may not be able to report a beam with a good quality (e.g., a new candidate beam) for a secondary or a second TRP. In an example, a wireless device may be configured with one or more first candidate beam reference signals for a primary TRP of a cell, and one or more second candidate beam reference signals for a secondary TRP of the cell. For the first TRP, the wireless device may select a first beam with a good quality (e.g., a first new candidate beam, a first best beam) based on measurements on the one or more first candidate beam reference signals. For the second TRP, the wireless device may select a second beam with a good quality (e.g., a second new candidate beam, a second best beam) based on measurements on the one or more second candidate beam reference signals. The wireless device may report a list of pairs {a new candidate beam, TRP index} for the cell. For example, the wireless device may report {the first candidate beam, the first TRP index} for the first TRP. The wireless device may report {the second candidate beam, the second TRP index} for the second TRP. The wireless device may indicate a TRP index in the report of a candidate beam. A base station, in response to the receiving the report, may perform a beam recovery of the indicated TRP based on the indicated candidate beam. In reporting a new beam, the wireless device may need to report a TRP index (or a CORESET group ID, or a TCI group index, etc.). In an example, a TRP may be defined by a CORESET group where a first CORESET group (e.g., a CORESET group index=0) may correspond to a first TRP and a second CORESET group (e.g., a CORESET group index=1) may correspond to a second TRP. In an example, a TRP may be defined by a TCI state group index where a first TRP may correspond to a first TCI state group and a second TRP may correspond to a second TCI state group.

Figure 20:
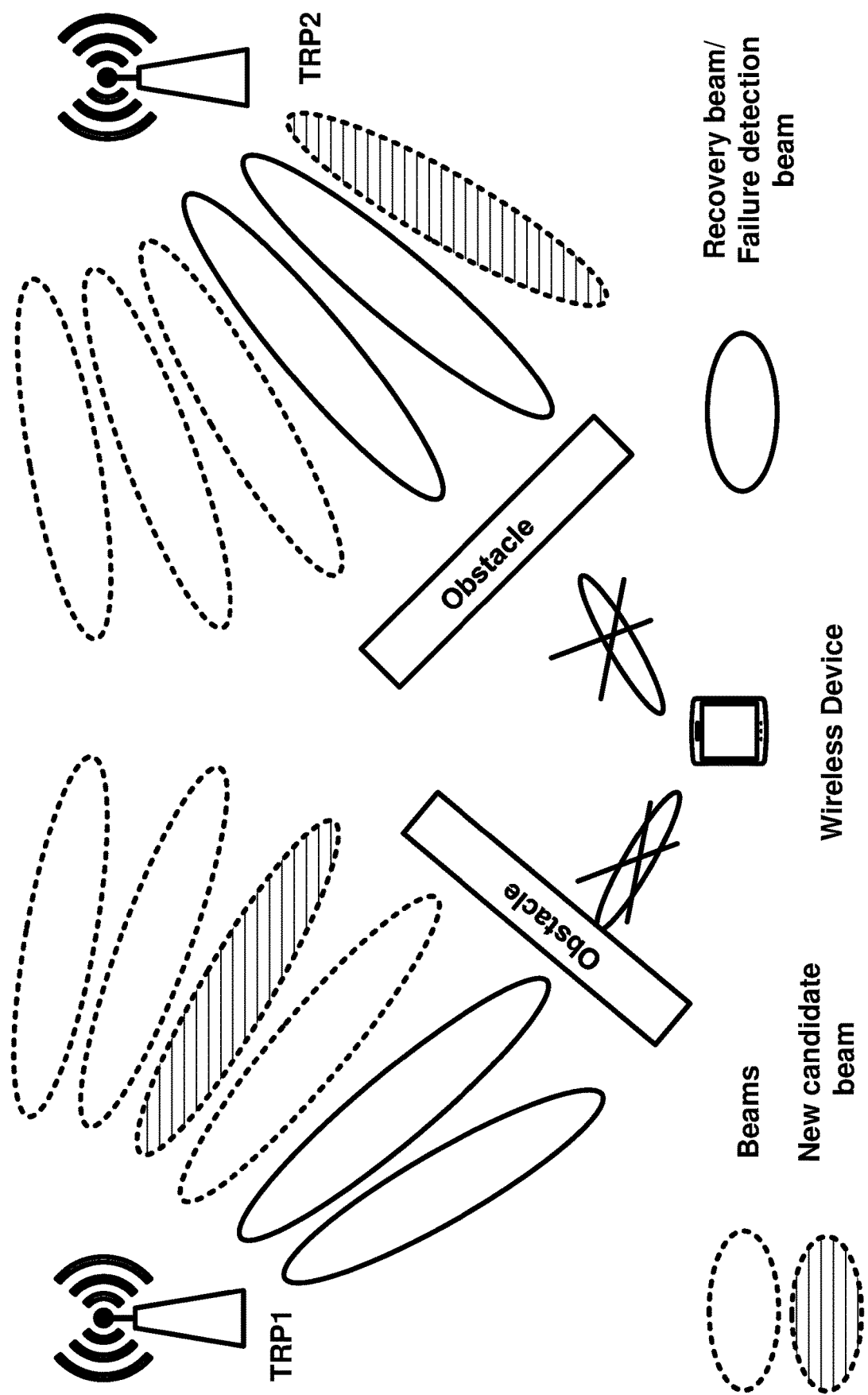
FIG. 20 illustrates an example a beam failure in a TRP in a multi-TRP scenario.

FIG. 20 illustrates an example of embodiments, wherein a wireless device may trigger a BFR when both TRPs fail. For example, the base station may operate six beams from a first TRP of a cell and six beams from a second TRP of the cell. The wireless device may detect a beam failure (BF) based on a plurality of recovery beams/failure detection resources/failure detection beams shown in solid lines in FIG. 20. The wireless device may determine the BF for the cell in response to signal qualities of the plurality of recovery beams/failure detection resources/failure detection beams become lower than a threshold (e.g., the recovery RSs show poor link qualities). The wireless device may trigger a BFR process via transmitting a PRACH to the base station (e.g., via the first TRP). The base station, based on the PRACH, may determine a first new candidate beam for the wireless device. For example, the first new candidate beam is a new candidate beam of the first TRP. The base station may transmit a confirmation via a BFR CORESET/SS to complete the BFR. The base station may additionally schedule an uplink PUSCH. The wireless device may send a second new candidate beam of the second TRP during a beam recovery procedure in addition to a new candidate beam information of a first TRP. The wireless device may send the second new candidate beam of the second TRP via the scheduled uplink PUSCH. For example, the wireless device may transmit one or more MAC CEs comprising the second new candidate beam.

In an example, the cell is a secondary cell. The wireless device may trigger/transmit a dedicated scheduling request for the cell in response to the detection of the BF of the cell. The base station may transmit an UL grant scheduling a PUSCH. The wireless device may transmit one or more second MAC CEs comprising the first new candidate beam for the first TRP and the second new candidate beam for the second TRP via the PUSCH. In FIG. 20, beams with lined filled may represent candidate beams of TRPs. The base station and the wireless device may recover the candidate beams for the both TRPs during/through/after the beam recovery process.

In an example, the wireless device may deactivate a second TRP (TRP2) in response to triggering a BFR on a cell associated with a first TRP and the second TRP. A base station may recover the BFR of the cell. For example, the wireless device may transmit a new candidate beam for the first TRP. After the beam recovery procedure, the base station may activate a third TRP for the cell. The third TRP may be the same to the second TRP or different from the second TRP.

Figure 21:
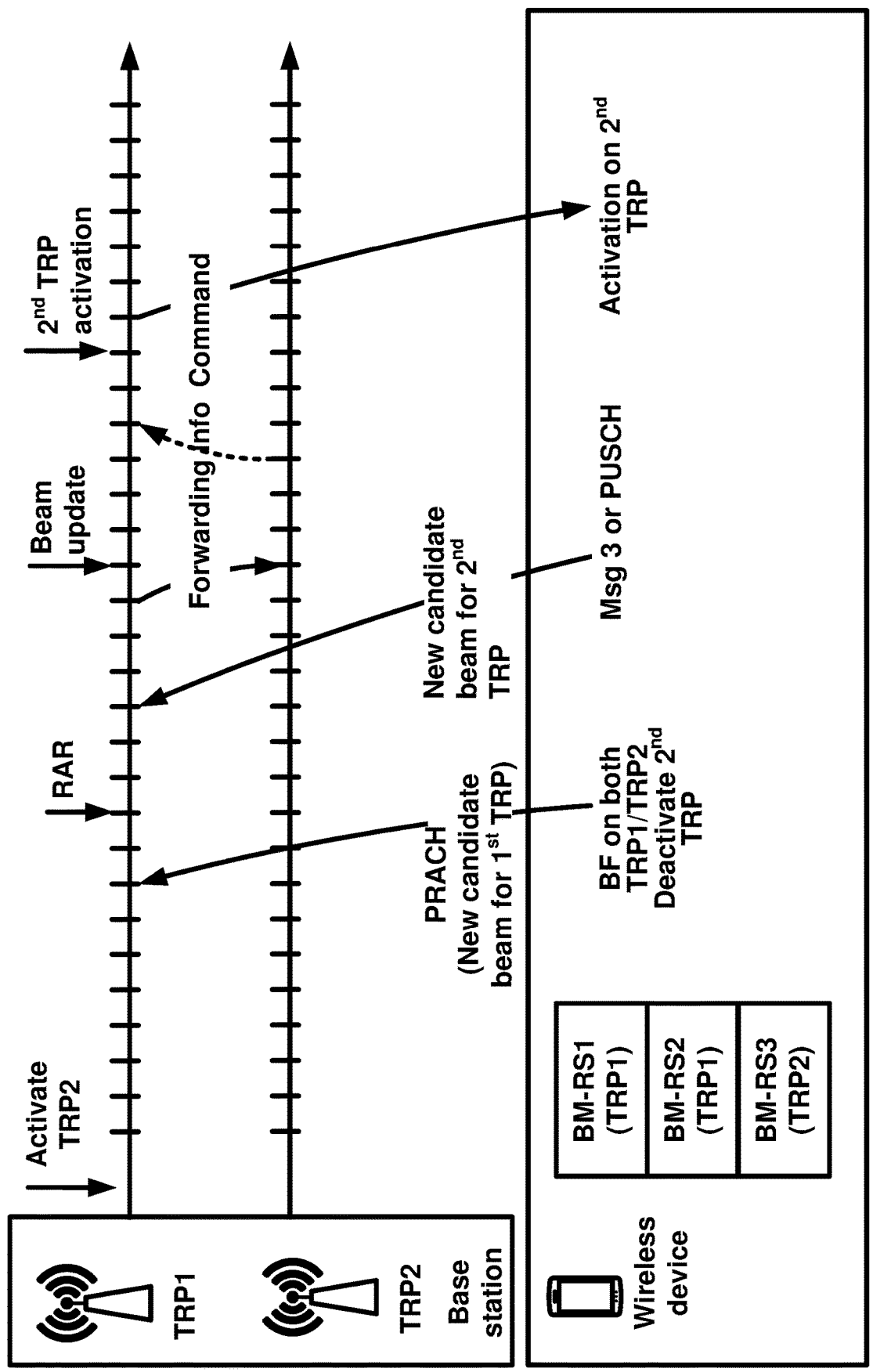
FIG. 21 illustrates an example embodiment of a beam failure recovery procedure.

FIG. 21 shows an example of embodiments, wherein a wireless device may perform independent beam management for a first TRP of a cell and a second TRP of the cell. For example, the cell is a primary cell of a group (e.g., PCell, SPCell). The wireless device may be configured with one or more first recovery reference signals for the first TRP (BM-RS1, BM-RS2 in FIG. 21). The base station may configure a first threshold to determine a poor link quality for the first TRP. The base station may configure a first maximum counter to determine a BF for the first TRP, wherein the wireless device may declare the BF in response to poor link qualities may occur more than the first maximum counter (e.g., first BFI_COUNTER). The base station may configure one or more first candidate reference signals for the first TRP. The wireless device may be configured with one or more second recovery reference signals for the second TRP (BM-RS3 in FIG. 21). The base station may configure a second threshold to determine a poor link quality for the second TRP. The base station may configure a second maximum counter to determine a BF for the second TRP, wherein the wireless device may declare the BF in response to poor link qualities may occur more than the second maximum counter (e.g., second BFI_COUNTER). The base station may configure one or more second candidate reference signals for the second TRP. The wireless device may measure link qualities of the first TRP based on the one or more first recovery reference signals. The wireless device may detect a beam failure incident for the first TRP in response to the link qualities of the one or more first recovery reference signals become lower than the first threshold. Based on a number of beam failure incidents become larger than the first maximum counter, the wireless device may declare a first BF of the first TRP. Similarly, based on a beam management process, the wireless device may declare a second BF for the second TRP.

In response to the first BF and the second BF, the wireless device may determine to transmit a PRACH, as the wireless device may not have a valid uplink resource (e.g., for PUSCH transmission) with valid uplink beam in response to the failures of both TRPs. In response to the second BF, the wireless device may determine to deactivate/suspend the second TRP. The wireless device may deactivate or switch the second TRP to a dormant state in response to the second BF. The wireless device may determine a first new candidate beam for the first TRP, based on measurements on the first one or more candidate reference signals for the first TRP. The wireless device may determine a second new candidate beam for the second TRP, based on measurements on the one or more second candidate reference signals for the second TRP. The wireless device may determine a RACH resource for the PRACH from one or more RACH occasions based on the first new candidate beam. The base station, in response to receiving the PRACH of the first new candidate beam, transmits a RAR to schedule a Msg 3 in response to the PRACH uses a contention based RACH resource. The base station may schedule a PUSCH for Msg3. The wireless device may piggyback/transmit the second candidate beam for the second TRP on the PUSCH for Msg3. To inform the base station about the second new candidate beam of the second TRP, the wireless device may utilize Msg 3 (e.g., add the second best beam index in the Msg3 content) or piggyback the second candidate beam information in a PUSCH (e.g., UL-grant based PUSCH or configured grant PUSCH) transmission. The first TRP, in response to receiving the Msg3, may forward the second candidate beam to the second TRP.

The second TRP, in response to receiving the second new candidate beam for the second TRP, may complete the beam recovery for the wireless device. The second TRP may indicate to the first TRP to reactivate the second TRP. The first TRP may transmit one or more MAC CEs and/or DCIs to activate the second TRP. In FIG. 21, the base station may activate a TRP via one or more MAC CEs and/or DCIs and/or RRC signaling. For example, the base station may activate the first TRP based on serving cell configurations. For example, the base station may activate the second TRP via one or more MAC CEs and/or DCIs and/or RRC signaling. For example, the base station may transition the second TRP between a normal and a dormant state via one or more second MAC CEs and/or second DCIs and/or second RRC signaling. In response to receiving the activation command, the wireless device may activate the second TRP. In an example, the wireless device may resume the second TRP in response to transmitting the second new candidate beam to the base station. The base station may comprise the first TRP and the second TRP.

In an example, a similar mechanism may be applied to an RLF procedure. In a RLF procedure, a wireless device may indicate a RLF when the wireless device detects that one or more RLM reference signals (RLM-RS) across a first TRP and a second TRP fail where the first TRP and the second TRP are activated in a PCell or a sPCell. A base station may configure one or more reference signals for RLM measurements across the first and the second TRP, and the wireless device may perform the RLM measurements regardless of the TRPs. In the event of RLF, the wireless device may deactivate all TRPs of the cell or may deactivate secondary TRP(s) while keeping the first TRP.

A base station may configure one or more first beam recovery reference signals for a first TRP, and may configure one or more second beam recovery reference signals for a second TRP. The base station may configure a first beam failure instance max count and/or a second beam failure instance max count. The wireless device may increment a first beam failure counter based on detecting/assessing the one or more first reference signals with a quality lower (e.g., higher BLER, lower SINR, lower RSRP, etc.) than a first threshold. The wireless device may increase a second beam failure counter upon detecting/assessing the one or more first reference signals with a quality lower (e.g., higher BLER, lower SINR, lower RSRP, etc.) than a second threshold. In an example, the base station may configure the first threshold and the second threshold. In an example, the base station may configure the first threshold and the wireless device may derive/determine the second threshold based on the first threshold (e.g., the first threshold+an offset (e.g., RRC configured, preconfigured, etc.)). When the first beam failure counter reaches the first beam failure instance max count, the wireless device may declare/identify/detect a beam failure for the first TRP. Based on the detecting he beam failure, the wireless device may transmit a beam failure recovery request to the second TRP using/via one or more uplink resources (e.g., MAC-CE on UL-grant PUSCH with or without SR triggering, aperiodic uplink control information piggybacked on UL-grant PUSCH with a dedicated SR triggering) for the second TRP.

In an example, a base station may configure one or more first beam recovery reference signals for the first TRP and one or more second beam recovery reference signals for the second TRP to initiate explicit RS based measurement. In the example, the base station may not configure beam recovery reference signals for both TRPs to initiate implicit RS based measurement. In an example, a wireless device may determine an activation of beam failure recovery procedure for a TRP based on the presence of one or more reference signals for candidate beams associated with the TRP. When the presence of the one or more reference signals for candidate beams for a TRP, the wireless device may perform a beam failure recovery procedure and/or a beam management procedure for the TRP. A base station may activate a first TRP only or both the first TRP and a second TRP via configuring reference signals for candidates beams for TRP(s). In an example, the base station may transmit one or more candidate beams for a TRP, wherein configuration parameters of a candidate beam reference signal may comprise a TRP index or a CORESET group index or a TCI state group index. The base station may configure the one or more candidate beams/reference signals for the TRP based on an index of the candidate beam/reference signal. For example, from 0 to M−1 may be used for the first TRP. From M to 2M−1 may be used for the second TRP (e.g., M=4).

Figure 22:
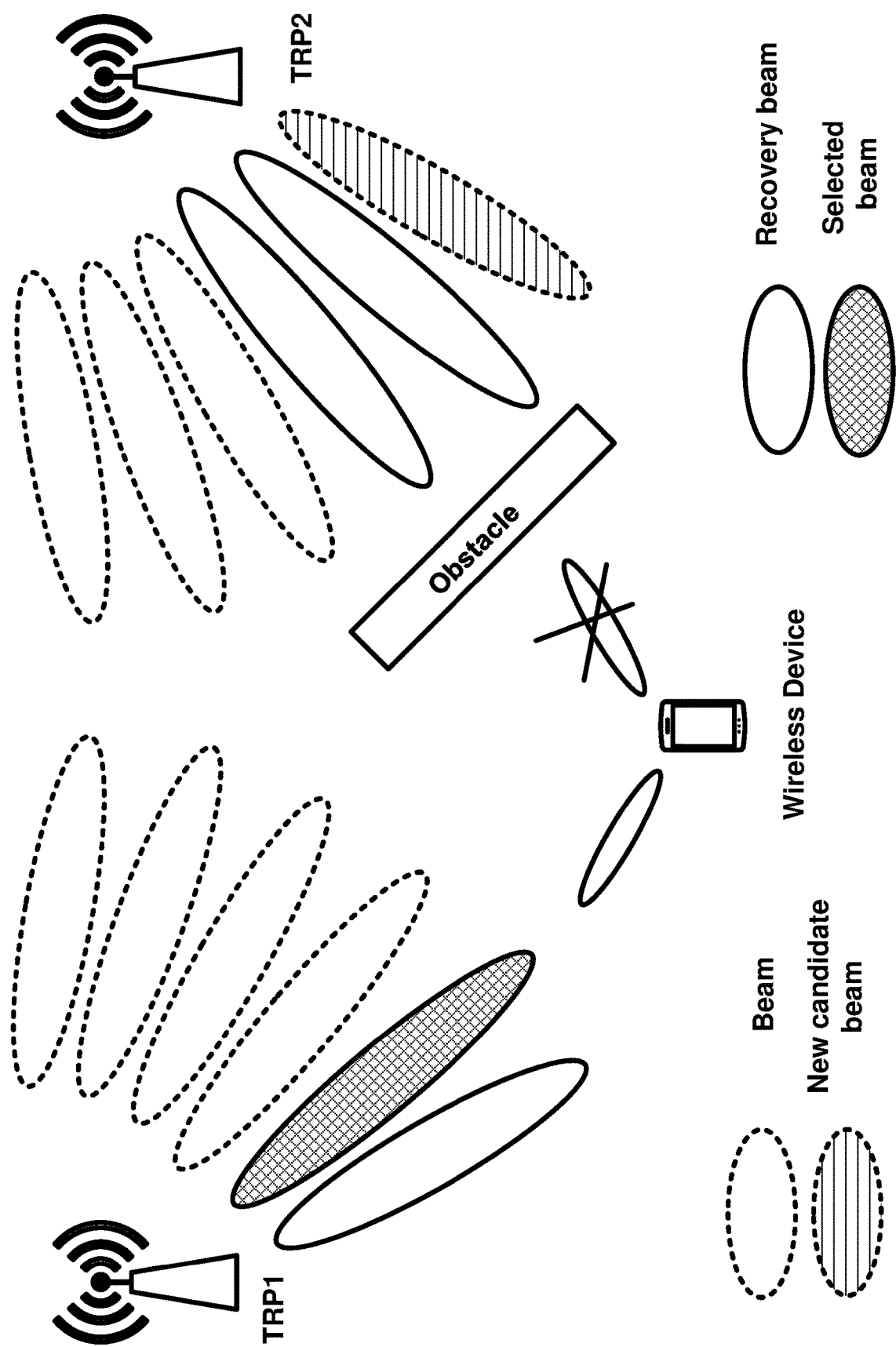
FIG. 22 illustrates an example embodiment of a cross-TRP beam failure recovery procedure as per an example embodiment of the present disclosure.

FIG. 22 illustrates an example that a wireless device detects a beam failure based on one or more recovery beams of a second TRP (TRP2) of a cell. Similar to FIG. 22, the base station may configure configuration parameters (e.g., recovery beams, candidate beams, a threshold, a max counter, etc.) for each TRP. Based on measurement of one or more second recovery reference signals of the second TRP based on a second threshold and a second max counter, the wireless device may determine/declare a beam failure of the second TRP. Even with the BF of the second TRP, the wireless device may continue receiving control and data from a first TRP (TRP1) using one or more beams with good qualities (e.g., L1-RSRP or L1-SINR better than a first threshold) regardless whether the beam failure occurs in the second TRP or not. In response to detecting a beam failure of the second TRP (TRP2), the wireless device may initiate a beam failure recovery of the second TRP. The first TRP and the second TRP may operate on or may be associated with PCell, sPCell or SCell. For example, a beam failure request for the second TRP and/or a new candidate beam information of the second TRP may be transmitted by the wireless device via one or more MAC CEs. For example, the wireless device may initiate a beam recovery procedure of the second TRP by triggering a SR.

The wireless device may determine a SR resource from one or more SR resources. The one or more SR resources may be dedicated to indicating the BF of the second TRP for the cell. The one or more SR resources may be dedicated to indicating a BF of the second TRP of the cell and/or a second BF of a first TRP of a secondary cell and/or a third BF of a second TRP of the secondary cell. The one or more SR resources may be dedicated to indicating a BF of the second TRP of the cell, wherein the cell is a primary cell of a group, and/or a second BF of a secondary cell. The one or more SR resources may be used for requesting resources to transmit one or more second MAC CEs comprising a buffer status reporting (BSR).

For example, the base station may configure candidate beam reference signals for a secondary cell regardless of a single TRP or a plurality of TRPs. The wireless device may perform a single beam management procedure for the secondary cell. The base station may configure independent beam management process for each TRP of a cell, wherein the cell is a primary cell of a cell group (e.g., PCell, SPCell).

In response to receiving the SR, the base station may schedule an uplink resource for a PUSCH transmission.

In an example, a beam failure request and/or a new candidate beam information may be transmitted by the wireless device via one or more UCIs and the indication of BFR via a dedicated SR, the wireless device may transmit a dedicated SR to inform a BFR and may monitor a DCI indicating a UCI transmission carrying new candidate beam indices of one or more cells/TRPs on PUSCH. The wireless device may transmit the new candidate beam (shown in lined filled beam in FIG. 22) via the scheduled PUSCH. The base station may schedule the PUSCH based on a beam of the first TRP as beams of the second TRP may not be valid. The wireless device may transmit the new candidate beam to the first TRP. The first TRP may forward the information to the second TRP. Based on the information, the base station may update one or more transmission configuration indicator for one or more CORESETs associated with the second TRP via one or more MAC CEs and/or DCIs and/or RRC signaling. In response to receiving the update, the wireless device may complete the BFR of the second TRP.

In an example, a first BFR procedure of a TRP may be independently performed from a second BFR procedure of a SCell. For example, a first MAC CE is used for the first BFR procedure and a second MAC CE is used for the second BFR procedure. In the example, the wireless device may trigger a BFR request similar to the second BFR procedure. In an example, a first BFR procedure of a TRP may be different for a second BFR procedure of a SCell. For example, the first BFR procedure may trigger a dedicated SR to inform a BFR of a TRP where a first dedicated SR may be configured for a first TRP on PCell or sPCell and a second dedicated SR may be configured for a second TRP on PCell or sPCell when the first and second TRPs are not operating on PCell or sPCell. In case of PCell or sPCell, each TRP uplink resources may have a dedicated SR resource for the other TRP BFR. Based on the BFR trigger, a MAC-CE or UCI may be used to deliver a new candidate beam index. In an example, for the first beam failure recovery procedure, a wireless device may trigger a PUCCH to TRP1 when a beam failure request may carry the information of the new candidate beam. The wireless device may piggyback the new candidate beam information in PUSCH when there are a scheduled PUSCH by UL grant or configured grant in any active UL cell. For example, the wireless device may be activated with a PCell with TRP1 and TRP2, SCell 1 and SCell2 where SCell 1 has uplink carrier. The beam failure request and/or recovery information (e.g., a new candidate beam, cell index, TRP index, CORESET group index, etc.) may be sent a PUSCH scheduled on SCell 1. When TRP1 and TRP2 are associated with a SCell, a beam recovery request (e.g., a SR or a dedicated SR) may be sent to a PCell or a sPCell depending on the cell group (CG) where the SCell belongs to. When a wireless device has any PUSCH transmission in a cell, the wireless device may piggyback the beam recovery request and/or new candidate beam information on the PUSCH transmission.

Figure 23:
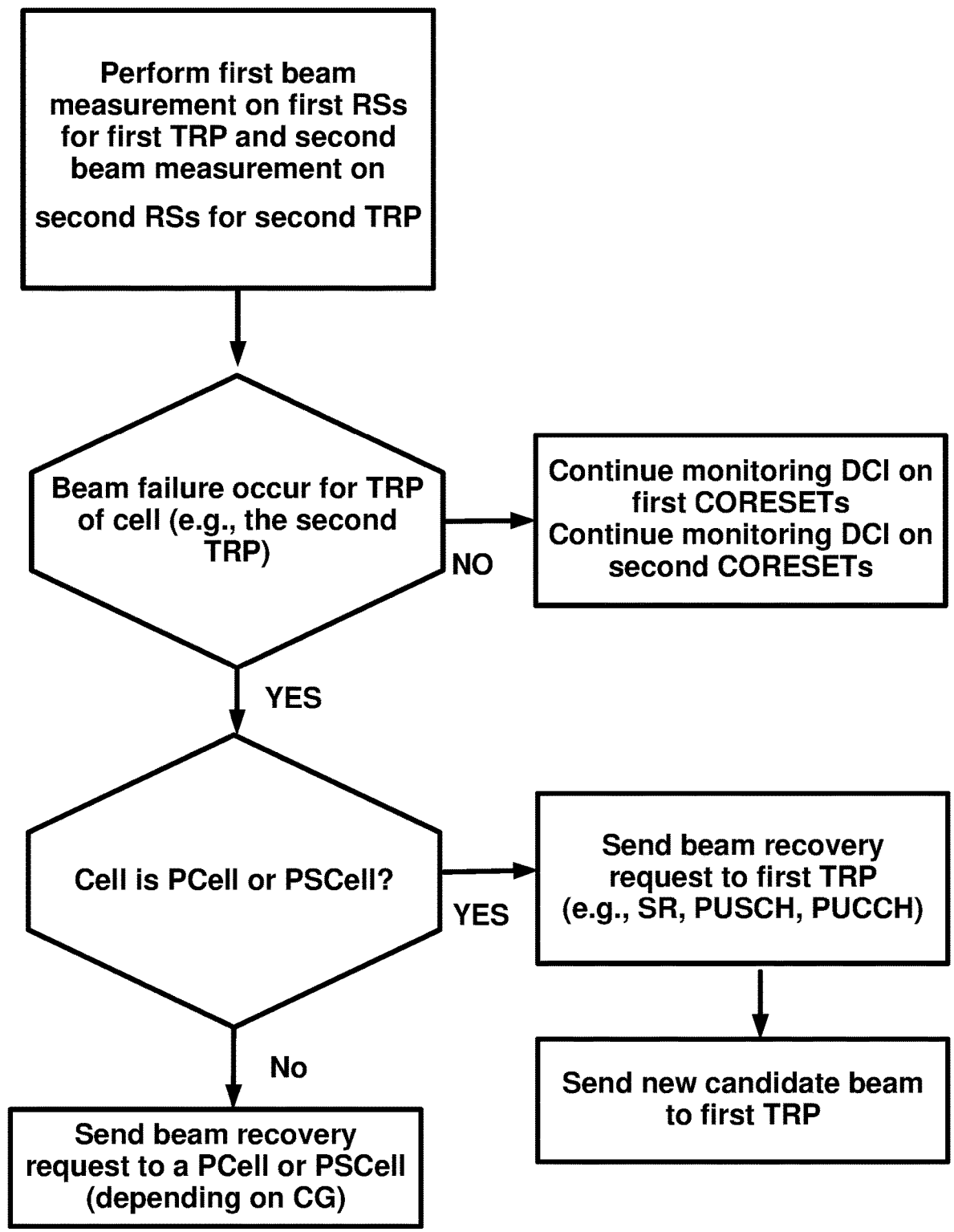
FIG. 23 is a flow chart of an example beam failure procedure as per an example embodiment of the present disclosure.

FIG. 23 illustrates a flow chart of a beam failure recovery procedure for a plurality of TRPs of a cell. In an example, a wireless device may perform a beam management and a beam failure recovery procedure separately/independently for each TRP of a cell. A wireless device, upon activating with one or more TRPs, may be configured with separate reference signals and candidate list of beams for a beam management and a beam failure recovery procedure for a TRP. The wireless device may identify a TRP based on a TRP ID, or a CORESET group ID indicated in a RS configuration. For example, the wireless device may determine a CORESET group ID of a CORESET, wherein the wireless device may use a RS associated with an active TCI state of the CORESET for the measurement for a beam failure detection/recovery. The wireless device may identify a set of reference signals of a TRP based on a TRP ID or a CORESET group ID configured with the reference signals if reference signals are configured. When the wireless device may use a RS associated with a TCI state of a CORESET, the wireless device may determine a TRP of the reference signal based on a TRP ID or a CORESET group ID indicated in the CORESET.

The wireless device may identify one or more first beam recovery reference signals for the first TRP and one or more second beam recovery reference signals for the second TRP based on the TRP identification of a RS. The wireless device may identify one or more first candidate beam reference signals for the first TRP, wherein the base station may configure the one or more first candidate beam reference signals associated with the first TRP. The wireless device may identify one or more second candidate beam reference signals for the second TRP based on the TRP identification of a RS. The wireless device may initiate a BFR procedure for the first TRP based on the wireless device detects a plurality of times that qualities of the one or more first beam recovery reference signals become poor/lower than a first threshold of the first TRP. For example, the wireless device may detect a beam failure of the first TRP regardless of link quality of the second TRP. For example, the wireless device may measure signal qualities of the second TRP based on the one or more second recovery signals. When the signal qualities of the second TRP may be lower than a second threshold of the second TRP, the wireless device may initiate a BF of the cell. When the signal qualities of the second TRP may be equal to or higher than the second threshold of the second TRP, the wireless device may detect/declare a first beam failure of the first TRP. For example, the wireless device may perform a beam measurement and a beam failure detection procedure for the second TRP. In response to detecting a second BF of the second TRP, the wireless device may detect a BF of the cell. Otherwise, the wireless device may detect/declare a first beam failure of the first TRP.

In FIG. 23, the wireless device may perform a first beam measurement based on the one or more first beam recovery reference signals for the first TRP. The wireless device may perform a second beam measurement based on the one or more second beam recovery reference signals for the second TRP. In response to detecting a beam failure for a second TRP of the cell, the wireless device may determine whether the cell is a primary cell of a cell group (e.g., PCell, sPCell). Otherwise, the wireless device may continue performing the first beam measurement and the second beam measurement. In response to the cell being the primary cell of the cell group, the wireless device may trigger/transmit a beam recovery request for the second TRP via an uplink resource of the first TRP. For example, the wireless device may trigger/transmit a SR, or transmit a PUSCH comprising a new candidate beam, or a PUCCH comprising a new candidate beam or a beam recovery request via the cell. The wireless device may transmit the new candidate beam to the first TRP. The first TRP may forward the information to the second TRP. The second TRP and/or the first TRP may update one or more TCIs for the second TRP. The second TRP and/or the first TRP may update one or more beam recovery reference signals for the second TRP. In response to the cell not being the primary cell, the wireless device may transmit/trigger the beam request recovery via a primary cell of the cell group, wherein the cell belongs to. The wireless device may trigger/transmit a SR, or transmit a PUSCH comprising a new candidate beam, or a PUCCH comprising a new candidate beam or a beam recovery request, via the primary cell.

In an example, a BFR of a TRP may be triggered via one or more MAC CEs.

Assuming there is no available PUSCH to send the one or more MAC CEs of a BFR request, the wireless device may trigger a SR. For example, when the first TRP (TRP1) and the second TRP (TRP2) are associated with PCell or sPCell where a beam failure recovery procedure is triggered on the cell, the wireless device may send a beam recovery request (e.g., a SR or a dedicated SR) to another TRP using a SR resource of the another TRP on the same cell. In an example, a wireless device may be configured with, for a TRP of a first cell, one or more beam recovery reference signals of a third TRP of a second cell (e.g., cross-carrier beam recovery signal configuration) (and similarly for candidate beam reference signals). For example, the wireless device may perform a beam management and a beam recovery procedure for the third TRP of the second cell. When a first BFR occurs in the third TRP of the second cell, the wireless device may assume/detect a second BFR in the TRP of the first cell, when the TRP of the first cell may have fully overlapped beam recovery reference signals to the beam recovery reference signals of the third TRP (e.g., a subset of beam recovery reference signals of the third TRP). The wireless device may trigger a BFR for the TRP of the first cell.

In an example, the wireless device may not trigger a BFR for the TRP of the first cell when one or more candidate beam reference signals of the TRP of the first cell are fully overlapped to one or more candidate beam reference signals of the third TRP (e.g., a subset of candidate beam reference signals of the third TRP). The wireless device may assume a single BFR initiated by the third TRP may recover a new candidate beam for the TRP of the first cell in parallel. Such a bundling may be explicitly configured by a base station or implicitly determined based on configurations of beam recovery reference signals and/or candidate beam reference signals. When the wireless device may detect a beam failure in the another cell, the wireless device may assume a beam failure may have been occurred in one or more cells where the same beam recovery reference signals are used for a beam failure detection. The wireless device may perform a beam measurement and/or a beam failure recovery process on one or more cells which share the one or more reference signals for a beam management (e.g., beam recovery reference signals) and a beam failure recovery procedure (e.g., candidate beam reference signals). A wireless device may be configured with a reference cell ID or a reference TRP ID and a reference cell ID for a cell or a TRP of a cell for grouping/bundling beam failure recovery procedure. When the wireless device is configured with the reference cell ID or the reference TRP ID and the reference cell ID for a first cell or a first TRP of the first cell, the wireless device is not performing a separate beam management and/or a separate beam failure recovery process for the first cell or the first TRP of the first cell. In response to a beam failure recovery procedure on the reference cell or the reference TRP of the reference cell, the wireless device may recover the beams of the first cell or the first TRP of the first cell.

Figure 24:
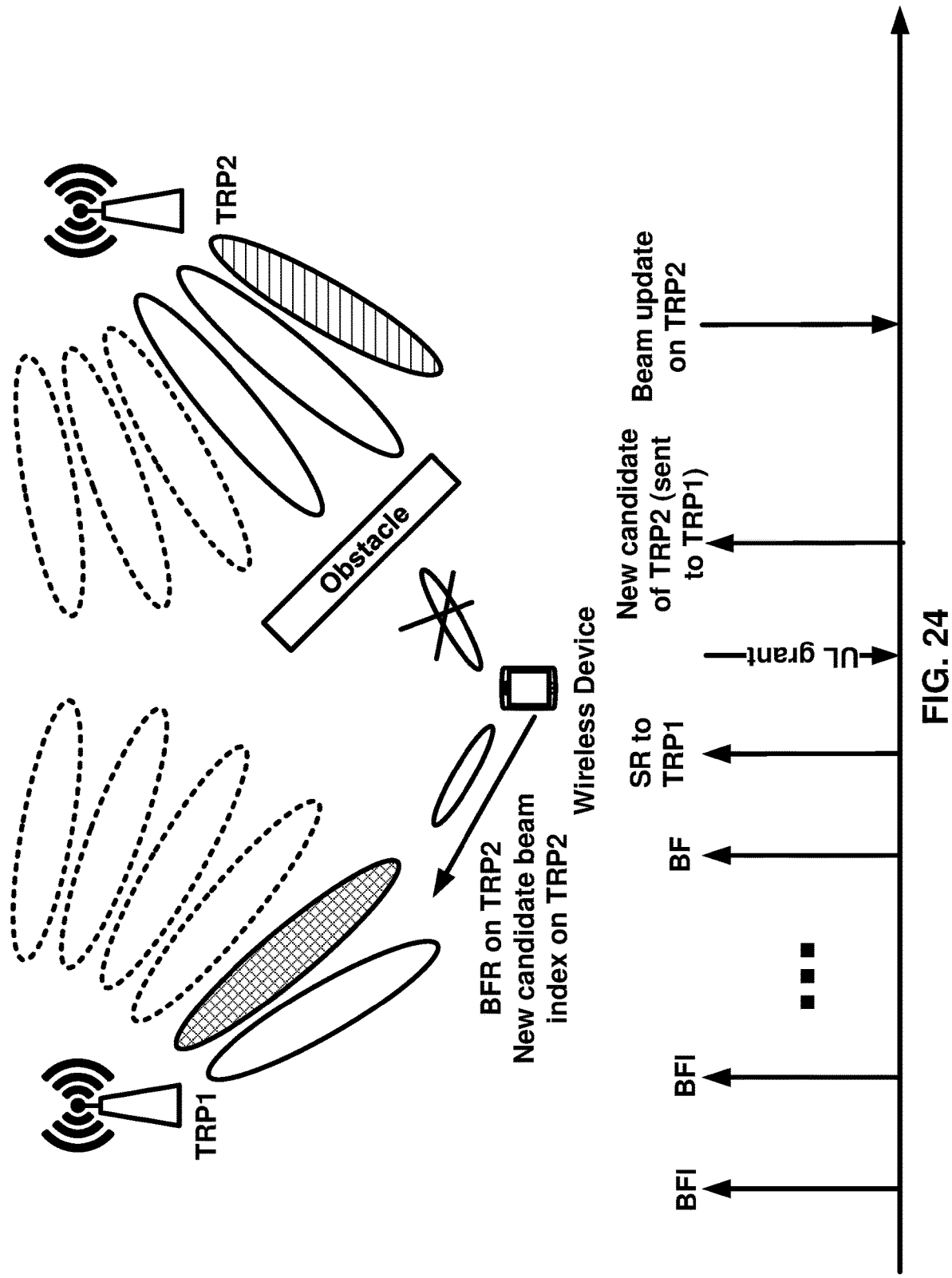
FIG. 24 illustrates an example embodiment of a cross-TRP beam failure recovery procedure as per an example embodiment of the present disclosure.

FIG. 24 illustrates a diagram of a beam recovery request on a PCell or a sPCell for a second TRP (TRP2). The wireless device may perform a beam measurement and may identify a beam failure incident when qualities of beam measurement reference signals become lower than a threshold for the second TRP. When there are more than beam failure incidents than a beam failure instance max count configured for the second TRP, the wireless device may declare/detect a beam failure and may initiate a beam failure recovery procedure for the second TRP. In response to the beam failure of the second TRP (TRP2), the wireless device sends an SR to TRP1 to be scheduled with a PUSCH to carry information (e.g., a new candidate beam information) for the beam recovery. In response to the SR, the TRP1 schedules an UL grant and the wireless device may transmit one or more beam recovery information (e.g., a list of pairs {a new candidate beam index, a cell index (may be optional), and optionally a TRP index}). When a PUSCH is scheduled, one or more pairs of beam recovery information may be piggybacked as a UCI or transmitted via a MAC-CE. Based on the beam recovery response, the base station may configure a new candidate beam information (e.g., a new set of TCI states) where the new candidate beam information (e.g., the new set of TCI states) may be transmitted by TRP1 or TRP2. The second TRP may send the new set of TCI states to the wireless device based on the recovery response forwarded by the first TRP.

Figure 25:
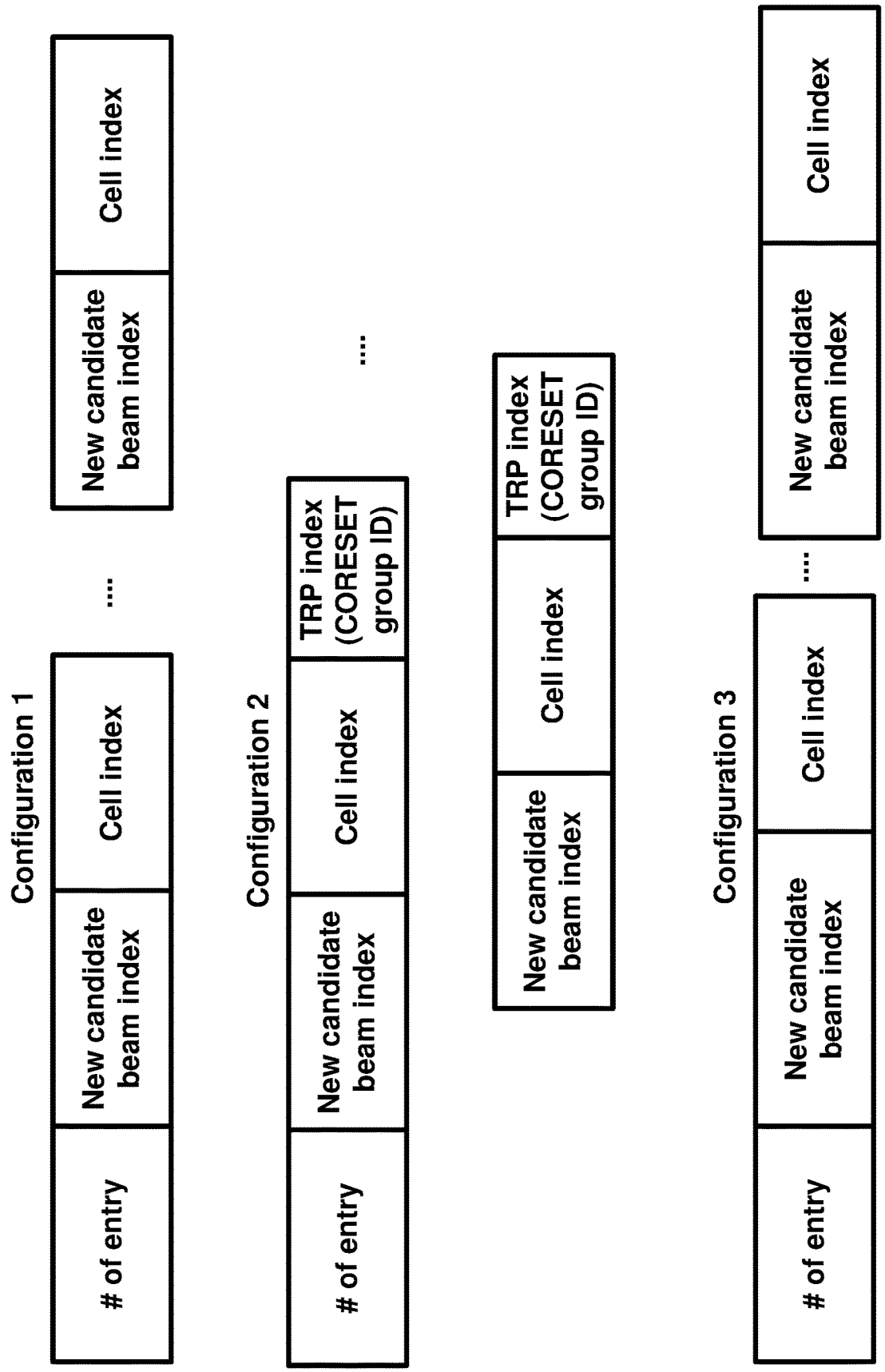
FIG. 25 illustrates an example of one or more MAC CE formats for a beam failure recovery procedure as per an example embodiment of the present disclosure.

FIG. 25 illustrates different MAC CE formats which may be used in different scenarios or may be used to carry a TRP information in a beam failure recovery procedure. For example, Configuration 1 may be used when a wireless device may not support more than one TRP per cell or a wireless device would not be configured with more than one TRP per cell. For example, there is no need to differentiate TRP ID in beam failure recovery procedure as there is a single TRP for a cell. In a MAC CE used for a beam recovery, additional fields in addition to Configurations shown in FIG. 25 may present. For example, when a wireless device may support more than one TRP per cell regardless of a number of TRPs activated/configured for one or more cells. For example, the wireless device may be configured/activated with more than one TRP for one or more cells when the wireless device supports more than one TRPs for one or more cells. For example, a base station may activate one or more TRPs for one or more cells when the wireless device supports more than one TRPs for one or more cells. In such cases, Configuration 2 may be used wherein a MAC CE may include a TRP index. The MAC CE of Configuration 2 may comprise {a new candidate beam index, a cell index, a TRP index}. A TRP index may be identified as a TRP ID associated with each TRP, determined based on a CORESET group ID, determine based on a TCI state group ID, and/or the like. In MAC CEs, a wireless device may report a new candidate beam index for a TRP of a cell using Configuration 2.

To convey a TRP ID, instead of adding a new field, extending of new candidate beam index field may be supported as shown in Configuration 3. From 0 to maximum beam index−1 for a TRP may be used for the first TRP, and from max beam index to 2*max beam index−1 may be used for the second TRP, and so on. When a wireless device may not support more than one TRPs for a cell, the wireless device may assume that there is no TRP index field in the MAC CE used for a beam failure recovery procedure. When a wireless device may support more than one TRPs for one or more cells, the wireless device may assume that there is TRP index field in MAC CE used for a beam failure recovery procedure regardless whether the wireless device is configured/activated with more than one TRPs for one or more cells or not. To support a base station potentially without enhancements of embodiments, a wireless device may assume that there is no TRP field in the MAC CE unless a base station configures to the wireless device using a MAC CE format including a TRP field for each beam recovery response entry. For example, a base station may configure to use Configuration 2 to a wireless device which may support more than one TRPs for one or more cells. If there is no configuration of MAC CE format used for beam recovery, the wireless device may assume that the MAC CE format may not carry TRP index unless it has been configured/activated with multiple TRPs for one or more cells.

With utilizing a common MAC CE format between a single TRP scenario and multiple TRPs scenario, a base station may configure one or more first SR resources dedicated to reporting a beam failure of a second TRP on a cell. In first MAC CE(s), a list of beam recovery information (e.g., a list of new candidate beam) of a first TRP of one or more cells (a first TRP may be the same as a cell when one TRP operates on the cell) may be reported. In second MAC CE(s), a list of beam recovery information of a second TRP of one or more cells may be reported (a second TRP may not present when one TRP operates on the cell). To differentiate first and second MAC CE(s), different RNTI (e.g., a first RNTI for the first MAC CE(s) and a second RNTI for the second MAC CE(s)) may be used or a 1 bit indication to indicate whether MAC CE(s) is for the first TRP or the second TRP. In an example, to differentiate between the first MAC CE(s) and the second MAC CE(s), a wireless device may trigger a SR on a dedicated set of SR resources for the second MAC CE(s). The wireless device may send the second MAC CE(s) via a PUSCH scheduled by a base station based on the SR sent on one of the dedicated set of SR resources.

In an example, the wireless device may be configured with the first SR resources, the first SR resources are used dedicatedly to indicate a beam failure of a second TRP of a cell. Similar technique may be utilized for dual-connectivity case. A wireless device, configured with a dual connectivity, may be configured with one or more 'inter-CG' SR (or PUCCH) resources. The one or more 'inter-CG' SR (or PUCCH) resources may be used to indicate a request about the other CG (e.g., inter-CG SR on MCG is used for indicating an event on SCG, inter-CG SR on SCG is used for indicating an event on MCG). For example, the resources may be used to inform a beam failure of one CG via the other CG resources. For example, the resources may be used to inform an RLF of one CG. In response to receiving an SR on inter-CG SR resources, the gNB may schedule a PUSCH to receive the data about the event. The base station may forward the received information to the other base station/CG. The recovery procedure/reconfiguration may be performed. If the event is used for beam failure recovery procedure, a wireless device may utilize a BFR-CORESET configured in each CG after sending indication of BFR request to the other CG.

In an example, to share a common MAC CE format for a BFR in a multi-TRP scenario and a SCell, a wireless device may send first MAC CE(s) based on one or more BFRs on a PCell for a multi-TRP scenario and second MAC CE(s) based on one or more BFRs on SCells. In an example, even when a wireless device may be served by more than one TRPs in a SCell, the wireless device may perform a single BFR on the SCell regardless of a number of active TRPs. In an example, a wireless device may perform an independent BFR of each TRP in a PCell or a sPCell, and may perform a primary-TRP only BFR or a unified BFR across multi-TRPs on a SCell (e.g., a BFR occurs when all beam recovery reference signals fail regardless of which TRP each RS is associated). A base station may interpret a cell index in a MAC CE as a TRP index if the MAC CE is transmitted for PCell or sPCell. The base station may interpret a cell index as the cell index in other cases. To differentiate between first MAC CE(s) for one or more TRPs of PCell/sPCell and second MAC CE(s) for SCells, different RNTIs (e.g., a first RNTI for the first MAC CE(s) and a second RNTI for the second MAC CE(s)) may be used or a dedicated SR to trigger a UL-grant to schedule a PUSCH carrying the first MAC CE is used for the BFRs of the one or more TRPs of PCell/sPCell.

To utilize a common MAC CE format between a single TRP scenario and multi-TRPs scenario (e.g., more than one active TRPs for a cell) for a cell, a wireless device may assume that a number of cells configured to a CG may not exceed a certain number (e.g., 16) that is lower than the maximum supported carriers/cells. One or more indices not allocated for a cell may be used for a second TRP of a cell. When a base station receives a cell index which is beyond the cell index allowable, the wireless device may assume it is for a second TRP. For example, if the maximum number of CCs (component carriers, cells) is 32, and an allowed number of cells with a multi-TRP scenario/operation is 20, cell indices from 20 to 31 may be used to indicate one or more of a TRP of one or more cells. The cell index used for a second TRP of a cell may be higher-layer (e.g., RRC signaling) configured by a base station.

A similar mechanism may be applied to a radio link monitoring and/or failure detection and reporting mechanism. When a wireless device may be served by multiple TRPs on a PCell or a sPCell, the wireless device may perform measurement on one or more reference signals for radio link monitoring (RLM) independently for a TRP. When a radio link failure (RLF) occurs for a first TRP, it may inform the RLF to a second TRP. In response to receiving an RLF of the first TRP, the second TRP may deactivate the first TRP. When a wireless device may detect a RLF on a first TRP that is a primary TRP and may have a second TRP on a PCell or a sPCell, the wireless device may report RLF to the second TRP. A base station may perform intra-cell handover to switch a primary TRP from the first TRP to the second TRP. The information about a cell (e.g., a cell defining SSB) may be updated accordingly based on the second TRP. In an example, a wireless device may not indicate an RLF of a primary TRP. The wireless device may inform an RLF of one or more secondary TRPs to the primary TRP. The primary TRP may deactivate the reported one or more secondary TRPs. The wireless device may deactivate the one or more secondary TRPs when RLF(s) may occur on the one or more secondary TRPs.

Figure 26:
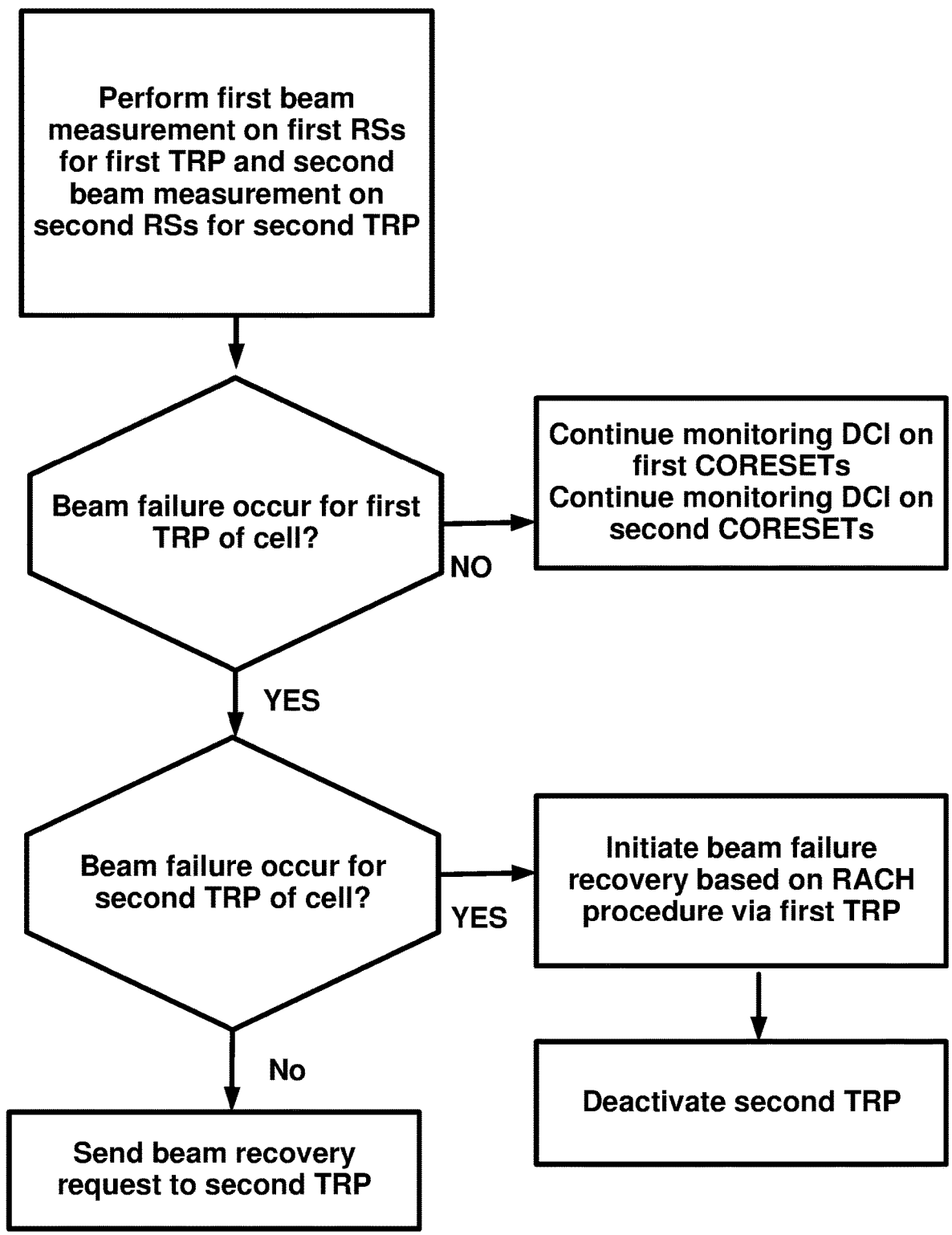
FIG. 26 is a flow chart of an example beam failure procedure as per an example embodiment of the present disclosure.

FIG. 26 illustrates a flow chart of a beam failure recovery procedure in a multi-TRP scenario. A wireless device may be served by a first TRP and a second TRP in a PCell or a sPCell where a beam failure recovery procedure is based on a RACH procedure. The wireless device may perform separate beam management/measurement and separate beam failure recovery procedure per TRP on the cell. The wireless device may determine a beam failure event for each TRP based on a beam failure instance max count where, for each TRP, a wireless device may be configured with a beam failure instance max count. In response to detecting a beam failure recovery (i.e., beam failure instances have occurred equal to a beam failure instance max count times for a first TRP), the wireless device may check whether a second TRP may suffer from a beam failure. When the second TRP is in a good quality, the wireless device may send a beam failure request to the second TRP. In an example, a wireless device may determine a good quality of the second TRP based on one or more measurements. For example, when qualities (e.g., L1-RSRP, L1-SINR, etc.) of beam recovery reference signals of the second TRP may exceed a threshold, it is assumed that the second TRP is in good quality. For example, if the wireless device has not initiated a beam failure recovery procedure for the second TRP, it is assumed that the second TRP is in good quality.

For example, there is no beam failure incident occurred (e.g., beam failure counter=0) for the second TRP, it is assumed that the second TRP is in good quality. The wireless device may initiate a RACH based BFR if the second TRP is not in good quality as well when there are two TRPs associated with a PCell or a sPCell. The wireless device may initiate a PRACH when first beam recovery reference signals of the first TRP and second beam recovery reference signals for the second TRP are measured in low qualities. When the wireless device initiates a RACH based BFR procedure, the wireless device may cancel on-going beam failure procedure for a TRP on the PCell or sPCell. In an example, if a wireless device has initiated a SR-based BFR for a second TRP via a first TRP, and then initiate a RACH-based BFR before the beam recovery of the second TRP is completed, the wireless device cancels the BFR procedure for the second TRP. When there are more than two TRPs, a wireless device may select a second TRP to transmit a BFR request based on a TRP index (e.g., a lowest indexed TRP) among TRPs in good qualities. For example, if there are more than one TRPs with good qualities, the lowest indexed TRP index may be selected to initiate a BFR of the first TRP.

Figure 27:
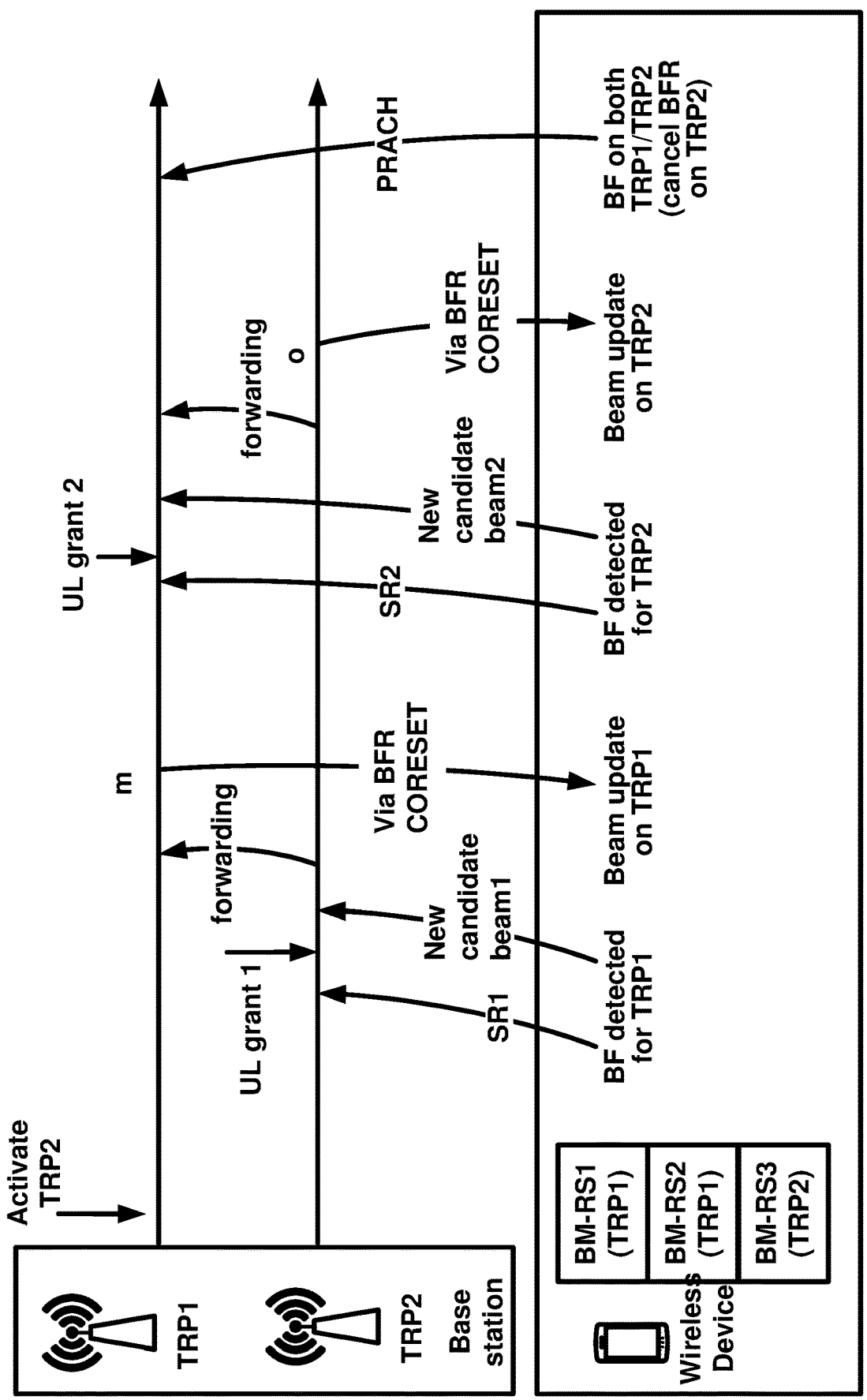
FIG. 27 illustrates an example of an embodiment related to one or more MAC CE formats.

FIG. 27 illustrates an example of an embodiment. A wireless device may initiate a BFR via a second TRP (TRP2) for a first TRP, in response to detecting a beam failure for the first TRP (TRP1). The wireless device may send a first SR of the second TRP (SR1 in FIG. 27). The wireless device may utilize a PUSCH if the PUSCH is available on the second TRP. The wireless device may send a beam failure recovery request and/or beam recovery information on the scheduled PUSCH (e.g., UL grant based PUSCH or configured grant PUSCH). When there is no PUSCH scheduled for the second TRP, the wireless device may send the first SR for receiving an uplink grant. The wireless device may send a beam failure request via the SR1 for the first TRP. In response to the SR1, the second TRP (TRP2) may schedule a first PUSCH via a first UL grant (UL grant 1) to the wireless device. The wireless device may send a beam recovery information (e.g., a new candidate beam with a good quality, cell index, TRP index, a cell index) of the first TRP. The second TRP may forward the receive information to the first TRP (TRP1). The wireless device may monitor a BFR CORESET of the first TRP to receive a confirmation of the beam recovery and/or a beam update and/or MAC CEs/DCIs/RRC signaling to update one or more TCI states of the first TRP.

Similarly, when the wireless device detects a second beam failure of the second TRP, the wireless device may transmit a second SR (SR2) to the first TRP to initiate a beam recovery of the second TRP. In response to receiving a beam recovery request for the second TRP (TRP2) from the wireless device, the first TRP (TRP1) may schedule a set of dedicated PRACH resources for the second TRP (TRP2)'s beam recovery procedure. The wireless device may select a PRACH occasion which is determined based on a new candidate beam (identified during a beam recovery procedure) for the second TRP (TRP2). For example, the wireless device may select the PRACH occasion that corresponds to the new candidate beam that the wireless device has identified as a good quality beam for the second TRP. The wireless device may perform a RACH-based BFR procedure (e.g., expect to receive a beam recovery response from a gNB via RACH procedure) based on the set of dedicated PRACH resources for the second TRP (TRP2) configured by the first TRP (TRP1).

In an example, a wireless device may use a SR-based BFR procedure (e.g., a wireless device may send a beam recovery request and/or beam recovery information via a dedicated SR and PUSCH(s) or via PUSCH(s) with optional SR) for the second TRP via the first TRP. The wireless device identifies one or more new candidate beams with good qualities and sends at least one new candidate beam information (e.g., a new candidate beam). In response to transmitting the new candidate beam information to the base station, the wireless device may monitor one or more DCIs scheduling one or more commands for updating one or more new candidate beams (e.g., the one or more commands via receiving MAC CE, RRC updates) from the second TRP (TRP2). The wireless device may monitor the one or more DCIs on a BFR-CORESET, wherein the BFR CORESET may be associated with the second TRP. The wireless device may determine a TCI state of the BFR-CORESET based on the reported new candidate beam.

A wireless device may share a single BFR-CORESET (and/or a single BFR-SS) across a first TRP and a second TRP (e.g., multi-TRPs) of a cell. A wireless device may support a single BFR-CORESET (and/or a single BFR-SS) as a UE capability for a cell regardless of whether the wireless device may support a single TRP only or multiple TRPs on the cell. A wireless device may share a single BFR-CORESET for a cell regardless of one TRP or multiple TRPs on the cell. To share the BFR-CORESET, the wireless device may support at most one beam failure recovery procedure for the cell. When the wireless device may encounter more than one beam failure procedure at a given time (e.g., the wireless device is served by more than two TRPs, and two TRPs may fail in parallel), the wireless device may select a BFR procedure for a TRP with a lower TRP index (e.g., a lower CORESET group index, a lower TCI group index). When a wireless device may initiate a BFR based on a RACH procedure, the wireless device may cancel other BFR procedures (if any) and continue the RACH procedure based BFR.

FIG. 27 illustrates that a wireless device monitors a BFR-CORESET at a first time m and a time o for a first TRP and a second TRP respectively. The wireless device is configured with one or more beam recovery reference signals for the first TRP (TRP1) and the second TRP (TRP2). The wireless device detects a beam failure for TRP1. With no scheduled PUSCH, the wireless device sends a SR (SR1) to a TRP2. The TRP2 sends a UL grant scheduling a PUSCH. The wireless device may report a new candidate beam (e.g., beam1, new candidate beam 1) for TRP1 via the PUSCH scheduled by TRP1. The TRP2 may forward the new candidate beam information (e.g., beam1) to TRP1. The wireless device may monitor the BFR-CORESET at the time m from the TRP1 to update one or more new candidate beams for TRP1. The wireless device determines a first TCI state of the BFR-CORESET on the time m based on a beam1. The first TRP (TRP1) may update one or more new candidate beams via the BFR-CORESET/BFR-SS using the beam1.

The wireless device detects a BFR for the TRP2. With no available PUSCH on the TRP1, the wireless device sends a SR (SR2) to TRP1. The TRP1 schedules an UL grant for a PUSCH. The wireless device sends a new candidate beam for the TRP2 (e.g., beam2, new candidate beam 2) via the scheduled PUSCH to the TRP1. The TRP1 may forward the new candidate beam information to the TRP2. The wireless device may monitor the BFR-CORESET to receive one or more commands to update new candidate beams for TRP2. The wireless device determines a second TCI state of the BFR-CORESET on the time o based on a beam2. The second TRP (TRP2) may update one or more new candidate beams via the BFR-CORESET/BFR-SS using the beam2. In an example, when both TRPs fail, a RACH-based BFR may be triggered when both TRPs operate on a PCell or a sPCell. When the wireless device performs a BFR based on a RACH procedure, the wireless device monitors a BFR-CORESET/BFR-SS based on a TCI state for a first TRP (or a primary TRP).

In an example, a wireless device may initiate a RACH-based BFR procedure when the wireless device detects a beam failure for a first TRP (or a primary TRP or a TRP1). The wireless device may initiate a SR-based BFR procedure when the wireless device detects a beam failure for a second TRP (or a secondary TRP or a TRP2).

A BFR procedure of a first TRP via a second TRP (e.g., send a BFR request/beam recovery information of the first TRP to the second TRP) may result in a high latency when a backhaul latency between the first TRP and the second TRP is not negligible. A base station, thus, may configure an option of a BFR procedure of a TRP or an option of a BFR procedure of a cell among one or more candidate options. For example, the base station may configure an independent BFR procedure for a TRP on a cell based on a RACH procedure by configuring a set of RACH resources for each TRP. For example, the base station may configure a BFR procedure for a cell regardless of the number of active TRPs of the cell. For example, the base station may configure a BFR procedure based on a SR-based BFR for a TRP in a cell. A base station may configure a mechanism for a BFR in a multi-TRP scenario (e.g., configure among options such as a BFR for all TRPs, a BFR only on a primary TRP, an independent BFR via a SR-based recovery, an independent BFR via a RACH-based recovery, etc.). A different BFR mechanism of a multi-TRP scenario may be used depending on an ideal-backhaul or a non-ideal-backhaul across TRPs. When an ideal-backhaul is supported, independent BFR of a TRP using another TRP resource would lead a low overhead and a low latency BFR. When a non-ideal-back is supported, a separate RACH-based BFR may work more efficiently.

When a separate RACH-based BFR is applied for a TRP in a multi-TRP scenario, a wireless device may not initiate a first RACH procedure for a first TRP and a second RACH procedure for a second TRP in parallel. When a BFR occurs for the first TRP and the second TRP, the wireless device may initiate a RACH procedure to the first TRP only. The wireless device may deactivate the second TRP as the BFR has occurred for the second TRP. A wireless device may indicate a status of a second TRP or a new candidate beam of the second TRP to a first TRP during a BFR for the first TRP.

A wireless device may be configured with a first PUCCH group and a second PUCCH group to support PUCCH SCell. The first PUCCH group may include PCell, and the second PUCCH group may include a SCell with PUCCH configuration (e.g., PUCCH SCell or PUCCH cell). In an example, a wireless device may be configured with C1, C2, . . . , Ck for the first PUCCH group, and Cm, Cm+1, . . . , Cn for the second PUCCH group where C1 is PCell and Cm is SCell with PUCCH configuration. For example, the wireless device is configured with a beam management for a C2 and Cm+1 respectively. For example, when the wireless device detects a beam failure in the C2, the wireless device may send the beam recovery request and/or beam recovery information to the C1, wherein C2 and C1 belongs to the first PUCCH group. When the wireless device detects a beam failure in Cm+1, the wireless device may send the beam recovery request and/or beam recovery information to Cm, wherein Cm and Cm+1 belong to the second PUCCH group. In an example, a wireless device may send a beam recovery request and/or beam recovery information for a cell to a first cell that the first cell and the cell belong to the same cell group.

In an example, a wireless device may send a beam recovery request and/or beam recovery information of a cell to a second cell that the second cell and the cell may belong to the same cell group or in different cell group. In an example, a wireless device may send a beam recovery request and/or beam recovery information of PCell (e.g., C1) to a SCell with PUCCH (e.g., Cm) and vice versa (e.g., a BFR request of the SCell with PUCCH to PCell). In an example, a wireless device may utilize a first PUSCH of a third cell to transmit a BFR request and/or beam recovery information where the third cell may belong to the same cell group or different cell group. The wireless device may select the first PUSCH (occurring the earliest timing among cells since the beam failure detection) regardless of the cell index.

The beam failure request and/or beam recovery information may be carried over any PUSCH of a cell regardless of cell groups. Similar techniques may apply to dual connectivity scenarios.

Figure 28:
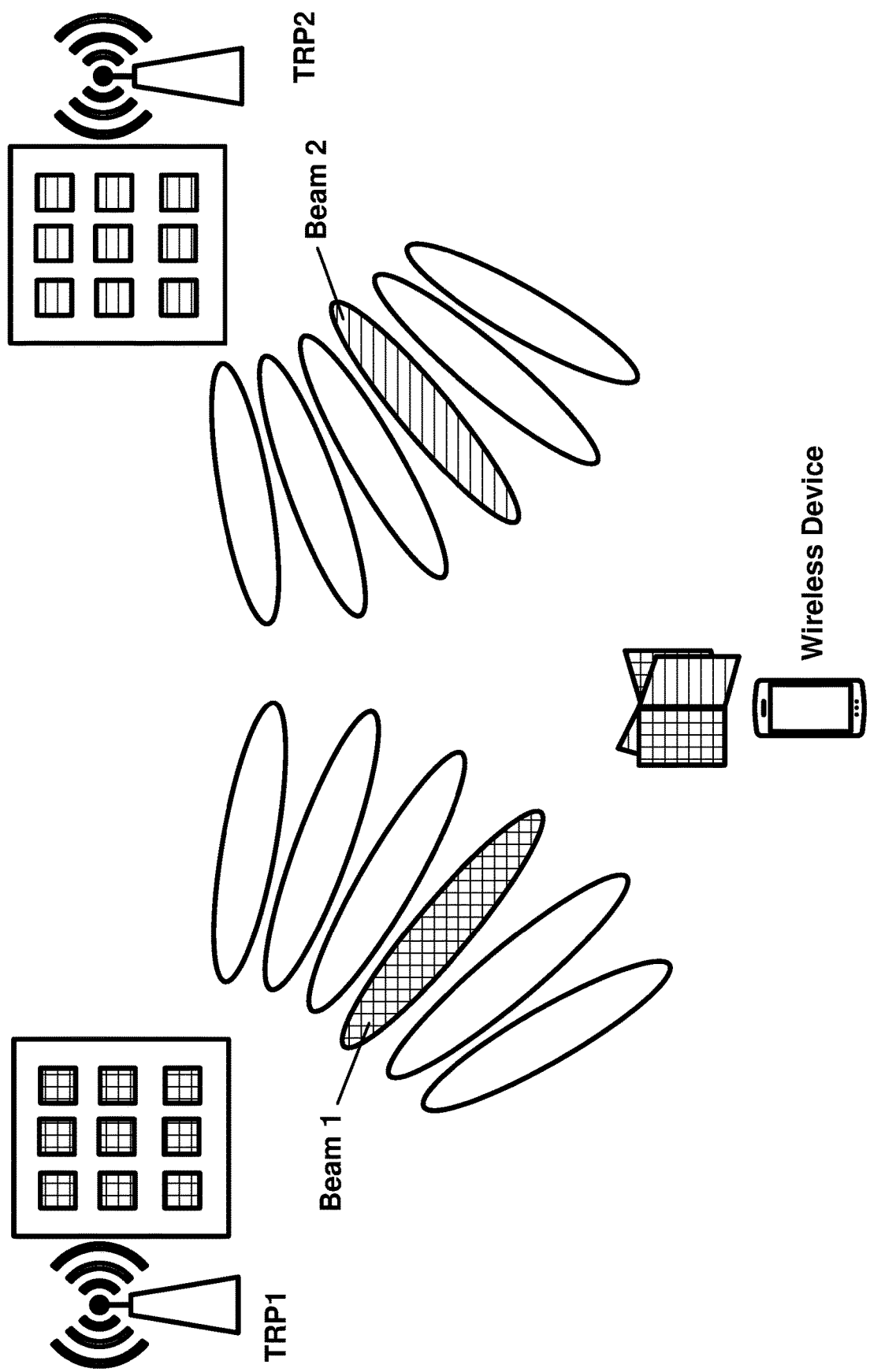
FIG. 28 illustrates an example of a multi-panel scenario.

When a wireless device is served by more than one TRPs, where a base station may have more than one panels to support the more than one TRPs. For example, a wireless device may have more than one panels to receive a downlink control and data. FIG. 28 illustrates an example where a wireless device has four different panels. The base station may have two panels where a first TRP (TRP1) operates with a first panel and a second TRP (TRP2) operates with a second panel. The wireless device is activated with the first TRP and the second TRP where the wireless device may assign two panels for the first TRP and the remaining two panels for the second TRP. For the TRP1, a first selected beam (e.g., beam1) is a good beam identified by the wireless device among one or more beams supported by the TRP1. For the TRP2, a second selected beam (e.g., beam2) is a good beam identified by the wireless device among one or more beams supported by the TRP2.

In an example, a wireless device may determine a panel layout supporting one or more TRPs of one or more cells. To determine a panel layout, the wireless device may utilize periodic transmissions of beam recovery reference signals or RRM reference signals. For example, the wireless device may perform measurements on periodic reference signals with one or more panel layouts (e.g., at t1 with a single panel, at t1+p with all panels active, at t1+2p with a partial set of panels, etc.). The wireless device may store one or more measurement results based on the one or more panel layouts. When the wireless device may report a new candidate beam or qualities of one or more beam reference signals, the wireless device may report a list of {a beam index, a quality, a panel layout}. A base station may select a new candidate beam and a panel layout considering a trade-offs between qualities and UE power consumption. For example, when the wireless device reports similar beam qualities of a beam with a first panel layout (e.g., a single panel) and a second panel layout (e.g., full panels active), the base station may select the first panel layout. When a wireless device is served by multiple TRPs, the wireless device may be able to receive multiple beams from multiple TRPs at the same time based on a panel layout (e.g., 2 panels for TRP1 and 2 panels for TRP2 in FIG. 28).

In response to a beam failure of a TRP, a panel layout to detect a new candidate beam may be changed (e.g., 4 panels should be used for TRP1 to support the new candidate beam). In determining a new candidate beam in a multi-TRP scenario, a wireless device may perform measurement on candidate beam reference signals without changing the beam layout applied to each TRP. When there is any beam above a threshold, the wireless device may report the new candidate beam from one or more beams with quality exceeding the threshold. If there is no such beam identified, the wireless device may perform beam measurements using one or more different panel layouts. This procedure may be occurred only for the primary TRP BFR. It may be assumed that a wireless device may not alter a panel layout for BFR of a secondary TRP. When a wireless device may identify a new candidate beam to recovery a primary TRP based on a new panel layout and may not identify a new candidate beam to recovery the primary TRP based on the previous panel layout, the wireless device may report the new candidate beam with the new panel layout. When the new panel layout may not allow a wireless device to be activated with more than one TRP, a base station may deactivate secondary TRPs and continue the primary TRP.

For example, a wireless device may be configured with multiple groups of beam measurement reference signals where one group of beam measurement reference signals may support a TRP. For example, the wireless device may receive one or more first reference signals for a first TRP and may receive one or more second reference signals for a second TRP for a separate beam process. The wireless device may perform beam measurement process separately per each TRP. For example, the wireless device may initiate beam failure recovery process of the first TRP when the wireless device may detect the quality of the one or more first reference signals for the first TRP becomes below than a threshold. The wireless device may send beam recovery request to a second TRP as a quality to the second TRP is good. When the wireless device may detect the quality of first and second reference signals below a value, the wireless device may initiate legacy beam failure procedure on a carrier/cell with the first TRP and the second TRP.

A wireless device may have one or more receiver panels. Activating and maintaining the one or more panels may lead a high power-consumption. The wireless device may deactivate one or more first panels and reduce power consumption. In determining a quality of a beam (e.g., L1-RSRP, L1-SINR, or L3-RSP, L3-SINR), a wireless device may perform measurement based on one or more panel layouts (e.g., a single panel activated, a partial panels activated, all panels activated), and may select the best panel layout based on the quality and the UE power consumption. In an example, a wireless device may be configured with a first candidate beams, a second candidate beams, and a third candidate beams. For example, the wireless device may perform beam measurement based on a single active panel or reduced number of active panels in the first candidate beams. For example, the wireless device may perform beam measurement based on the remaining panels not used in the measurement based on the first candidate beams based on the second candidate beams. For example, the wireless device may perform beam measurement using all panels for the third candidate beams. The wireless device may select a first new candidate beam from each candidate beams. The wireless device may report the first new candidate beam for a beam recovery procedure among the three identified new candidate beams (one for each candidate beams). The wireless device may report a first panel layout used for the first new candidate beam along with the first new candidate beam. The wireless device may report three new candidate beams (one for each candidate beams) to the base station. The wireless device may report the qualities of three new candidate beams and associated panel layouts (one layout for a beam respectively). The base station may utilize the information to determine a panel layout of the wireless device.

In an example, a wireless device may initiate a RACH procedure for a BFR (e.g., BFR on a PCell, a sPCell or a SCell with PUCCH). When the wireless device is configured/activated with more than one TRPs on a cell, the wireless device may assume that active bandwidth parts of both TRPs are identical. In a RACH procedure or BFR procedure of a cell, a wireless device may switch to an initial DL BWP and an initial UL BWP when a current active UL BWP may not contain a PRACH configuration. In response to switching to the initial DL/UL BWP of a TRP, the wireless device may assume that the initial DL/UL BWP is a new active BWP for all TRPs of the cell or may deactivate one or more TRPs which is not a first TRP or a primary TRP of the cell. A base station may configure an option between switching a BWP of all TRPs and deactivating all secondary TRPs to a wireless device.

A wireless device may switch to a default BWP when the wireless device may be configured with a BWP-inactivity timer. A BWP-inactivity timer may be configured for a cell, and the timer may be applied across TRPs. When the timer applies across TRPs, a wireless device may reset the inactivity timer whenever it receives a scheduling DCI from one TRP of active TRPs. In response to the BWP-inactivity timer expiry, the wireless device may switch to a default BWP. Similar to an initial DL/UL BWP case, a wireless device may switch a BWP of a TRP for all TRPs to the default BWP or the wireless device may deactivate secondary TRPs while switching an active BWP of a primary BWP to the default BWP. A base station may configure an option of a UE behavior in BWP switching during a multi-scenario. A BWP-inactivity timer may be disabled for a cell (regardless of timer configuration) when a wireless device may be activated with more than one TRP for the cell. A multi-TRP operation in a cell may have a first mode of operation and a second mode of operation. For example, the first mode of operation is mainly to support ideal backhaul scenario across multiple TRPs of the cell. For example, the second mode of operation is mainly to support non-ideal backhaul scenario.

A base station may configure to a wireless device a first mode of operation or a second mode of operation when the base station may configure/activate more than one TRP of a first cell. In response to the first mode of operation, the wireless device and the base station may assume a first set of behaviors/operations. In response to the second mode of operation, the wireless device and the base station may assume a second set of behaviors/operations. For example, the first set of behaviors/operations may include: in response of a BWP switching command (e.g., BWP-inactivity timer expiry, a BWP switching command, switching to an initial DL/UL BWP for a RACH procedure, etc.), the wireless device switches to the requested BWP for all active TRPs of the first cell; a BFR request of a first TRP is sent to a second TRP; and/or the like. For example, the second set of behaviors/operations may include: in response of a BWP switching command (e.g., BWP-inactivity timer expiry, a BWP switching command, switching to an initial DL/UL BWP for a RACH procedure, etc.), the wireless device switches to the requested BWP for the primary TRP (or the first TRP) of the first cell and deactivate other active TRPs; a BFR request of a first TRP is sent to a first TRP via a RACH-based procedure or to another cell activated by the first TRP (and vice versa), and/or the like.

A wireless device may indicate a support on a multi-TRP scenario for a cell and/or a frequency and/or a band and/or a band combination. The wireless device may support more number of blind decoding and channel estimations if the wireless device supports a multi-TRP scenario. The wireless device may inform a number of TRPs supported for each cell, or may inform the number of blind decoding, channel estimations, a number of CORESETs/SSs for a cell and/or a frequency and/or a band and/or a band combination. The wireless device may not assume that a multi-TRP scenario is enabled for a cell when the wireless device reports a number of carriers supported for a control channel decoding (e.g., Y carriers). The wireless device may report two sets of Y carriers (e.g., a number of carriers supported for a control channel decoding) where a first Y value refers a number of carriers without any multi-TRP in any carrier, and a second Y value refers a number of carriers with multi-TRP operation in any carrier where the wireless device supports the multi-TRP operation. A gNB may use the first Y value when there is no multi-TRP operation is enabled in any frequency/cell. The gNB may use the second Y value when there is any cell with a multi-TRP operation regardless of how many cells with a multi-TRP. A wireless device may assume that there is only one cell or frequency or per frequency range (e.g., FR1 vs. FR2) where a multi-TRP operation is configured. For each numerology that the wireless device may support and/or a frequency range the wireless device may support, a wireless device may inform a UE capability regarding a multi-TRP operation. A wireless device may inform two Y values where the fist Y value is derived based on no multi-TRP operation and the second Y value is derived based on one multi-TRP cell in a band-combination (if the wireless device supports the multi-TRP in the band-combination).

In an example, a wireless device may initiate a RACH-based BFR procedure where a new candidate beam of a first TRP (e.g., a primary TRP) may be informed to the base station. A wireless device may skip monitoring on one or more CORESETs that are configured for a second TRP (e.g., a secondary TRP) in response to initiating the RACH-based BFR for the cell. The wireless device may start monitoring on the one or more CORESETs when there is an update on the CORESETs based on MAC CE or RRC reconfiguration. To enhance the reception quality, a wireless device may also switch TCI state, based on the new candidate beam, of one or more second CORESETs configured the first TRP in response to initiating a RACH based BFR. A wireless device may also update TCI state of a CORESET configured for the first TRP if the CORESET is used for a CSS.

When a wireless device initiates a RACH-based BFR, until the wireless device is reconfigured with a TCI state, the wireless device may use the same spatial filter used for RACH transmission or Msg3 transmission as a default configuration for a PUCCH. When the wireless device is configured/activated with multiple TRPs, a PUCCH transmission to one or more second TRPs based on the same spatial filter of Msg 3 used for the first TRP (e.g., a primary TRP) may be desirable. The wireless device may skip/disable transmission of PUCCH for one or more second TRPs if a beam failure recovery procedure is going on for a cell. When a wireless device may send a beam failure request to another TRP for a TRP, until the wireless device receives a new configuration or MAC CE on the TRP PUCCH resources, the PUCCH spatial filter for the TRP may be determined based on a new candidate beam that the wireless device reported for the TRP. The wireless device may use a spatial filter that the wireless device may have used if the wireless device would have sent a PRACH to initiate a beam failure recovery procedure for the TRP/the cell. A default TCI state of a PUCCH in a TRP after a beam failure recovery initiation may be determined based on a new candidate beam identified during the beam failure recovery procedure (when the beam failure recovery is not triggered by a RACH procedure). When the beam failure recovery procedure is triggered by a RACH procedure, a default PUCCH spatial filter based on a new candidate beam may be applied only to non-primary TRPs. The wireless device may skip transmission of PUCCH until a new spatial filter is configured for the TRP.

In an example, a wireless device may receive one or more radio resource control messages. The one or more radio resource control messages may comprise/indicate a first control resource set (coreset) group of a cell for a first transmission and reception point (TRP) and a second coreset group of the cell for a second TRP. The one or more radio resource control messages may further comprise/indicate first uplink resources associated with the first coreset group and second uplink resources associated with the second coreset group. The wireless device may detect a beam failure based on one or more reference signals for the first coreset group of the cell. The wireless device may initiate a beam failure recovery procedure in response to the detecting the beam failure of the first coreset group of the cell. The wireless device may identify for the bean failure recovery procedure, a candidate beam reference signal (RS) among one or more candidate beam RSs configured for the first coreset group of the cell. After completing the beam failure recovery procedure for the first coreset group, the wireless device may transmit a first uplink signal via a first uplink resource of the first uplink resources with a first spatial domain filter determined based on a reception of the candidate beam RS. For example, the first uplink signal may be a PUCCH, a PUSCH or an SRS or a SR. After completing the beam failure recovery procedure for the first coreset group, the wireless device may transmit a second uplink signal via a second uplink resource of the second uplink resources with a second spatial domain filter different from the first spatial domain filter, wherein the second domain filter is determined based on a reception of a second beam RS of the second coreset group. The second uplink signal may be a PUCCH, a PUSCH or an SRS or a SR. The wireless device may use default spatial domain filter parameter(s) of an uplink of a TRP based on a new candidate beam, wherein the uplink may be transmitted for the TRP. The wireless device may keep current/active/configured/indicated spatial domain filter parameter(s) of a second uplink of a second TRP, wherein the uplink may be transmitted to the second TRP, different from the TRP of the beam recovery.

Figure 29:
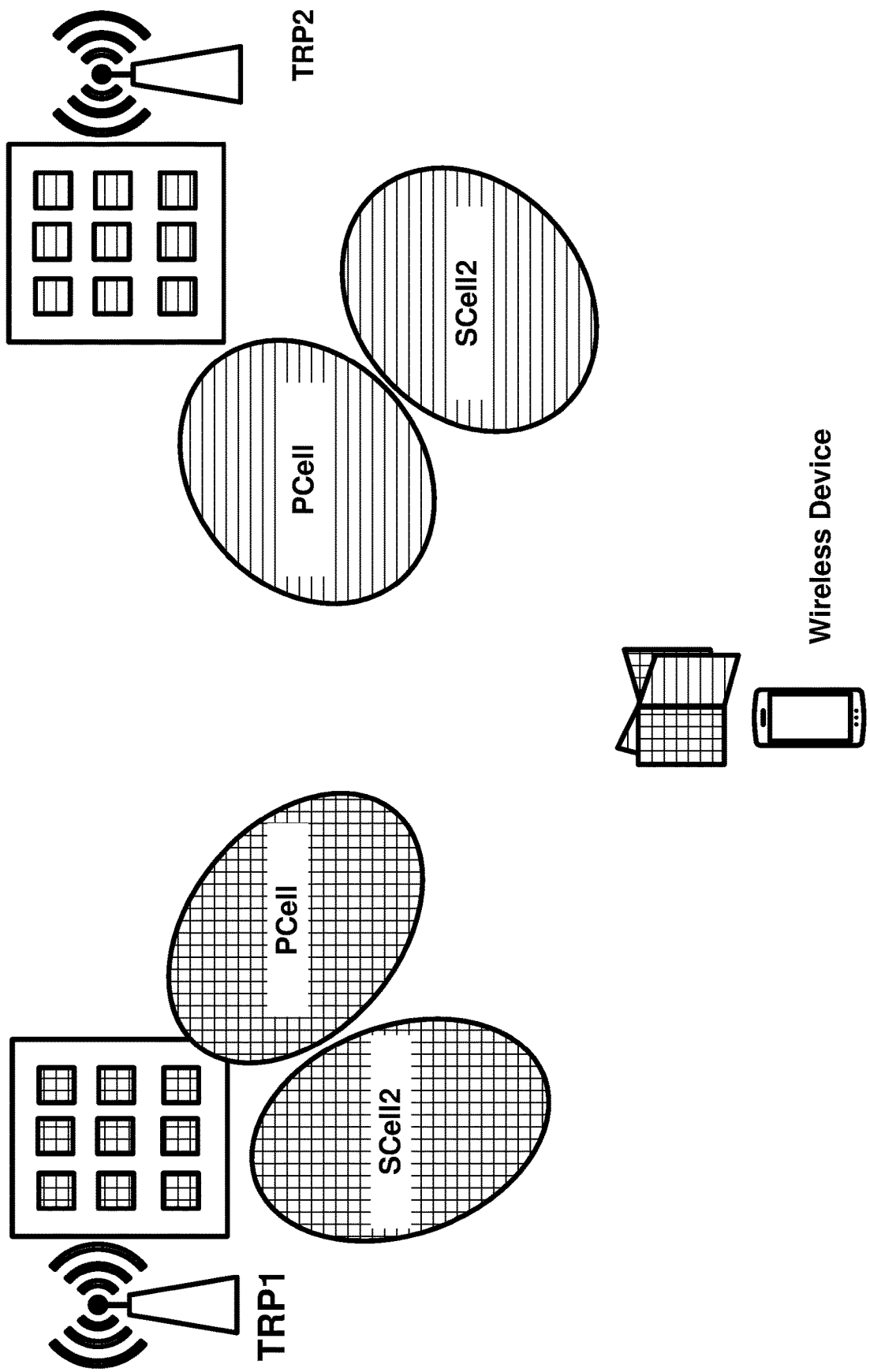
FIG. 29 illustrates an example of a multi-TRP in a carrier aggregation scenario.

In an example, a wireless device may be configured and/or activated with one or more first cells. The wireless device may be configured and/or activated with one or more TRPs for one or more second cells from the one or more first cells. FIG. 29 illustrates an example. The wireless device is configured with PCell, SCell 1, and SCell 2. For PCell, the wireless device is activated with a first TRP (TRP1) and a second TRP (TRP2), and SCell 1 is serviced by TRP2, and SCell 2 is serviced by TRP1. In an example, the wireless device may detect a beam failure on SCell 2. The wireless device may trigger a beam failure recovery procedure for SCell 2 via the first TRP of PCell. The wireless device may not trigger the beam failure recovery procedure for SCell 2 via the second TRP of PCell. The wireless device may transmit a SR resource of the first TRP of the primary cell, wherein a secondary cell of SCell 2 may need to initiate a beam failure recovery. The wireless device may utilize one or more resources (e.g., RACH resources, SR resources, uplink resources, etc.) a same TRP group or a same CORESET group to initiate a beam failure recovery of a cell.

To identify which TRP to send a beam failure recovery request and/or beam recovery information, a base station may configure 'a TRP group index', 'a CORESET group index', or 'a TCI state group index' or 'a SRI group index' for each cell in a carrier group regardless whether there is a single TRP on the cell or multiple TRPs on the cell. The wireless device may send SRs/PUSCHs/PUCCHs related to a BFR of a SCell X to a first TRP of PCell (or sPCell) where one or more beam recovery reference signals of the SCell X belong to the same group (e.g., the same CORESET group, the same TRP group, the same TCI state group, the same SRI group etc.) to the first TRP of PCell. In an example, the wireless device may detect a beam failure of SCell 1, the wireless device may trigger a SR to the TRP2 of PCell, and send a PUSCH to TRP2 of PCell. In an ideal backhaul scenario, this restriction may not be applied. The behavior may be applied/assumed in the second mode of operation, and no restriction may be applied/assumed for the first mode of operation mentioned in the specification.

In an example, a wireless device may not have identified a new candidate beam (or a selected beam) after detecting a beam failure for a TRP of a cell or for a cell. In response to none available new candidate beam, the wireless device may deactivate the TRP of the cell or the cell. When the cell is a PCell, and the BFR is triggered for the cell, the wireless device may start a timer of radio link monitoring/failure counter (e.g., T310). When a wireless device is associated with a MCG and a SCG, and a beam failure may occur in a SCG sPCell without none available new candidate beam on SCG sPCell, the wireless device may inform a radio link failure of the SCG to MCG (and vice versa).

A wireless device may receive one or more radio resource control (RRC) messages. The one or more RRC messages may comprise a first one or more reference signals, a first beam failure indication max counter for a first TRP for a cell. The RRC messages may comprise a second one or more reference signals, a second beam failure indication max counter for a second TRP of the cell. The wireless device may monitor the first one or more reference signals to determine a first beam failure of the first TRP. The wireless device may monitor the second one or more reference signals to determine a second beam failure of the second TRP. In response to a detection of the first beam failure, the wireless device may initiate a first beam failure recovery procedure of the second TRP via the first TRP. In response to a detection of the second beam failure, the wireless device may initiate a second beam failure recovery procedure of the first TRP via the second TRP. In response to a detection of both the first and the second beam failure, the wireless device may initiate a third beam failure recovery procedure via the first TRP.

The wireless device may deactivate the second TRP in response to initiating the third beam failure recovery procedure.

The wireless device may determine the detection of both the first and second beam failure based on qualities of the first and second beam recovery reference signals and/or the first and the second beam failure indication counters and/or the first and the second beam failure events. For example, the wireless device may determine the detection of both failures wherein the wireless device has initiated a BFR on the first TRP, and the wireless device may encounter the second beam failure event. For example, the wireless device may determine the detection of both failures wherein the wireless device has initiated a BFR on the first TRP, and the wireless device may detect one or more beam failure incidents have been occurred for the second TRP. For example, the wireless device may determine the detection of both failures wherein the wireless device has initiated a BFR on the first TRP, and the wireless device may detect one or more beam failure incidents have been occurred for the second TRP. For example, the wireless device may determine the detection of both failures wherein the wireless device has initiated a BFR on the first TRP, and the wireless device may detect qualities of one or more second reference signals may be lower than a threshold.

The first beam failure indication max counter and the second beam failure indication max counter may be the same value or different values. The second beam failure indication max counter may be the same as the first beam failure indication max counter. The wireless device may be configured/activated the first TRP and the second TRP for the cell, wherein the cell may be a PCell, a sPCell or a SCell. A first cell ID used in the first TRP may be the same as a second cell ID used in the second TRP. The first cell ID may be different from the second cell ID.

The wireless device may start skipping PUCCH transmission to the second TRP when the wireless device initiates a BFR with the first TRP. The wireless device may resume PUCCH transmission to the second TRP when the wireless device may receive reconfiguration of TCI state(s) on PUCCH resources and/or MAC CE activation of TCI states or beam recovery for the second TRP is completed.

The wireless device may send a TRP index or a CORESET group index in addition to a beam index and a cell index in reporting a new candidate beam for a beam failure of a TRP. The wireless device may send this information via MAC CE or DCI or in the payload of uplink data channel (e.g., Msg3, PUSCH).

The TRP index may be carried by a separate field from a cell index or beam index. The TRP index may be carried by extending a cell index or use one or more indices from the cell index field. The TRP index may be carried by extending a beam index or use one or more indices from the beam index field.

The wireless device may be configured with a single BFR-CORESET for a cell regardless of a number of TRPs. The wireless device may use the single BFR-CORESET for the first beam failure recovery procedure, the second beam failure recovery procedure, and the third beam failure recovery procedure. The wireless device may support only a single BFR-CORESET for a cell regardless of supporting of multi-TRP scenarios or not for a cell, a frequency, a band or a band combination.

The wireless device may report a list of new candidate beams where a new candidate beam may correspond to the new candidate beam with a specific panel layout (e.g., only one panel is active). The wireless device may support one or more panel layouts, and the base station may select the best panel layout in consideration of beam quality and UE power consumption.

The wireless device may deactivate or deconfigure TCI state of one or more CORESETs configured for the second TRP when the wireless device may have triggered the third BFR procedure or the second BFR procedure. The wireless device may receive RRC reconfiguration and/or MAC CE activation and/or DCI activation on new TCI states on the one or more CORESETs.

A wireless device may receive one or more radio resource control (RRC) messages. The one or more RRC messages may comprise a beam failure indication max counter for a cell, a first one or more reference signals for a first TRP for the cell, and a second one or more reference signals for the second TRP for the cell. The wireless device may monitor both the first one or more reference signals and the second one or more reference signals in determining a beam failure incidents. The wireless device may declare a beam failure when the beam failure incidents may exceed the beam failure indication max counter. The wireless device may initiate a RACH based BFR procedure in response to the beam failure where the PRACH is transmitted to the first TRP of the cell. The wireless device may deactivate the second TRP in response to the beam failure.

A wireless device may receive one or more radio resource control (RRC) messages. The one or more RRC messages may indicate a MAC CE format to carry a new candidate beam index, a first one or more candidate beam list for a first TRP for a cell, and a second one or more candidate beam list for a second TRP for the cell. In response to a beam failure of the second TRP, the wireless device may report an index of a new candidate beam of the second TRP by adding an offset to the index of the new candidate beam from the second one or more candidate beam list for the second TRP. The wireless device may send the index of the new candidate beam for the second TRP based on the indicated MAC CE format.

The offset may be the maximum number of candidate beam list (e.g., 16) for the first TRP. The MAC CE format to carry a new candidate beam index may correspond to 5 bits of beam index (e.g., to carry 32 candidate beams across two TRPs).

A wireless device may receive one or more radio resource control (RRC) messages. The one or more RRC messages may comprise a beam failure recovery CORESET (BFR-CORESET), a beam failure recovery search space (BFR-SS) for a cell. The one or more RRC messages may comprise a first one or more reference signals, a first beam failure indication max counter for a first TRP for a cell. The RRC messages may comprise a second one or more reference signals, a second beam failure indication max counter for a second TRP of the cell. The wireless device may monitor the first one or more reference signals to determine a first beam failure of the first TRP. The wireless device may monitor the second one or more reference signals to determine a second beam failure of the second TRP. In response to a detection of the first beam failure, the wireless device may transmit a first new candidate beam of the first TRP to the second TRP. The wireless device may monitor a DCI on the BFR-SS and the BFR-CORESET based on the QCL information of the first new candidate beam of the first TRP from the first TRP in response to the first beam failure recovery. In response to a detection of the second beam failure, the wireless device may transmit a second new candidate beam of the second TRP to the second TRP. The wireless device may monitor a DCI on the BFR-SS and the BFR-CORESET based on the QCL information of the second new candidate beam of the second TRP from the second TRP in response to the second beam failure recovery. In response to a detection of both the first and the second beam failure, the wireless device may initiate a third beam failure recovery procedure via the first TRP. The wireless device may monitor BFR-CORESET based on a QCL information of the new candidate beam for the first TRP in response to the third beam failure recovery.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 30:
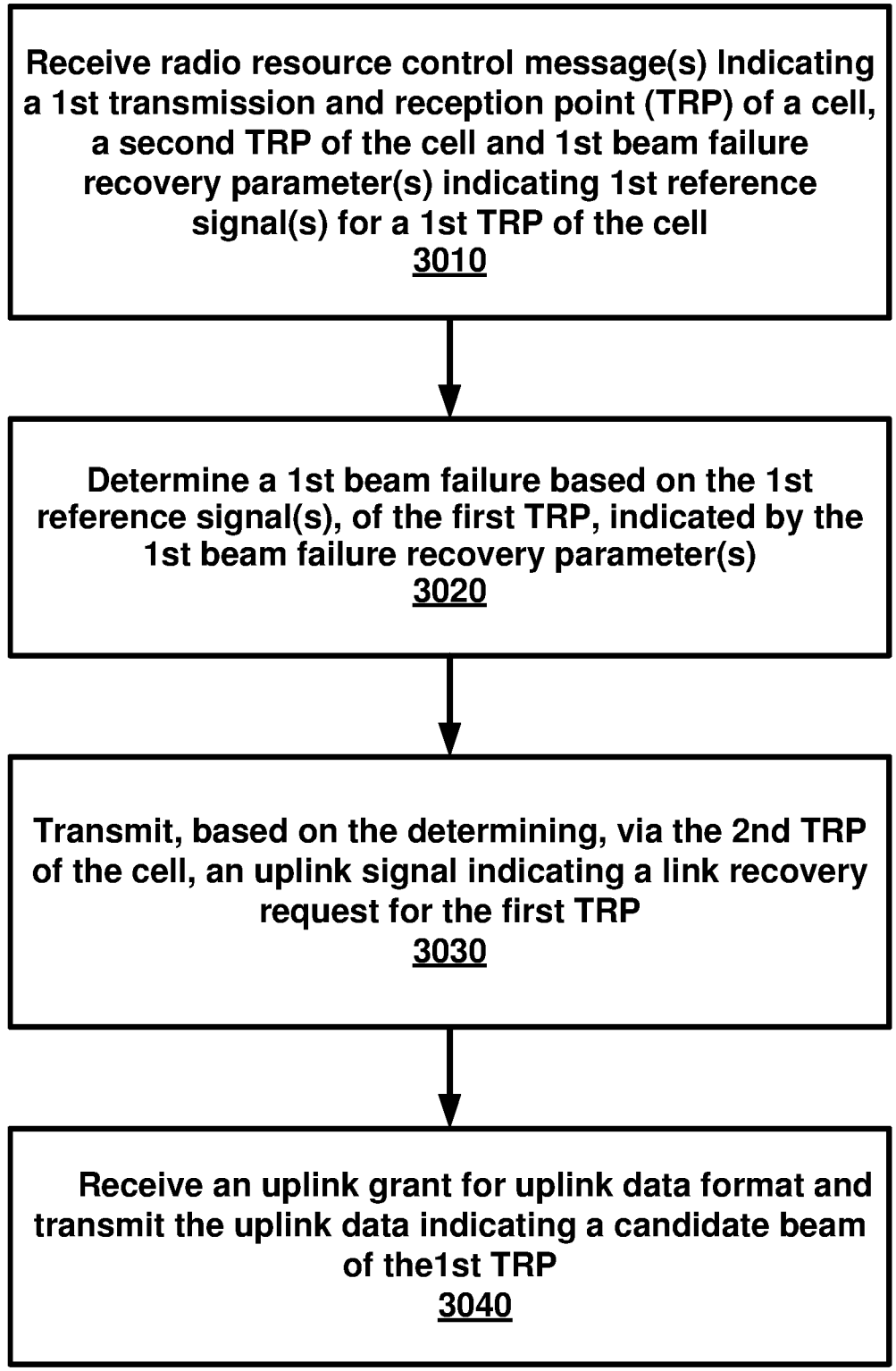
FIG. 30 is a flow diagram of an aspect of an example embodiment of the present disclosure.

FIG. 30 is a flow diagram as per an aspect of an example embodiment of the present disclosure. At 3010, a wireless device may receive one or more radio resource control (RRC) messages by a base station. The RRC messages may indicate a first transmission and reception point (TRP) of a cell. The RRC messages may indicate a second TRP of the cell. The RRC messages may indicate one or more first beam failure recovery parameters indicating one or more first reference signals for first TRP of the cell. At 3020, the wireless device may determine a first beam failure based on the one or more first reference signals, of the first TRP, indicated by the one or more first beam failure recovery parameters. At 3030, the wireless device may, based on the determining, transmit via the second TRP of the cell, an uplink signal indicating a link recovery request for the first TRP. At 3040, the wireless device may receive an uplink grant for uplink data. The wireless device may transmit the uplink data indicating a candidate beam of the first TRP.

According to an example embodiment, the one or more radio resource control (RRC) messages may indicate a first control resource set (coreset) group associated with the first TRP; and a second coreset associated with the second TRP of the cell. According to an example embodiment, a configuration parameter for the first TRP indicates that the parameter may be configured with a first index of the first coreset group. A configuration parameter for the second TRP may indicate that the parameter is configured with a second index of the second coreset group.

According to an example embodiment, the uplink signal over a scheduling request (SR) resource of the second TRP may be transmitted. The uplink signal may indicate the link recovery request for the first TRP.

According to an example embodiment, the wireless device may determine the first beam failure based on the one or more first reference signals; and a beam failure indication counter for the first TRP.

According to an example embodiment, the one or more RRC messages may indicate one or more second beam failure recovery parameters indicating one or more second reference signals for second TRP of the cell. The wireless device may determine a second beam failure based on the one or more second reference signals; and a second beam failure indication counter for the second TRP. The wireless device may, based on the determining of the second beam failure, transmit a second uplink signal, via the first TRP of the cell, indicating a second link recovery request for the second TRP. The second uplink signal may be transmitted over a second scheduling request (SR) resource of the first TRP. The second uplink signal may indicate the link recovery request for the second TRP.

According to an example embodiment, the wireless device may select a RACH resource based on a first candidate beam of the first TRP. A second beam failure of the second TRP may occur while the link recovery request is pending. The wireless device may transmit a PRACH via the selected RACH resource. The wireless device may receive, in response to the second link recovery request, a second uplink grant scheduling a second uplink data. The wireless device may transmit the second uplink data indicating a second candidate beam for the second TRP.

According to an example embodiment, the uplink data may comprise a medium access control (MAC) control element (CE). The MAC-CE may comprise the candidate beam for the first TRP. For example, the second uplink data may comprise a second MAC-CE, where the second MAC-CE comprises the candidate beam for the second TRP.

According to an example embodiment, the wireless device may set the first beam failure indication counter to zero. The wireless device may, based on signal qualities of the one or more first reference signals being lower than a first threshold value, increment the first beam failure indication counter by one. The wireless device may determine the first beam failure in response to the first beam failure indication counter becomes equal to a first counter threshold. The wireless device may set the second beam failure indication counter to zero. The wireless device may, based on signal qualities of the one or more second reference signals being lower than a second threshold value, increment the second beam failure indication counter by one. The wireless device may determine the second beam failure in response to the second beam failure indication counter being equal to a second counter threshold.

According to an example embodiment, a wireless device may receive one or more radio resource control messages. The one or more radio resource control messages may indicate first control resource set (coreset) group of a cell for a first transmission and reception point (TRP). The one or more radio resource control messages may indicate a second coreset group of the cell for a second TRP. The one or more radio resource control messages may indicate first uplink resources associated with the first coreset group. The one or more radio resource control messages may indicate second uplink resources associated with the second coreset group. The wireless device may initiate a beam failure recovery procedure based on detecting a beam failure of the first coreset group of the cell. The wireless device may identify, for the bean failure recovery procedure, a candidate beam reference signal (RS) among one or more candidate beam RSs configured for the first coreset group of the cell. After completing the beam failure recovery procedure for the first coreset group, the wireless device may transmit a first uplink signal via a first uplink resource of the first uplink resources with a first spatial domain filter determined based on a reception of the candidate beam RS. After completing the beam failure recovery procedure for the first coreset group, the wireless device may transmit a second uplink signal via a second uplink resource of the second uplink resources with a second spatial domain filter different from the first spatial domain filter. The second domain filter may be determined based on a reception of a second beam RS of the second coreset group.

According to an example embodiment, the wireless device may transmit an uplink signal using a resource of the first uplink resources to the first TRP. The wireless device may transmit an uplink signal using a resource of the second uplink resources to the second TRP. The wireless device may, in response to transmitting an uplink data indicating the candidate beam RS for the first coreset group, determine the completing of the beam failure recovery procedure for the first coreset group. The wireless device may receive an activation medium access control (MAC) control element (CE) activating the second domain filter for the second resource The second domain filter may be used on the reception of the second beam RS of the second coreset group. The wireless device may receive an activation medium access control (MAC) control element (CE) activating the second domain filter for the second resource. The second domain filter may be used on the reception of the second beam RS of the second coreset group. One or more beam RSs of the second coreset group may be valid. The wireless device may determine the one or more beams being valid based on signal qualities of the one or more beam RSs being higher than a threshold value. The one or more beam RSs comprise the second beam RS According to an example embodiment, a third beam RS of the first coreset group may be transmitted by the first TRP. A fourth beam RS of the second coreset group may be transmitted by the second TRP.

According to an example embodiment, a wireless device may receive one or more radio resource control messages. The one or more radio resource control messages may indicate a first transmission and reception point (TRP) of a cell. The one or more radio resource control messages may indicate a second TRP of the cell. The one or more radio resource control messages may indicate one or more first reference signals for the first TRP of the cell. The one or more radio resource control messages may indicate a first beam failure indication counter for the first TRP. The wireless device may determine a first beam failure based on the one or more first reference signals; and the first beam failure indication counter for the first TRP. The wireless device may, based on the determining, via the second TRP of the cell, transmit an uplink signal indicating a candidate beam of the first TRP.

According to an example embodiment, a wireless device may transmit a first number of cells. The wireless device may support as a UE capability the first number of cells for monitoring, one or more first DCIs when the wireless device is configured with a single CORESET pool over a plurality of serving cells configured to the wireless device and a second number of cells. The wireless device may support as a UE capability, the second number of cells for monitoring one or more second DCIs when the wireless device is configured with a plurality of CORESET pools for at least a serving cell of the plurality of serving cells. The wireless device may receive one or more radio resource control messages comprising the plurality of serving cells; and one or more search spaces for the plurality of serving cells. The wireless device may determine a number of DCI candidates for a cell of the plurality of the serving cells based on the first number of cells or the second number of cells depending whether at least one serving cell of the plurality of serving cells is configured with the plurality of the CORESET pools. The wireless device may monitor the number of DCI candidates for the cell based on the determining.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail may be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:
   receiving, by a wireless device, one or more radio resource control (RRC) messages indicating:
      a first transmission and reception point (TRP) of a cell;
      a second TRP of the cell; and
      one or more first beam failure recovery parameters indicating one or more first reference signals for the first TRP of the cell;
   determining a first beam failure based on the one or more first reference signals, of the first TRP, indicated by the one or more first beam failure recovery parameters;
   based on the determining, transmitting, via the second TRP of the cell, an uplink signal indicating a link recovery request for the first TRP;
   receiving an uplink grant for uplink data; and
   transmit the uplink data indicating a candidate beam of the first TRP.

2. The method of claim 1, wherein the one or more radio resource control (RRC) messages indicates:
   a first control resource set (coreset) group associated with the first TRP; and
   a second coreset associated with the second TRP of the cell.

3. The method of claim 1, wherein the uplink signal is transmitted, over a scheduling request (SR) resource of the second TRP, indicating the link recovery request for the first TRP.

4. The method of claim 1, further comprising determining the first beam failure based on:
   the one or more first reference signals; and
   a beam failure indication counter for the first TRP.

5. The method of claim 1, wherein the one or more RRC messages indicates one or more second beam failure recovery parameters indicating one or more second reference signals for the second TRP of the cell.

6. The method of claim 5, further comprising determining a second beam failure based on:
   the one or more second reference signals; and
   a second beam failure indication counter for the second TRP.

7. The method of claim 6, further comprising transmitting, based on the determining of the second beam failure, a second uplink signal, via the first TRP of the cell, indicating a second link recovery request for the second TRP.

8. The method of claim 7, wherein the second uplink signal is transmitted, over a second scheduling request (SR) resource of the first TRP, indicating the link recovery request for the second TRP.

9. The method of claim 1, further comprising selecting a random access channel (RACH) resource based on a first candidate beam of the first TRP, wherein a second beam failure of the second TRP occurs while the link recovery request is pending.

10. The method of claim 9, further comprising transmitting a physical random access channel (PRACH) via the selected RACH resource.

11. A wireless device comprising:
one or more processors; and
memory storing instructions that, when executed by the one or more processors, cause the wireless device to:
receive one or more radio resource control (RRC) messages indicating:
a first transmission and reception point (TRP) of a cell;
a second TRP of the cell; and
one or more first beam failure recovery parameters indicating one or more first reference signals for the first TRP of the cell;
determine a first beam failure based on the one or more first reference signals, of the first TRP, indicated by the one or more first beam failure recovery parameters;
based on the determining, transmit, via the second TRP of the cell, an uplink signal indicating a link recovery request for the first TRP;
receive an uplink grant for uplink data; and
transmit the uplink data indicating a candidate beam of the first TRP.

12. The method of claim 11, wherein the one or more radio resource control (RRC) messages indicates:
a first control resource set (coreset) group associated with the first TRP; and
a second coreset associated with the second TRP of the cell.

13. The method of claim 11, wherein the uplink signal is transmitted, over a scheduling request (SR) resource of the second TRP, indicating the link recovery request for the first TRP.

14. The method of claim 11, wherein the instructions, when executed by the one or more processors, further cause the wireless device to determine the first beam failure based on:
the one or more first reference signals; and
a beam failure indication counter for the first TRP.

15. The method of claim 11, wherein the one or more RRC messages indicates one or more second beam failure recovery parameters indicating one or more second reference signals for the second TRP of the cell.

16. The method of claim 15, wherein the instructions, when executed by the one or more processors, further cause the wireless device to determine a second beam failure based on:
the one or more second reference signals; and
a second beam failure indication counter for the second TRP.

17. The method of claim 16, wherein the instructions, when executed by the one or more processors, further cause the wireless device to transmit, based on the determining of the second beam failure, a second uplink signal, via the first TRP of the cell, indicating a second link recovery request for the second TRP.

18. The method of claim 1, wherein the instructions, when executed by the one or more processors, further cause the wireless device to select a random access channel (RACH) resource based on a first candidate beam of the first TRP, wherein a second beam failure of the second TRP occurs while the link recovery request is pending.

19. The method of claim 18, wherein the instructions, when executed by the one or more processors, further cause the wireless device to transmit a physical random access channel (PRACH) via the selected RACH resource.

20. A system comprising:
a base station; and
a wireless device comprising:
one or more processors; and
memory storing instructions that, when executed by the one or more processors, cause the wireless device to:
receive, from a base station, one or more radio resource control messages indicating:
a first transmission and reception point (TRP) of a cell;
a second TRP of the cell; and
one or more first beam failure recovery parameters indicating one or more first reference signals for the first TRP of the cell;
determine a first beam failure based on the one or more first reference signals, of the first TRP, indicated by the one or more first beam failure recovery parameters;
based on the determining, transmit, via the second TRP of the cell, an uplink signal indicating a link recovery request for the first TRP;
receive an uplink grant for uplink data; and
transmit the uplink data indicating a candidate beam of the first TRP.

* * * * *